(12) United States Patent
Koyanagi et al.

(10) Patent No.: US 8,694,677 B2
(45) Date of Patent: Apr. 8, 2014

(54) RETRY COMMUNICATION CONTROL METHOD AND SYSTEM

(75) Inventors: Etsuko Koyanagi, Tokyo (JP); Satoshi Miyayama, Tokyo (JP); Naotaka Morita, Tokyo (JP); Shunsuke Mori, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 2439 days.

(21) Appl. No.: 10/523,348

(22) PCT Filed: Jul. 30, 2003

(86) PCT No.: PCT/JP03/09683
§ 371 (c)(1),
(2), (4) Date: Sep. 29, 2005

(87) PCT Pub. No.: WO2004/019567
PCT Pub. Date: Mar. 4, 2004

(65) Prior Publication Data
US 2006/0168336 A1 Jul. 27, 2006

(30) Foreign Application Priority Data

Jul. 30, 2002 (JP) .............................. P2002-222146
Jun. 19, 2003 (JP) .............................. P2003-175485
Jun. 20, 2003 (JP) .............................. P2003-176432
Jun. 20, 2003 (JP) .............................. P2003-176547
Jun. 20, 2003 (JP) .............................. P2003-176846

(51) Int. Cl.
*G06F 15/173* (2006.01)

(52) U.S. Cl.
USPC ............................ 709/240; 709/238; 340/2.1

(58) Field of Classification Search
USPC ....................................................... 709/240
See application file for complete search history.

(56) References Cited

U.S. PATENT DOCUMENTS 5,627,819 A    5/1997  Dev et al.
6,097,722 A *  8/2000  Graham et al. .......... 370/395.21
(Continued)

FOREIGN PATENT DOCUMENTS

JP    10-512413      11/1998
JP    2002-190804 A   7/2002

OTHER PUBLICATIONS

Bianchi et al. PCP: An End-to-End Measurement-Based Call Admission Control for Real-Time Services over IP Networks [online], Jan. 2001 [retrieved on Aug. 30, 2009]. Retrieved from the Internet<http://www.springerlink.com/content/eebx37c02yeb4k0d/fulltext.pdf>.*

(Continued)

*Primary Examiner* — Jerry Dennison
*Assistant Examiner* — Adam Cooney
(74) *Attorney, Agent, or Firm* — Kilpatrick Townsend & Stockton LLP

(57) ABSTRACT

A terminal apparatus firstly transfers packets of a trial class. When the communication quality is insufficient, the terminal apparatus determines after a predetermined period of time whether or not to transfer the trail-class packets again according to a traffic rate of priority-class packets. There are provided a trial-class band capacity not to discard packets of the trial class and a priority-class band capacity not to discard packets of the priority class. Trial-class packets exceeding the former are discarded but the packets that has once become a priority class will not be discarded unless the latter is exceeded.

12 Claims, 34 Drawing Sheets

(56) References Cited

U.S. PATENT DOCUMENTS

| | | | |
|---|---|---|---|
| 7,149,185 B1* | 12/2006 | Suni | 370/230 |
| 2002/0044557 A1* | 4/2002 | Isoyama | 370/395.42 |
| 2003/0054796 A1* | 3/2003 | Tamaki et al. | 455/406 |

OTHER PUBLICATIONS

Elek et al. Admission Control Based on End-to-End Measurements [online], Mar. 2000 [retrieved on Jun. 15, 2010]. Retrieved from the Internet<http://citeseerx.ist.psu.edu/viewdoc/summary?doi=10.1.1.41.8465>.*

Elek, V. et al., "Admission Control Based on End-to-End Measurements", INFOCOM 2000, Nineteenth Annual Joint Conference of the IEEE Computer and Communications Societies, Proceedings, IEEE, Mar. 26, 2000-Mar. 30, 2000, pp. 623-630, vol. 2.

English translation of Declaration as to non-prejudicial disclosure or exceptions to lack of novelty under PCT Rules 4.17(v) and 51bis. 1(a)(v): Nippon Telegraph and Telephone Corporation declares that the subject matter claimed in this international application was disclosed in publication on Mar. 3, 2003.

Bianchi et al., "Endpoint Admission Control with Delay Variation Measurements for QOS in IP Networks", Computer Communication Review, ACM, New York, vol. 32, No. 2, Apr. 1, 2002, pp. 61-69.

Belenki, "An Enforced Inter-Admission Delay Performance-Driven Connection Admission Control Algorithm", Computer Communication Review, ACM, New York, NY, vol. 32, No. 2, Apr. 1, 2002, pp. 31-41.

Kelly, "An ECN Probe-Based Connection Acceptance Control", Computer Communication Review, ACM, New York, NY, vol. 31, No. 3, Jul. 1, 2001, pp. 14-25.

Mori et al., "A Study on the ToS Promotion Method for Sessions Over DiffServ IP Networks", Institute of Electronics, Information and Communication Engineers, Mar. 3, 2003.

\* cited by examiner

FIG.21

| TYPE OF SERVICE (ToS) | PRIORITY (LEVEL) |
|---|---|
| 000 | - |
| 001 | - |
| 010 | M |
| 011 | - |
| 100 | H |
| 101 | - |
| 110 | - |
| 111 | - |

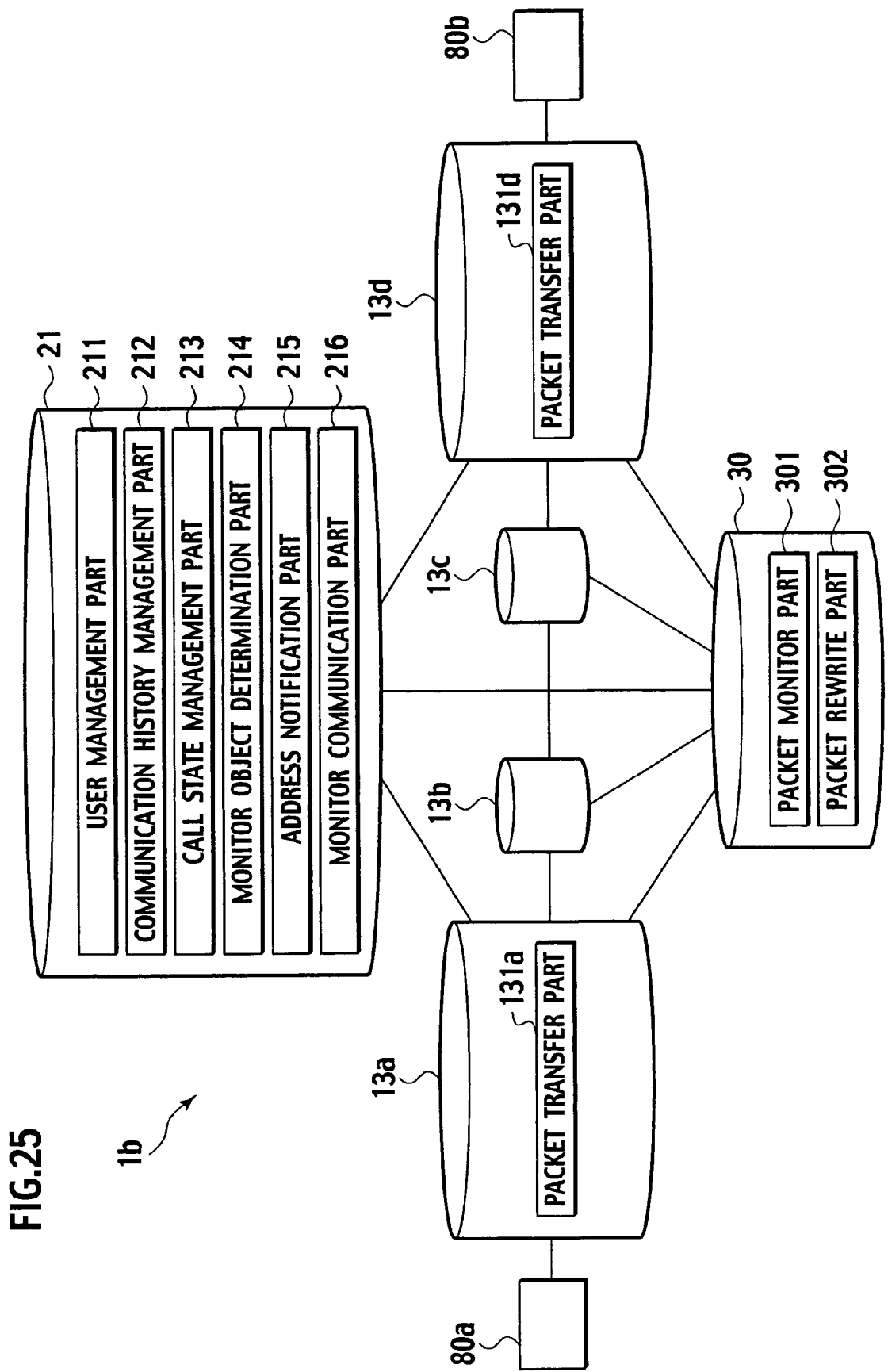

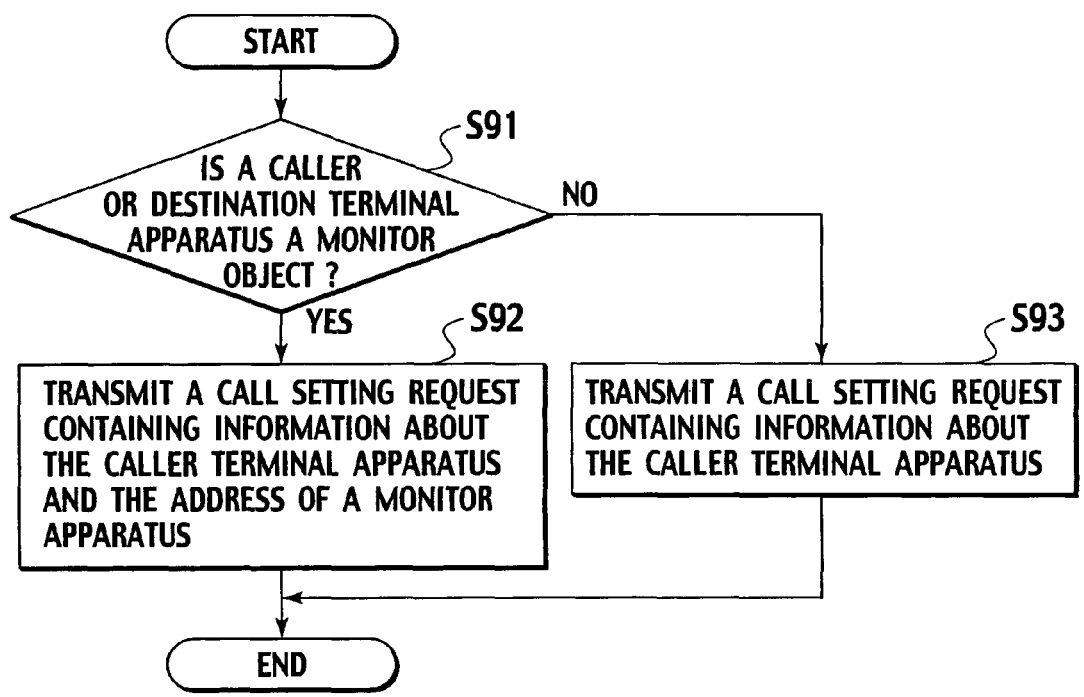
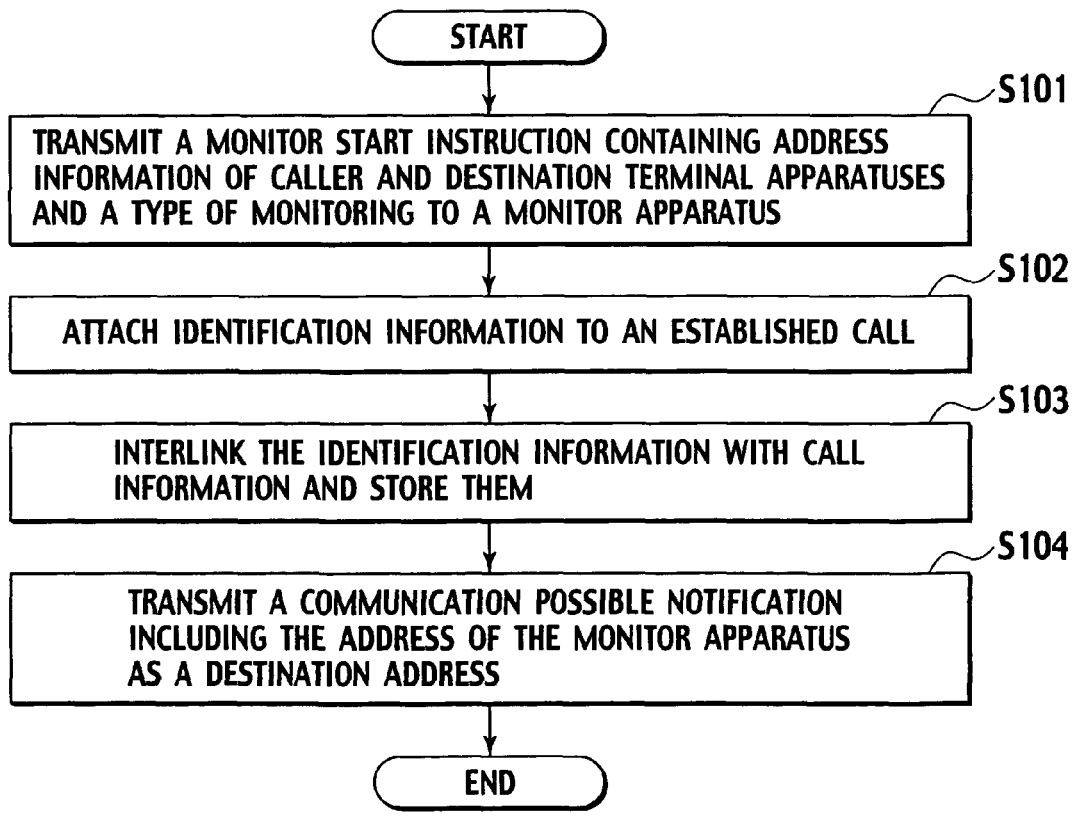

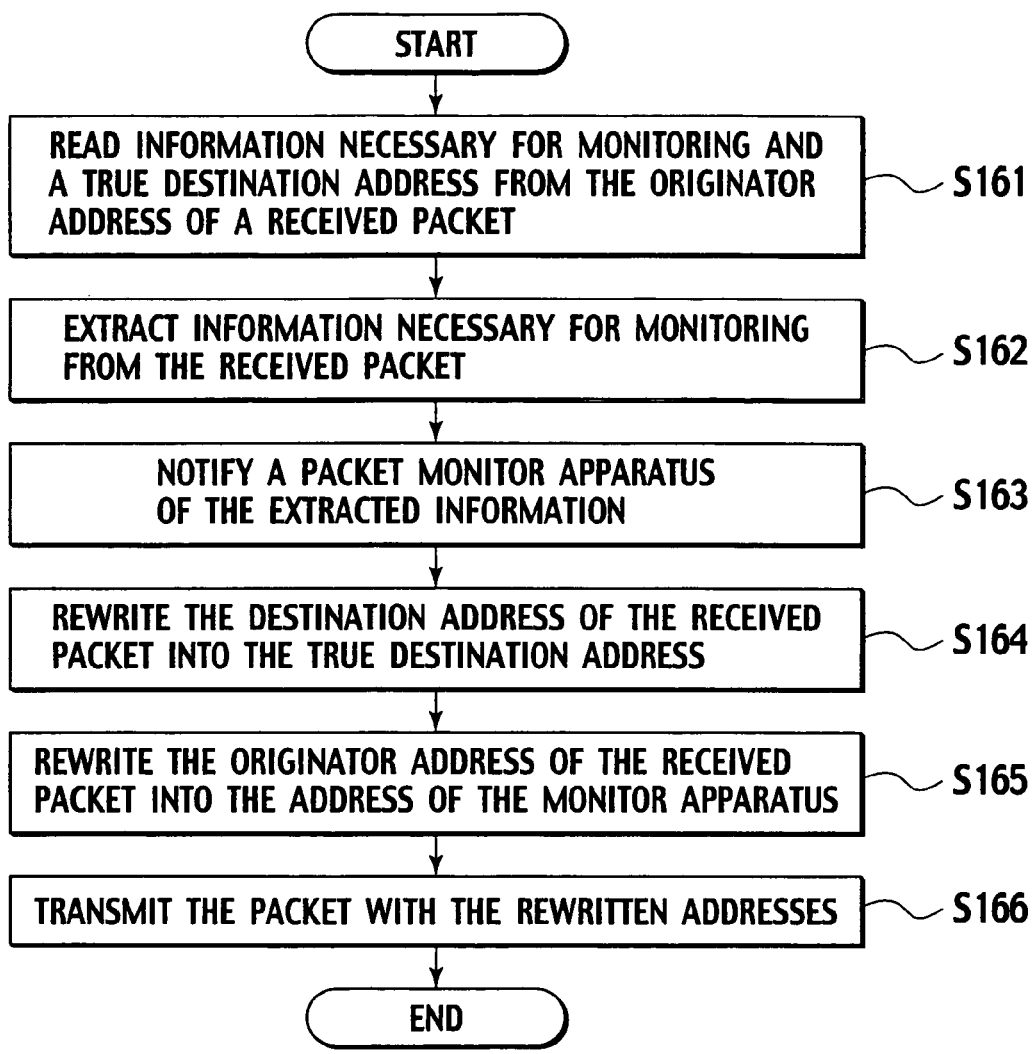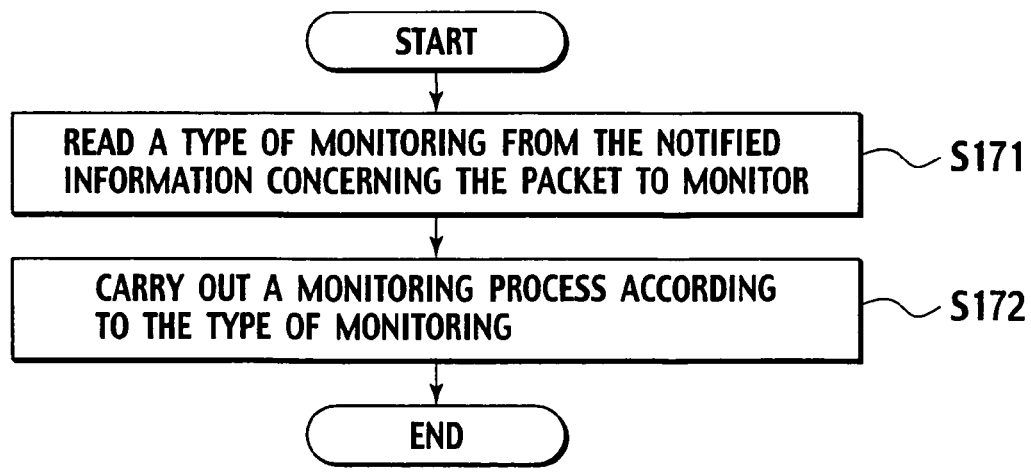

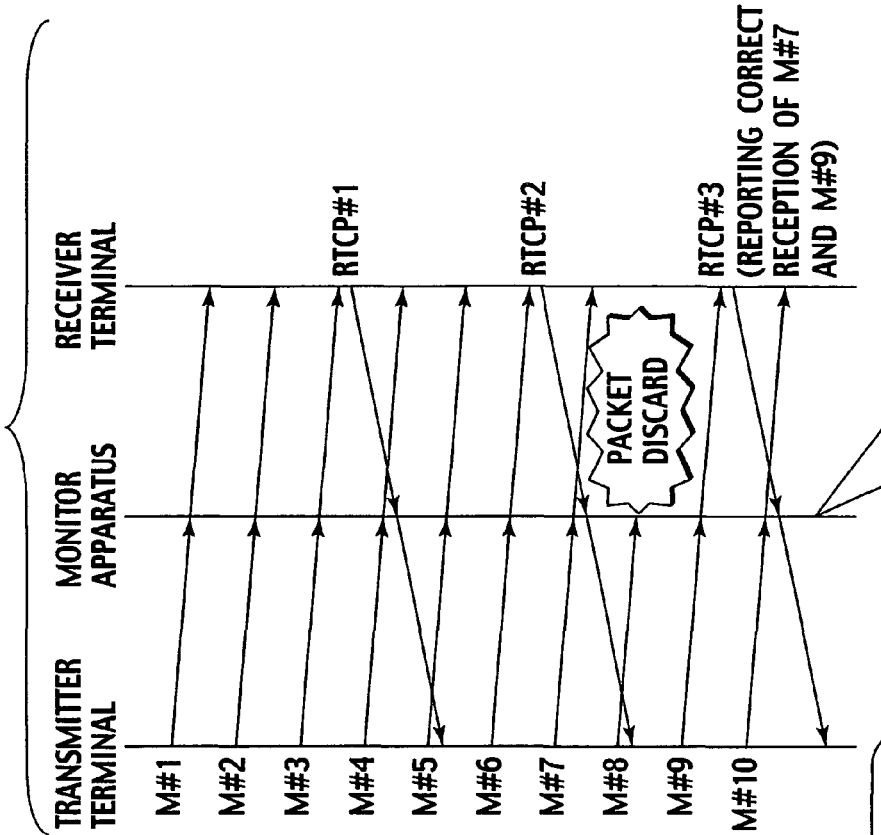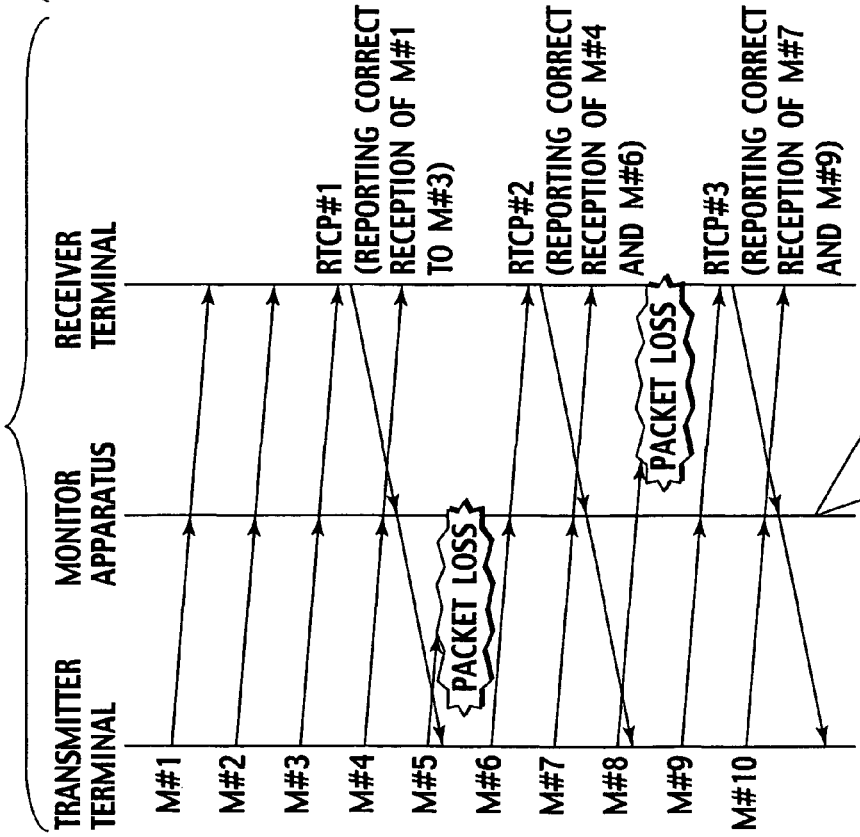

RETRY COMMUNICATION CONTROL METHOD AND SYSTEM

TECHNICAL FIELD

The present invention relates to a retry communication control method and system, a packet transfer possibility determination method, a packet transfer apparatus, a packet transfer system, a packet monitor method, a call control apparatus, a monitor apparatus, and programs. In particular, it relates to a retry communication control method and system, a packet transfer possibility determination method, a packet transfer apparatus, a packet transfer system, a packet monitor method, a call control apparatus, a monitor apparatus, and programs, all of them being based on a measurement-based call admission control system in which a terminal unit sends in a preparatory communication stage test packets in a trial class whose priority is lower than an originally intended priority, and according to a result of the trial communication, sends packets in a priority class of the originally intended priority or again in the trial class, thereby the terminal unit initiatively securing communication quality.

BACKGROUND ART

There is a conventional packet transfer system in which a terminal unit sends in a preparatory communication stage test packets in a trial class whose priority is lower than an originally intended priority, and according to a result thereof, determines whether or not communication is possible and communication quality is securable. This is called a terminal-initiative, measurement-based call admission control system. (For example, Viktoria Elek, Gunnar Karlsson, and Rovert Ronngren, "Admission control based on end-to-end measurements," Infocom 2000, U.S.A., IEEE, Mar. 29, 2000.)

Such terminal-initiative, measurement-based admission control employs a band securing communication method that provides a terminal with functions of state management and admission control for each communication ("communication" being synonymous with "flow" in this specification), to reduce processing load on a communication network, realize scalability, and save communication costs.

In such a system, test packets in a trial class are sent, and if a result thereof is failure, are again sent. In this case, each terminal in the system freely tries to resend packets without regard to a load condition at the moment. This produces an overflow of trial packets in an overload state and decreases a total throughput.

To cope with the total throughput decrease due to an increase in the quantity of packets to be communicated, no techniques have been proposed that can change a frequency of retry attempts according to a total throughput or synchronize retry timing with a total throughput to avoid useless collisions.

According to the terminal-initiative, measurement-based admission control, a packet transfer apparatus such as a router in a packet network employs priority control queues of Diffserv (differentiated services) type.

A typical example will be explained. A priority class is to transfer an original flow and a trial class is to transfer test packets. An upper limit is set on a total band of the priority and trial classes. The priority class is transferred preceding to the trial class. An assumption is made that a 100-Mbps transmission line has an upper limit total band of 40 Mbps and a flow of 35 Mbps of the priority class is already present in the transmission line. If there is a request for a new flow and if the requested flow is 5 Mbps or smaller, test packets for the request are transferable in the trial class. If a receiver terminal of the test packets notifies the sender terminal of acceptance, the sender terminal sets a new flow in the priority class. If the requested new flow is of over 5 Mbps, the test packets deteriorate during transmission and the sender terminal receives a faulty result from the receiver terminal. Then, the sender terminal does not start an originally intended transmission flow.

According to this architecture, a router restricts flow rates class by class without conducting flow-by-flow state management or admission determination. Only thereby, a communication system including terminals can achieve admission determination and guarantees the qualities of individual flows.

A typical example of architecture for monitoring and restricting flow rates is UPC of ATM. The UPC stipulates an ATM capacity to monitor a total band involving priority-class cells of CLP=0 and trial-class cells of CLP=1. When a violation occurs, this architecture simply discards even priority-class cells or changes priority-class cells into non-priority-class cells.

It is preferable, however, that a priority-class flow, once admitted, is continuously transferred as it is without being discarded, irrespective of a total band upper limit. There will be a particular case to immediately admit a flow in the priority class without regard to a total band upper limit or without conducting a test process in the trial class. Such a particular case will be explained in three examples.

A first example is a band variation in a variable band flow. Communication with variable flow rates causes a situation in which an actual communication band drops below a test packet communication band. For example, there is a transmission line with an upper limit of 40 Mbps, and the transmission line is presently transmitting ten 4-Mbps flows. If each flow drops to 3.5 Mbps, an actually used band total will be 35 Mbps to provide a margin of 5 Mbps. At this time, to establish a new flow of 5 Mbps, trial-class test packets are sent at 5 Mbps. Due to the margin in the band at this moment, a receiver terminal confirms a good quality, and therefore, a new priority-class flow is actually set. If the existing flows return each to the original communication band of 4 Mbps thereafter, the total band will be 45 Mbps. Then, an excess of 5 Mbps over the upper limit of 40 Mbps is discarded according to the related art. This affects all of the flows, to drastically decrease the throughput of a communication network as a whole. To avoid this, there is a technique of sending test packets in a band larger than an originally intended band. Namely, in the above example, test packets are sent at 6 Mbps that is greater than the originally intended flow rate of 5 Mbps, to avoid the problem. This technique of stabilizing the traffic of a whole network, however, greatly increases the number of test packets in each flow. In addition, the technique frequently fails to establish new flows, in particular, in access sections involving narrow bands. This technique, therefore, is inefficient. There is another technique that absorbs traffic variations by extending a measurement period of test packets. This, however, extends a time to determine the possibility of establishing a flow, and therefore, deteriorates serviceability.

It is desirable to continuously transfer a once-accepted priority-class flow at 5 Mbps without regard to flow-rate variations.

Second and third examples mentioned below relate to immediately admitting a priority-class flow without a trial-class test procedure or without regard to an upper limit total band.

The second example relates to a circuit that is forcibly switched to another. There is a system that employs a spare communication circuit for a circuit failure. In FIG. 18, two circuits are prepared between two packet transfer apparatuses 11*h* and 11*i*. It is supposed that load is distributed flow by flow to the circuits according to a certain method. If one (for example, the circuit A) of the circuits fails, a flow X that is unable to be transferred through the circuit A is entirely transferred to a spare circuit (for example, the circuit B). If the spare circuit (circuit B) has a flow Y before the failure, the sum of the flows exceeds the capacity of a single circuit, and therefore, discarding will occur without regard to the flows X and Y. In this example, it is assumed that each circuit has an upper limit of 40 Mbps and is transferring priority-class packets at 35 Mbps. If one of the circuits fails in this state, the priority-class packets are tried to be transferred at 70 Mbps through the normal circuit. Then, packets for 30 Mbps exceeding the upper limit of 40 Mbps are discarded. In this case, discarding a specific flow is impossible to carry out unless information on each flow is stored in routers. Accordingly, all of the flows are affected thereby to drastically decrease the throughput of a communication network as a whole.

In such a case, it is desirable to continuously transfer at least priority-class flows even if the capacity of a circuit is exceeded after switching a failed circuit to another. In this case, a priority-class flow in the failed circuit must continuously be transferred as it is in the new circuit without a test procedure using trial-class packets.

The third example relates to the handover of a mobile terminal. When carrying out the handover of a mobile terminal, the above-mentioned related art sends test packets to a new communication path serving as a handover target path and determines whether or not communication is possible. If the new communication path is in use by priority-class packets up to the upper limit thereof and if a new flow is handed over to the communication path, the handed-over flow will have an insufficient communication quality. In addition, like the two examples mentioned above, the communication qualities of the existing flows in the communication path are also badly affected.

It is desirable to immediately continue the handed-over flow in the priority class in the new communication path irrespective of the upper limit of the path.

Also, the terminal-initiative, measurement-based call admission control system of the related art mentioned above has problems mentioned below.

Namely, when the related art provides a public communication service in which a terminal can determine communication possibility in a perfectly autonomous and distributed manner by transferring test packets whose priority is lower than priority packets used in normal communication, there are some conditions. To control an actual flow rate, a call control apparatus must conduct primary admission determination including confirmation of service subscription, and an edge packet transfer apparatus must monitor the quantities of packets sent by users. In addition, the edge packet transfer apparatus must monitor a priority transition. The call control apparatus must always control the edge packet transfer apparatus, so that the edge packet transfer apparatus correctly performs the monitoring task. For this, the call control apparatus must frequently exchange control signals with the edge packet transfer apparatus. This results in increasing a necessary communication band and process load.

Packet rate monitoring by a conventional quality guaranteeing packet transfer system measures only a maximum flow rate. According to the terminal-initiative, measurement-based admission control, a reduction in communication amount or a communication suspension by a terminal is regarded as a communication availability in a communication network. Accordingly, a test packet sent from another terminal at this time is admitted as new communication.

Requirements for the conventional terminal-initiative, measurement-based call admission control system mentioned above will be explained.

The terminal-initiative, measurement-based call admission control system disclosed in the above-mentioned document has characteristics mentioned below, and therefore, requires the precise monitoring of terminal operation. Namely, a transmission side must send test packets to confirm a communication quality before establishing communication, and a reception side must correctly inform the transmission side of a packet receiving state. According to the packet receiving state, the transmission side must determine whether or not it is possible to send regular communication packets. The regular communication packets must be sent in a band that is narrower than that for the test packets but not too narrow. These conditions are essential for proper terminal operation. This communication system, therefore, must more precisely monitor terminal operation than a conventional network-initiative call admission control system. Whether or not the system properly functions with these conditions influences the operating cost of the system. The conventional terminal-initiative, measurement-based call admission control system, however, lacks the detailed examination of terminal monitoring.

When monitoring terminal operation by a monitor apparatus in a network according to the terminal-initiative, measurement-based call admission control system mentioned above, the monitor apparatus is unable to know a quality deterioration occurring in a section between the monitor apparatus and a receiver terminal. Even if a quality in the section is insufficient, the reception side can intentionally notify that the quality is good. Such a fraudulent operation must be detected.

The conventional terminal-initiative, measurement-based call admission control system sends in a preparatory communication stage test packets in a trial class whose priority is lower than an originally intended priority, and according to a result of the trial communication, sends packets in a priority class that is of the originally intended priority or again in the trial class. With this configuration, the system is unable to clarify the timing to charge a terminal apparatus for a fee.

The present invention has been made in consideration of one of the above-mentioned situations. An object of the present invention is to monitor packet traffic and the quality thereof and control packet transmission according to a result of the monitoring. For example, according to the monitoring result, control is made to send priority-class packets, or to retry trial-class packets, or to immediately stop trial-class packets, or to carry out synchronous transmission based on a probability, thereby preventing a traffic jam at terminals and improving a total throughput.

The present invention has been made in consideration of another of the above-mentioned situations. An object of the present invention is to cope with a packet that must immediately be admitted as a priority-class packet irrespective of a flow-rate limit and guarantee the quality of an admitted flow until the end of the flow.

The present invention has been made in consideration of still another of the above-mentioned situations. An object of the present invention is to carry out terminal-initiative, measurement-based admission control involving the transfer of test and priority packets at their respective priority levels without increasing process load while properly monitoring the type of service (ToS) of each packet and a flow rate of packets at low cost.

The present invention has been made in consideration of still another of the above-mentioned situations. An object of the present invention is to provide a monitor apparatus for monitoring terminal operation so that packets related to communication to be monitored are transferred through the monitor apparatus. This realizes centralized monitoring to reduce the facility cost of a packet transfer apparatus and the operation cost of a packet transfer system.

Another object of the present invention is to provide a monitor apparatus capable of separately monitoring a phase of determining admission possibility based on test packets and a phase of conducting proper communication, thereby expanding the number of communication sessions to be monitored and reducing the cost of the monitor apparatus per communication session.

Still another object of the present invention is to intentionally discard, by a monitor apparatus, test packets sent from a sender terminal, to monitor whether or not a receiver terminal correctly notifies the sender terminal of a reception result.

DISCLOSURE OF THE INVENTION

In order to accomplish the above-mentioned objects, the present invention provides a retry communication control method for a packet communication system that includes a plurality of packet transfer apparatuses each connected to a network and to at least one terminal apparatus and is capable of exchanging packets between the terminal apparatuses according to priority levels assigned to the packets. The method includes sending packets of a trial class for a predetermined period from a caller terminal apparatus, estimating whether or not the communication quality of the packets is sufficient, if it is sufficient, sending packets of a priority class thereafter, if it is insufficient, stopping to send packets of the trial class for a second predetermined period, after the second predetermined period, estimating according to a monitored traffic rate of packets of the priority class whether or not it is possible to send packets of the trial class, and if it is possible, again sending packets of the trial class for the predetermined period from the caller terminal apparatus.

In order to accomplish the above-mentioned objects, the present invention provides another retry communication control method for a packet communication system that includes a plurality of packet transfer apparatuses each connected to a network and to at least one terminal apparatus and is capable of exchanging packets between the terminal apparatuses according to priority levels assigned to the packets. The method includes sending packets of a trial class for a predetermined period from a caller terminal apparatus, estimating whether or not the communication quality of the packets is sufficient, if it is sufficient, sending packets of a priority class thereafter, if it is insufficient, stopping to send packets of the trial class for a second predetermined period, after the second predetermined period, estimating according to a communication quality level of the preceding trial-class packets whether or not it is possible to send packets of the trial class, and if it is possible, again sending packets of the trial class for the predetermined period from the caller terminal apparatus.

In order to accomplish the above-mentioned objects, the present invention provides still another retry communication control method for a packet communication system that includes a plurality of packet transfer apparatuses each connected to a network and to at least one terminal apparatus and is capable of exchanging packets between the terminal apparatuses according to priority levels assigned to the packets. The method includes sending packets of a trial class for a predetermined period from a caller terminal apparatus, estimating whether or not the communication quality of the packets is sufficient, if it is sufficient, sending packets of a priority class thereafter, if it is insufficient, stopping to send packets of the trial class for a second predetermined period, after the second predetermined period, estimating whether or not it is possible to send packets of the trial class according to an execution probability estimated from a communication quality of the preceding trial-class packets, and if it is possible, again sending packets of the trial class for the predetermined period from the caller terminal apparatus.

In order to accomplish the above-mentioned objects, the present invention provides still another retry communication control method for a packet communication system that includes a plurality of packet transfer apparatuses each connected to a network and to at least one terminal apparatus and is capable of exchanging packets between the terminal apparatuses according to priority levels assigned to the packets. The method includes starting to send packets of a trial class from a caller terminal apparatus, estimating from time to time whether or not the communication quality of the packets is sufficient, if it is sufficient and if the sufficient state continues for a predetermined period, sending packets of a priority class, if it becomes insufficient, immediately stopping to send packets of the trial class and continuously stopping to send packets of the trial class for a second predetermined period, after the second predetermined period, estimating whether or not it is possible to send packets of the trial class, and if it is possible, again sending packets of the trial class from the caller terminal apparatus.

According to a preferred embodiment of the present invention, the caller terminal apparatus is charged for a fee from the time when starting to transfer packets of the priority class.

In order to accomplish the above-mentioned objects, the present invention provides a retry communication control system including a plurality of packet transfer apparatuses each connected to a network and to at least one terminal apparatus, packets of a trial class being sent from one terminal apparatus to another to determine, according to the communication quality of the sent packets, whether or not it is possible to send packets of a priority class. The system comprises means for sending packets of the trial class for a predetermined period, means for estimating whether or not the communication quality of the packets is sufficient, means for sending, if it is sufficient, packets of the priority class thereafter, means for stopping, if it is insufficient, to send packets of the trial class for a second predetermined period, means for estimating, after the second predetermined period, according to a monitored traffic rate of packets of the priority class whether or not it is possible to send packets of the trial class, and means for again sending, if it is possible, packets of the trial class for the predetermined period from a caller terminal apparatus.

According to a preferred embodiment of the present invention, each of the terminal apparatuses has each of the means.

According to a preferred embodiment of the present invention, each of the packet transfer apparatuses has each of the means.

According to a preferred embodiment of the present invention, the system further comprises a call control apparatus to start charging a caller terminal apparatus for a fee when the transfer of packets of the priority class is started.

In order to accomplish the above-mentioned objects, the present invention provides another retry communication control system including a plurality of packet transfer apparatuses each connected to a network and to at least one terminal apparatus, packets of a trial class being sent from one terminal apparatus to another to determine, according to the communication quality of the sent packets, whether or not it is possible to send packets of a priority class. The system comprises means for sending packets of the trial class for a predetermined period, means for estimating whether or not the communication quality of the packets is sufficient, means for sending, if it is sufficient, packets of the priority class thereafter, means for stopping, if it is insufficient, to send packets of the trial class for a second predetermined period, means for estimating, after the second predetermined period, according to a communication quality level of the preceding trial-class packets whether or not it is possible to send packets of the trial class, and means for again sending, if it is possible, packets of the trial class for the predetermined period from a caller terminal apparatus.

According to a preferred embodiment of the present invention, each of the terminal apparatuses has each of the means.

According to a preferred embodiment of the present invention, each of the packet transfer apparatuses has each of the means.

According to a preferred embodiment of the present invention, the system further comprises a call control apparatus to start charging the caller terminal apparatus for a fee when the transfer of packets of the priority class is started.

In order to accomplish the above-mentioned objects, the present invention provides still another retry communication control system including a plurality of packet transfer apparatuses each connected to a network and to at least one terminal apparatus, packets of a trial class being sent from one terminal apparatus to another to determine, according to the communication quality of the sent packets, whether or not it is possible to send packets of a priority class. The system comprises means for sending packets of the trial class for a predetermined period, means for estimating whether or not the communication quality of the packets is sufficient, means for sending, if it is sufficient, packets of the priority class thereafter, means for stopping, if it is insufficient, to send packets of the trial class for a second predetermined period, means for estimating, after the second predetermined period, whether or not it is possible to send packets of the trial class according to an execution probability estimated from a communication quality of the preceding trial-class packets, and means for again sending, if it is possible, packets of the trial class for the predetermined period from a caller terminal apparatus.

According to a preferred embodiment of the present invention, each of the terminal apparatuses has each of the means.

According to a preferred embodiment of the present invention, each of the packet transfer apparatuses has each of the means.

According to a preferred embodiment of the present invention, the system further comprises a call control apparatus to start charging a caller terminal apparatus for a fee when the transfer of packets of the priority class is started.

In order to accomplish the above-mentioned objects, the present invention provides still another retry communication control system including a plurality of packet transfer apparatuses each connected to a network and to at least one terminal apparatus, packets of a trial class being sent from one terminal apparatus to another to determine, according to the communication quality of the sent packets, whether or not it is possible to send packets of a priority class. The system comprises means for starting to send packets of the trial class, means for estimating from time to time whether or not the communication quality of the packets is sufficient, means for sending, if the communication quality is sufficient and if the sufficient state continues for a predetermined period, packets of the priority class, means for immediately stopping, if the communication quality becomes insufficient, to send packets of the trial class and continuously stopping to send packets of the trial class for a second predetermined period, means for estimating, after the second predetermined period, whether or not it is possible to send packets of the trial class, and means for again sending, if it is possible, packets of the trial class from a caller terminal apparatus.

According to a preferred embodiment of the present invention, each of the terminal apparatuses has each of the means.

According to a preferred embodiment of the present invention, each of the packet transfer apparatuses has each of the means.

According to a preferred embodiment of the present invention, the system further comprises a call control apparatus to start charging a caller terminal apparatus for a fee when the transfer of packets of the priority class is started.

In order to accomplish the above-mentioned objects, the present invention provides a program installed in a packet communication system that includes a plurality of packet transfer apparatuses each connected to a network and to at least one terminal apparatus and is capable of exchanging packets between the terminal apparatuses according to priority levels assigned to the packets. The program makes the packet communication system execute a procedure of sending packets of a trial class for a predetermined period from a caller terminal apparatus, a procedure of estimating whether or not the communication quality of the packets is sufficient, a procedure of sending, if the communication quality is sufficient, packets of a priority class thereafter, a procedure of stopping, if the communication quality is insufficient, to send packets of the trial class for a second predetermined period, a procedure of estimating, after the second predetermined period, according to a monitored traffic rate of packets of the priority class whether or not it is possible to send packets of the trial class, and a procedure of again sending, if it is possible, packets of the trial class for the predetermined period from the caller terminal apparatus.

In order to accomplish the above-mentioned objects, the present invention provides a packet transfer possibility determination method for a packet transfer apparatus that transfers packets from a first terminal apparatus to a second terminal apparatus according to a packet transfer priority level, i.e., a trial class or a priority class specified by a transfer request from the first terminal apparatus. The method includes presetting a trial-class band capacity not to discard packets of the trial class, and if a total flow rate of packets of the trial and priority classes exceeds the trial-class band capacity, discarding packets of the trial class.

This invention discards packets of the trial class if a total flow rate of packets of the trial and priority classes exceeds the trial-class band capacity due to band variations or new transmission requests.

According to a preferred embodiment of the present invention, if a total flow rate of packets including packets of a new transmission request exceeds the trial-class band capacity, the new packets are discarded if they are of the trial class and are passed if they are of the priority class.

According to this embodiment, if a total flow rate of packets including packets of a new transmission request exceeds the trial-class band capacity, the new packets are passed if they are of the priority class.

A preferred embodiment of the present invention presets a priority-class band capacity not to discard packets of the priority class, and if a total flow rate of packets including packets of the priority class of a new transmission request exceeds the priority-class band capacity, discards the new packets of the priority class.

According to this embodiment, if a total flow rate of packets including packets of the priority class of a new transmission request exceeds the priority-class band capacity, discards the new packets even if they are of the priority class.

A preferred embodiment of the present invention transfers packets in communication-band-variable flows, and if a total flow rate exceeds the trial-class band capacity due to a communication band expansion, discard packets of the trial class.

This embodiment transfers packets in communication-band-variable flows, and if a total flow rate exceeds the trial-class band capacity due to a communication band expansion, discards packets if they are of the trial class.

A preferred embodiment of the present invention presets a priority-class band capacity not to discard packets of the priority class, and if a total flow rate exceeds the priority-class band capacity due to a communication band expansion, discards packets of the priority class.

This embodiment presets a priority-class band capacity not to discard packets of the priority class, and if a total flow rate exceeds the priority-class band capacity due to a communication band expansion, discards packets even if they are of the priority class.

According to a preferred embodiment of the present invention, a terminal apparatus makes a request of transmitting packets of the trial class, and according to a resultant transmission quality, makes a request of transmitting packets of the priority class or again of the trial class.

According to this embodiment, a terminal apparatus is applied to terminal-initiative, measurement-based admission control in which the terminal apparatus makes a request of transmitting packets of the trial class, and according to a resultant transmission quality, makes a request of transmitting packets of the priority class or again of the trial class.

In order to accomplish the above-mentioned objects, the present invention provides a packet transfer apparatus for transferring packets from a first terminal apparatus to a second terminal apparatus according to a packet transfer priority level, i.e., a trial class or a priority class specified by a transfer request from the first terminal apparatus. The packet transfer apparatus includes a storage part prestoring a trial-class band capacity not to discard packets of the trial class, and a flow-rate monitor part to discard packets of the trial class if a total flow rate of packets of the trial and priority classes exceeds the trial-class band capacity.

This invention discards packets of the trial class if a total flow rate of packets of the trial and priority classes exceeds the trial-class band capacity due to band variations or new transmission requests.

According to a preferred embodiment of the present invention, if a total flow rate of packets including packets of a new transmission request exceeds the trial-class band capacity, the flow-rate monitor part discards the new packets if they are of the trial class and passes them if they are of the priority class.

According to this embodiment, if a total flow rate of packets including packets of a new transmission request exceeds the trial-class band capacity, the new packets are passed if they are of the priority class.

According to a preferred embodiment of the present invention, the storage part prestores also a priority-class band capacity not to discard packets of the priority class, and if a total flow rate of packets including packets of the priority class of a new transmission request exceeds the priority-class band capacity, the flow-rate monitor part discards the new packets of the priority class.

According to this embodiment, if a total flow rate of packets including packets of the priority class of a new transmission request exceeds the priority-class band capacity, the new packets are discarded even if they are of the priority class.

According to a preferred embodiment of the present invention, packets are transferred in communication-band-variable flows, and if a total flow rate exceeds the trial-class band capacity due to a communication band expansion, the flow-rate monitor part discards packets of the trial class.

According to this embodiment, packets are transferred in communication-band-variable flows, and if a total flow rate exceeds the trial-class band capacity due to a communication band expansion, packets are discarded if they are of the trial class.

According to a preferred embodiment of the present invention, the storage part prestores also a priority-class band capacity not to discard packets of the priority class, and if a total flow rate exceeds the priority-class band capacity due to a communication band expansion, the flow-rate monitor part discards packets of the priority class.

According to this embodiment, packets are transferred in communication-band-variable flows, and if a total flow rate exceeds the priority-class band capacity due to a communication band expansion, packets are discarded even if they are of the priority class.

According to a preferred embodiment of the present invention, there are arranged a plurality of circuits each capable of transferring packets of the priority and trial classes and being monitored by the flow-rate monitor part. If at least one of the circuits fails so that all flows of packets in the failed circuit are switched to at least a second of the circuits and if a total flow rate of packets of the trial and priority classes in the second circuit exceeds the trial-class band capacity, the flow-rate monitor part discards packets of the trial class.

According to this embodiment, if at least one of the circuits fails, all flows of packets in the failed circuit are switched to at least a second of the circuits.

According to a preferred embodiment of the present invention, the terminal apparatus is a mobile terminal apparatus that transmits packets by radio, and if a total flow rate of packets of the trial and priority classes exceeds the trial-class band capacity due to handover caused by a movement of the mobile terminal apparatus, the flow-rate monitor part discards packets of the trial class.

According to this embodiment, the terminal apparatus is a mobile terminal apparatus that transmits packets by radio, and handover is caused by a movement of the mobile terminal apparatus.

In order to accomplish the above-mentioned objects, the present invention provides a program installed in a packet transfer apparatus for transferring packets from a first terminal apparatus to a second terminal apparatus according to a packet transfer priority level, i.e., a trial class or a priority class specified by a transfer request from the first terminal apparatus. The program makes the packet transfer apparatus execute a procedure of presetting a trial-class band capacity not to discard packets of the trial class and a procedure of discarding packets of the trial class if a total flow rate of packets of the trial and priority classes exceeds the trial-class band capacity.

According to this invention, packets of the trial class are discarded if a total flow rate of packets of the trial and priority classes exceeds the trial-class band capacity due to band variations or new transmission requests.

In order to accomplish the above-mentioned objects, the present invention provides a packet transfer system comprising a plurality of terminal apparatuses that make a call setting request in a trial class as a packet transfer priority level, and according to a resultant communication quality, make a call setting request in a priority class or again in the trial class, a plurality of packet transfer apparatuses that are interposed between the terminal apparatuses to transfer packets at their respective priority levels, and a call control apparatus that manages the state of each call originated from each terminal apparatus. The call control apparatus prestores contract information that includes at least a priority-level-transition pattern available for the terminal apparatuses controlled by the call control apparatus, and when a call is established, notifies the packet transfer apparatuses accommodating the call conducting terminal apparatuses of monitor information that includes information to identify packets exchanged in connection with the call and information that is used to determine whether or not the packets exchanged in connection with the call conform to the contract information and at least includes an identifier representative of the priority-level-transition pattern. The packet transfer apparatuses receive the monitor information, estimate, according to the identifier, a priority level transition of packets from the terminal apparatuses concerning the call, and determine whether or not a type of service related to the priority level of each packet conforms to the contract information.

This invention conducts terminal-initiative, measurement-based admission control that makes a call setting request in a trial class as a packet transfer priority level, and according to a resultant communication quality, makes a call setting request in a priority class or again in the trial class. The call control apparatus issues a monitor instruction with an identifier representative of a priority-level-transition pattern to the packet transfer apparatuses. According to the identifier, the packet transfer apparatuses estimate a priority level transition of packets sent from terminal apparatuses in connection with a call and monitor the packets.

According to a preferred embodiment of the present invention, the packet transfer apparatus, if determines that the type of service does not conform to the contract information, notifies the call control apparatus of the same, and the call control apparatus cuts the communication related to the call.

According to this embodiment, if a type of service of a call does not conform to contract information, the call control apparatus cuts the communication related to the call.

According to a preferred embodiment of the present invention, the packet transfer apparatus, if determines that the type of service of a packet does not conform to the contract information, discards the packet.

This embodiment discards packets that violate the contract, and therefore, transfers only packets that conform to the contract information.

According to a preferred embodiment of the present invention, the packet transfer apparatus, if determines that the type of service of a packet does not conform to the contract information, transfers the packet at a priority level corresponding to a type of service conforming to the contract information.

This embodiment changes a packet that violates the contract into a packet that conforms to the contract information. As a result, all packets will conform to the contract information.

According to a preferred embodiment of the present invention, the call control apparatus determines whether or not a type of service requested by a call setting request from the terminal apparatus conforms to the contract information, and if it does not conform to the contract information, rejects the call setting request.

This embodiment rejects a call setting request, if it does not conform to the contract information. Namely, a contract violating call is rejected before packets are sent.

In order to accomplish the above-mentioned objects, the present invention provides another packet transfer system including a plurality of terminal apparatuses each making a call setting request for transferring packets with a type of service corresponding to one of a plurality of priority levels, a plurality of packet transfer apparatuses interposed between the terminal apparatuses to transfer packets from the terminal apparatuses at their respective priority levels, and a call control apparatus managing the state of a call originated from each terminal apparatus. The call control apparatus notifies, when a call is established, the packet transfer apparatuses accommodating the call conducting terminal apparatuses of monitor information that includes information to identify packets exchanged in connection with the call and information to determine whether or not the packets exchanged in connection with the call conform to the contract information. The packet transfer apparatuses have a preset threshold value for a minimum flow rate of packets, monitor, upon receiving the monitor information, a flow rate of packets sent from the terminal apparatuses concerning the call, and if the flow rate is below the threshold value, notify the call control apparatus of the same. The call control apparatus cuts the communication related to the call upon receiving the notification that the flow rate is below the threshold value.

This invention establishes a call, starts packet communication for the call, and if a flow rates of packets becomes lower than the threshold value, cuts the communication related to the call.

According to a preferred embodiment of the present invention, the packet transfer apparatus has a preset upper limit threshold value for a maximum flow rate of packets, and if a flow rate exceeds the upper limit threshold value, notifies the call control apparatus of the same, and the call control apparatus cuts the communication related to the call when receiving the notification that the flow rate is above the upper limit threshold value.

This embodiment cuts the communication of a call if a flow rate of packets for the call exceeds the upper limit threshold value. This embodiment can also monitor the case when a flow rate of packets becomes below the lower threshold value.

According to a preferred embodiment of the present invention, the packet transfer apparatus monitors a flow rate of packets according to the size of a token bucket and sets, as the threshold value for the minimum flow rate of packets, a value greater than an initial value of a token counter.

This embodiment monitors a flow rate of packets according to the token counter of the token bucket.

In order to accomplish the above-mentioned objects, the present invention provides a packet monitor method for a packet transfer system that makes a call setting request in a trial class as a packet transfer priority level, and according to a resultant communication quality, makes a call setting request in a priority class or again in the trial class, to transfer packets. The method includes presetting contract information that includes at least a priority-level-transition pattern available for each user, after a call is established, estimating a priority level transition of packets to be transferred according to monitor information that includes information to identify packets exchanged in connection with the call and information that is used to determine whether or not the packets exchanged in connection with the call conform to the contract information and at least includes an identifier representative of the priority-level-transition pattern, and determining whether or not a type of service related to the priority level of a given packet conforms to the contract information.

This invention conducts terminal-initiative, measurement-based admission control that makes a call setting request in a trial class as a packet transfer priority level, and according to a resultant communication quality, makes a call setting request in a priority class or again in the trial class. The call control apparatus issues a monitor instruction to the packet transfer apparatuses with an identifier representing a priority-level-transition pattern. According to the identifier, the packet transfer apparatuses estimate a priority level transition of packets sent from terminal apparatuses communicating with each other based on a call and monitor the packets.

In order to accomplish the above-mentioned objects, the present invention provides another packet monitor method for a packet transfer system that makes a call setting request for transferring packets with a type of service corresponding to one of a plurality of priority levels and transfers packets at each priority level. The method includes, after a call is established, monitoring a flow rate of packets related to the call, and if the flow rate is below a preset threshold value for a minimum flow rate of packets, cutting communication related to the call.

This invention establishes a call, starts packet communication for the call, and cuts the communication for the call if a flow rate of packets becomes lower than the threshold value.

In order to accomplish the above-mentioned objects, the present invention provides a call control apparatus for receiving a call setting request in a trial class as a packet transfer priority level, and according to a resultant communication quality, receiving a call setting request in a priority class or again in the trial class. The call control apparatus comprises a contract information storage part to prestore contract information that includes at least a priority-level-transition pattern available for accommodating terminal apparatuses, a contract information determination part to determine, at a call setting request, whether or not the type of service of a call related to the call setting request conforms to the contract information, a monitor information notify part to notify, when a call is established, packet transfer apparatuses accommodating terminal apparatuses that conduct the call of monitor information that includes information to identify packets exchanged in connection with the call and information that is used to determine whether or not the packets exchanged in connection with the call conform to the contract information and at least includes an identifier representative of the priority-level-transition pattern, and a call state management part to cut communication related to the call upon receiving notification from the packet transfer apparatus that the type of service of a given packet does not conform to the contract information.

In order to accomplish the above-mentioned objects, the present invention provides a packet transfer apparatus for transferring a packet at a priority level corresponding to a type of service of the packet. The packet transfer apparatus includes a class transition monitor part to receive monitor information that includes information to identify packets exchanged in connection with a call and information that is used to determine whether or not the packets exchanged in connection with the call conform to the contract information and at least includes an identifier representative of a priority-level-transition pattern, estimate, according to the identifier, a priority level transition of packets from the terminal apparatus concerning the call, and determine whether or not the type of service related to the priority level of each packet conforms to the contract information, a packet discard part to discard the packet if it is determined that the type of service does not conform to the contract information, and a packet rewrite part to rewrite the type of service into that conforming to the contract information if it is determined that the type of service does not conform to the contract information.

In order to accomplish the above-mentioned objects, the present invention provides another packet transfer apparatus for transferring a packet at a priority level corresponding to a type of service of the packet. The packet transfer apparatus includes a packet-flow-rate monitor part having a preset threshold value for a minimum flow rate of packets, to monitor, upon receiving monitor information that includes information to identify packets exchanged in connection with a call and information to determine whether or not the packets exchanged in connection with the call conform to contract information, whether or not a flow rate of packets sent from terminal apparatuses concerning the call is below the threshold value.

In order to accomplish the above-mentioned objects, the present invention provides a packet transfer system including a plurality of packet transfer apparatuses interposed between a plurality of terminal apparatuses to transfer packets at their respective priority levels. The packet transfer system includes a monitor apparatus to monitor packets and a call control apparatus to control the state of a call between the terminal apparatuses, determine whether or not packets related to the call must be monitored, and if the packets must be monitored, pass the packets through the monitor apparatus.

This invention transfers packets exchanged for a call to be monitored, through the monitor apparatus. Accordingly, the monitor function is centralized in the monitor apparatus.

According to a preferred embodiment of the present invention, the call control apparatus, if determines to monitor packets related to the call, notifies the terminal apparatuses that exchange packets related to the call of an address of the monitor apparatus as a destination address and transmits a monitor start instruction including addresses of the terminal apparatuses that exchange packets related to the call to the monitor apparatus. The monitor apparatus, upon receiving the monitor start instruction, monitors each packet whose originator address is a first of the terminal apparatus addresses contained in the monitor start instruction, rewrites a destination address of the packet into a second of the terminal apparatus addresses contained in the monitor start instruction, and transmits the packet.

According to this embodiment, the address of the monitor apparatus is notified as a destination address to the terminal apparatuses that conduct communication with a call to be monitored. Packets sent from the terminal apparatuses are transferred to the monitor apparatus, which rewrites the destination and originator addresses of each packet so that the packet is transferred to a true destination terminal apparatus. In this way, packets exchanged between terminal apparatuses for a call to be monitored are passed through the monitor apparatus.

In order to accomplish the above-mentioned objects, the present invention provides another packet transfer system including a plurality of packet transfer apparatuses interposed between a plurality of terminal apparatuses to transfer packets at their respective priority levels from a caller terminal apparatus to a destination terminal apparatus. The packet transfer system includes a monitor apparatus to monitor packets and a call control apparatus to control the state of a call between the terminal apparatuses and send a packet that must be transferred and monitored to the monitor apparatus.

This invention controls packets to be monitored such that the packets reach the monitor apparatus. As a result, the monitor function is centralized in the monitor apparatus.

According to a preferred embodiment of the present invention, the call control apparatus, if there is a packet to be transferred and monitored, notifies each of the packet transfer apparatuses accommodating the terminal apparatuses related to the communication of the packet to be monitored of addresses of the terminal apparatuses related to the communication of the packet to be monitored and transmits a monitor start instruction containing the addresses of the terminal apparatuses related to the communication of the packet to be monitored to the monitor apparatus. The packet transfer apparatuses receive the addresses of the terminal apparatuses related to the communication of the packet to be monitored, rewrite a destination address of the packet whose originator address is in the notified addresses into an address of the monitor apparatus, and transmit the packet. The monitor apparatus receives the monitor start instruction, monitors the packet whose originator address is in the terminal apparatus addresses contained in the monitor start instruction, rewrites the destination address of the packet into the address of the destination terminal apparatus contained in the monitor start instruction, and transmits the packet.

According to this embodiment, an edge packet transfer apparatus rewrites the destination address of a packet to be monitored into the address of the monitor apparatus and transfers the packet to the monitor apparatus. The monitor apparatus rewrites the destination address of the packet into the address of a true destination terminal apparatus and transfers the packet to the terminal apparatus. In this way, packets to be monitored are exchanged via the monitor apparatus.

According to a preferred embodiment of the present invention, the packet transfer apparatuses transfer packets according to MPLS and have a preset LSP for passing through the monitor apparatus between all terminal apparatuses. The call control apparatus, when monitoring transferred packets, notifies the packet transfer apparatuses accommodating the terminal apparatuses related to the communication of monitored packets of addresses of the terminal apparatuses related to the communication of monitored packets. The packet transfer apparatuses, upon receiving the notification of the addresses of the terminal apparatuses related to the communication of monitored packets, set an LSP label for passing through the monitor apparatus as an MPLS label of each monitored packet to be sent from the terminal apparatus having the notified address to a destination terminal apparatus.

According to this embodiment, an edge packet transfer apparatus selects an LSP label for passing through the monitor apparatus as the label of a packet to be monitored. Accordingly, packets to be monitored are exchanged via the monitor apparatus.

According to a preferred embodiment of the present invention, the monitor apparatus is connected so as to obtain a packet from a path between two predetermined packet transfer apparatuses, the packet transfer apparatuses transfer packets according to MPLS, and the packet transfer apparatuses have an LSP between all terminal apparatuses. The preset LSP includes a path between the two predetermined packet transfer apparatuses. The call control apparatus, when monitoring transferred packets, notifies the packet transfer apparatuses accommodating the terminal apparatuses related to the communication of monitored packets of addresses of the terminal apparatuses related to the communication of monitored packets. The packet transfer apparatuses, upon receiving the notification of the addresses of the terminal apparatuses related to the communication of monitored packets, set an LSP label for passing through the path between the two packet transfer apparatuses as an MPLS label of each monitored packet to be sent from the terminal apparatus having the notified address to a destination terminal apparatus.

According to this embodiment, an edge packet transfer apparatus selects an LSP label for passing through the path between the two specific packet transfer apparatuses as the label of a packet to be monitored. The path is connected to the monitor apparatus so that the monitor apparatus can obtain packets from the path. Accordingly, packets to be monitored reach the monitor apparatus.

According to a preferred embodiment of the present invention, each packet transfer apparatus has an output port corresponding to the monitor apparatus. The call control apparatus, when monitoring transferred packets, notifies each packet transfer apparatus accommodating a terminal apparatus related to the communication of monitored packets of addresses of terminal apparatuses related to the communication of monitored packets. The packet transfer apparatus, upon receiving the notification of the addresses of the terminal apparatuses related to the communication of monitored packets, copies a packet passing through a port corresponding to the address of the terminal apparatus related to the communication of monitored packets to the output port corresponding to the monitor apparatus.

According to this embodiment, an edge packet transfer apparatus copies a packet passing through a port that corresponds to the address of a terminal apparatus related to the communication of packets to be monitored, to an output port corresponding to the monitor apparatus. Accordingly, packets to be monitored reach the monitor apparatus.

A preferred embodiment of the present invention further includes input means capable of identifying the packet to be monitored.

This embodiment can externally specify packets to be monitored.

According to a preferred embodiment of the present invention, an instruction to specify a specific call is entered in the input means to identify the packets to be monitored.

This embodiment can specify packets to be monitored call by call.

According to a preferred embodiment of the present invention, an instruction to specify a specific terminal apparatus is entered in the input means to identify the packets to be monitored.

This embodiment can specify packets to be monitored terminal apparatus by terminal apparatus.

According to a preferred embodiment of the present invention, an instruction to specify a specific user is entered in the input means to identify the packets to be monitored.

This embodiment can specify packets to be monitored user by user.

According to a preferred embodiment of the present invention, the call control apparatus has a communication history management part to record monitored results for each terminal apparatus and for each user, and when a new communication request is made by a terminal apparatus or by a user, identifies the packets to be monitored according to the monitored results.

This embodiment can refer to the history of monitored results and select a terminal apparatus to be monitored sequentially from terminal apparatuses according to abnormal operation possibilities.

According to a preferred embodiment of the present invention, the call control apparatus, when a new communication request is made, identifies the packets to be monitored according to a communication attribute written in a call control signal.

This embodiment can select a call to be monitored sequentially from calls having, for example, large requested communication bands, without regard to abnormal operation possibilities.

According to a preferred embodiment of the present invention, the call control apparatus, when a new communication request is made, identifies the packets to be monitored according to routed apparatus information written in a call setting signal.

This embodiment can reduce the monitoring possibility of communication routed through, for example, a reliable home gateway having a monitor function.

According to a preferred embodiment of the present invention, the monitor apparatus has a test packet monitor part that monitors only test packets of a trial class.

This embodiment is applied to a terminal-initiative communication system that estimates a communication possibility with the use of test packets. The embodiment employs the test packet monitor part to only monitor, for example, the test packets. This improves the monitoring efficiency of the monitor apparatus.

According to a preferred embodiment of the present invention, the monitor apparatus, when transferring a received packet to a destination terminal apparatus, intentionally discards the received packet, and if receiving a report that the discarded packet has correctly been received, determines that the destination terminal apparatus is a maliciously operating terminal apparatus.

This embodiment can detect a terminal apparatus that falsely reports abnormal reception although the reception is normal.

In order to accomplish the above-mentioned objects, the present invention provides a packet monitor method for a packet transfer system including a plurality of packet transfer apparatuses interposed between a plurality of terminal apparatuses to transfer packets at their respective priority levels, a call control apparatus to control the state of a call between the terminal apparatuses, and a monitor apparatus to monitor the packets. According to the method, the call control apparatus determines, upon receiving a call setting request, whether or not packets for the call must be monitored. The call control apparatus, if determines to monitor the packets, notifies the terminal apparatuses that exchange packets for the call of an address of the monitor apparatus as a destination address. The call control apparatus transmits to the monitor apparatus a monitor start instruction including addresses of the terminal apparatuses that exchange packets for the call. The monitor apparatus, upon receiving the monitor start instruction, monitors each packet whose originator address is a first of the terminal apparatus addresses contained in the monitor start instruction. The monitor apparatus rewrites a destination address of the packet into a second of the terminal apparatus addresses contained in the monitor start instruction and transmits the packet.

This invention notifies terminal apparatuses that communicate with each other based on a call to be monitored of the address of the monitor apparatus as a destination address. Packets from the terminal apparatuses are transferred to the monitor apparatus. The monitor apparatus rewrites the destination and originator addresses of each packet and transfers the packet to a true destination terminal apparatus. In this way, this invention transfers packets for a call to be monitored through the monitor apparatus.

In order to accomplish the above-mentioned objects, the present invention provides another packet monitor method for a packet transfer system including a plurality of packet transfer apparatuses interposed between a plurality of terminal apparatuses to transfer packets at their respective priority levels, a call control apparatus to control the state of a call between the terminal apparatuses, and a monitor apparatus to monitor the packets. According to the method, the call control apparatus, if monitoring transferred packets, notifies the packet transfer apparatuses accommodating the terminal apparatuses that exchange the packets to be monitored of addresses of the terminal apparatuses that exchange the packets to be monitored. The call control apparatus transmits to the monitor apparatus a monitor start instruction containing the addresses of the terminal apparatuses that exchange the packets to be monitored. The packet transfer apparatuses, after receiving the addresses of the terminal apparatuses that exchange the packets to be monitored, rewrites a destination address of each packet whose originator address is in the notified addresses into the address of the monitor apparatus and transmits the packet. The monitor apparatus, after receiving the monitor start instruction, monitors each packet whose originator address is in the terminal apparatus addresses contained in the monitor start instruction. The monitor apparatus rewrites the destination address of the packet into the address of the destination terminal apparatus contained in the monitor start instruction and transmits the packet.

According to this invention, an edge packet transfer apparatus rewrites the destination address of a packet to be monitored into the address of the monitor apparatus and transfers the packet to the monitor apparatus. The monitor apparatus rewrites the destination address of the packet so that the packet is transferred to a true destination terminal apparatus. In this way, packets to be monitored are transferred through the monitor apparatus.

In order to accomplish the above-mentioned objects, the present invention provides still another packet monitor method for a packet transfer system including a plurality of packet transfer apparatuses interposed between a plurality of terminal apparatuses, transferring packets according to MPLS, and having a preset LSP that makes all terminal apparatuses pass through a monitor apparatus, a call control apparatus to manage the state of a call between the terminal apparatuses, and the monitor apparatus to monitor packets. According to the method, the call control apparatus, when monitoring transferred packets, notifies the packet transfer apparatuses accommodating the terminal apparatuses that exchange the packets to be monitored of addresses of the terminal apparatuses that exchange the packets to be monitored. The packet transfer apparatuses, after receiving the notification of the addresses of the terminal apparatuses that exchange the packets to be monitored, sets an LSP label for passing through the monitor apparatus as an MPLS label of a packet to be sent from the terminal apparatus having the notified address to a destination terminal apparatus.

According to this invention, an edge packet transfer apparatus selects an LSP label for passing through the monitor apparatus as the label of a packet to be monitored. As a result, packets to be monitored are exchanged through the monitor apparatus.

In order to accomplish the above-mentioned objects, the present invention provides still another packet monitor method for a packet transfer system including a plurality of packet transfer apparatuses interposed between a plurality of terminal apparatuses, transferring packets according to MPLS, and having a preset LSP for passing through a monitor apparatus between all terminal apparatuses, a call control apparatus to manage the state of a call between the terminal apparatuses, and the monitor apparatus connected so as to obtain packets from a path between two predetermined packet transfer apparatuses and monitoring the packets. According to the method, the call control apparatus, when monitoring transferred packets, notifies the packet transfer apparatuses accommodating the terminal apparatuses that exchange the packets to be monitored of addresses of the terminal apparatuses that exchange the packets to be monitored. The packet transfer apparatuses, after receiving the notification of the addresses of the terminal apparatuses that exchange the packets to be monitored, sets an LSP label for passing through the path between the two predetermined packet transfer apparatuses as an MPLS label of each packet to be sent from the terminal apparatus having the notified address to a destination terminal apparatus.

According to this invention, an edge packet transfer apparatus selects an LSP label for passing through the path between the two specific packet transfer apparatuses as a label of a packet to be monitored. The path is connected to the monitor apparatus so that the monitor apparatus can obtain packets from the path. As a result, packets to be monitored reach the monitor apparatus.

In order to accomplish the above-mentioned objects, the present invention provides still another packet monitor method for a packet transfer system including a monitor apparatus to monitor packets, a plurality of packet transfer apparatuses interposed between a plurality of terminal apparatuses, having an output port corresponding to the monitor apparatus, and transferring packets at their respective priority levels, and a call control apparatus to manage the state of a call between the terminal apparatuses. According to the method, the call control apparatus, when monitoring transferred packets, notifies the packet transfer apparatuses accommodating the terminal apparatuses that exchange the packets to be monitored of addresses of the terminal apparatuses that exchange the packets to be monitored. The packet transfer apparatuses, after receiving the notification of the addresses of the terminal apparatuses that exchange the packets to be monitored, copy each packet passing through a port corresponding to one of the addresses of the terminal apparatuses that exchange the packets to be monitored to the output port corresponding to the monitor apparatus.

According to this invention, an edge packet transfer apparatus copies a packet passing through a port corresponding to one of the addresses of terminal apparatuses that exchange packets to be monitored to an output port corresponding to the monitor apparatus. As a result, packets to be monitored reach the monitor apparatus.

In order to accomplish the above-mentioned objects, the present invention provides a call control apparatus including a call state management part to manage the state of a call between terminal apparatuses, a monitor object determination part to determine, when receiving a request for setting a call, whether or not packets related to the call must be monitored and whether or not the call must be monitored, an address notification part to notify, when it is determined that packets related to the call must be monitored, the terminal apparatuses that exchange packets related to the call of an address of a monitor apparatus as a destination address, and a monitor communication part to transmit to the monitor apparatus a monitor start instruction containing addresses of the terminal apparatuses that exchange packets related to the call.

In order to accomplish the above-mentioned objects, the present invention provides another call control apparatus including a call state management part to manage the state of a call between terminal apparatuses, an address notification part to notify, when it is determined that packets exchanged between the terminal apparatuses must be monitored, packet transfer apparatuses accommodating the terminal apparatuses that exchange the packets to be monitored of addresses of the terminal apparatuses that exchange the packets to be monitored, and a monitor communication part to transmit to a monitor apparatus a monitor start instruction containing the addresses of the terminal apparatuses that exchange the packets to be monitored.

In order to accomplish the above-mentioned objects, the present invention provides a packet transfer apparatus including a packet transfer part to transfer a packet at a priority level from a caller terminal apparatus to a destination terminal apparatus, and a packet rewrite part to rewrite, upon receiving a notification of addresses of terminal apparatuses that exchange packets to be monitored, a destination address of a packet whose originator address is in the notified addresses into an address of a monitor apparatus.

In order to accomplish the above-mentioned objects, the present invention provides another packet transfer apparatus including a packet transfer part to transfer a packet at a priority level from a caller terminal apparatus to a destination terminal apparatus, and a label rewrite part to set, upon receiving a notification of addresses of terminal apparatuses that exchange packets to be monitored, an LSP label for passing through a monitor apparatus as an MPLS label of a packet to be sent from a terminal apparatus whose address is in the notified addresses to a destination terminal apparatus.

In order to accomplish the above-mentioned objects, the present invention provides a monitor apparatus including a packet monitor part to monitor, upon receiving a monitor start instruction, each packet whose originator address is a terminal apparatus address contained in the monitor start instruction, and a packet rewrite part to rewrite a destination address of the monitored packet into an address of a destination terminal apparatus that is in the monitor start instruction and relates to the communication of the monitored packet.

BRIEF DESCRIPTION OF THE DRAWINGS

FIG. 21 is a view showing priority levels of packets in the packet transfer system;

FIG. 25 is a view showing a general configuration of a first embodiment of a packet transfer system according to the present invention employing a single dedicated monitor apparatus;

FIG. 26 is a flowchart showing a procedure carried out in the packet transfer system of the first embodiment when a call setting request is received;

FIG. 27 is a flowchart showing a procedure carried out in the packet transfer system of the first embodiment when a call is established;

FIG. 39 is a flowchart showing a procedure carried out in the monitor packet rewrite unit;

FIG. 40 is a flowchart showing a procedure carried out in the packet monitor unit; and FIGS. 41A and 41B are views explaining monitoring procedures carried out in the monitor apparatus.

BEST MODE FOR CARRYING OUT THE INVENTION

The embodiments of the present invention will be explained in detail with reference to the drawings.

Figure 1:
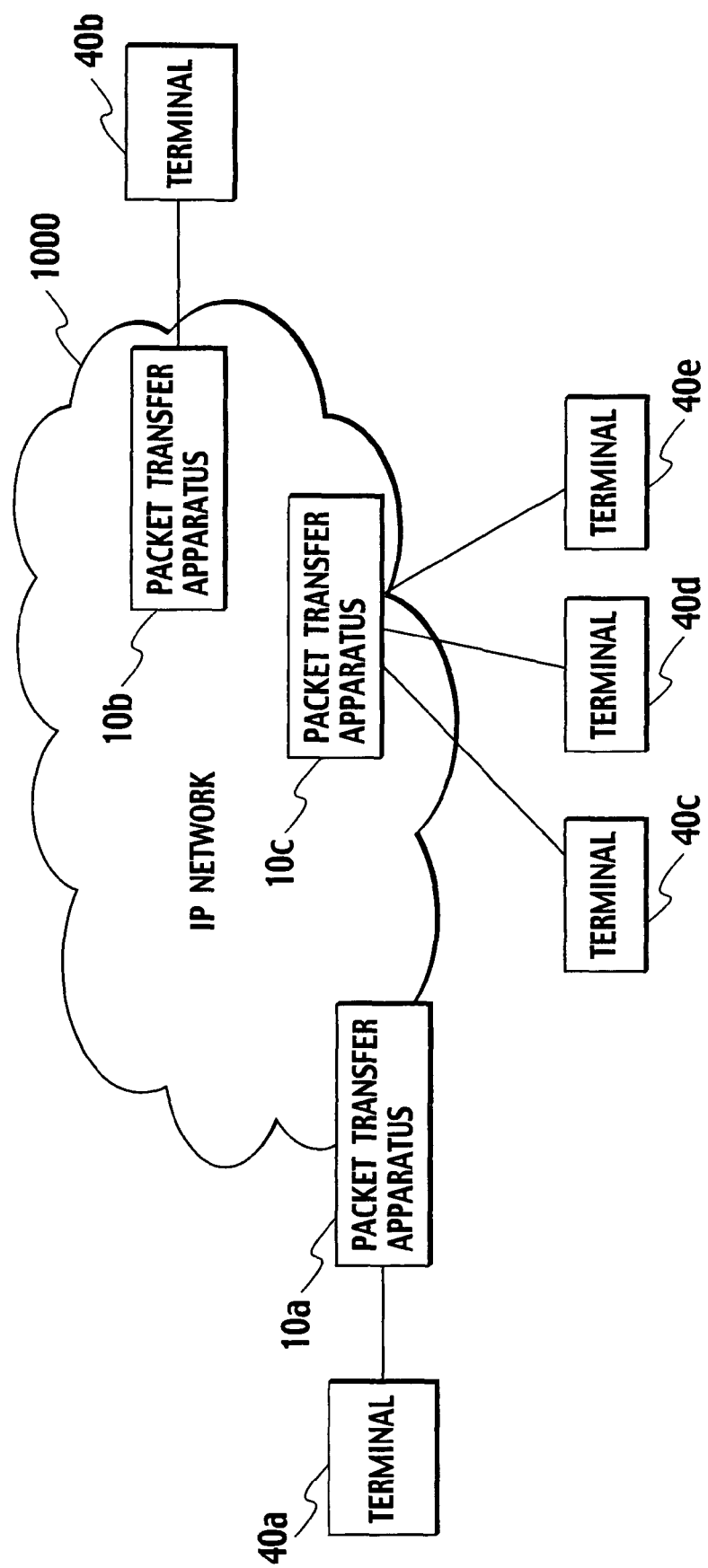
FIG. 1 is a view showing a general configuration of an embodiment of a retry communication control system according to the present invention.

FIG. 1 is a view showing a general configuration of the first embodiment of a retry communication control system according to the present invention.

In FIG. 1, packet transfer apparatuses 10a to 10c connect terminal apparatuses 40a to 40e to an IP (Internet protocol) network 1000 and transfer IP packets transmitted from the terminal apparatuses 40a to 40e to the IP network 1000. For example, the packet transfer apparatus 10a connects the terminal apparatus 40a to the IP network 1000 and transfers packets of priority and trial classes according to the priorities. The terminal apparatus 40a specifies the priority of a packet to be transferred, i.e., whether the packet must be transferred in the priority class or in the trial class.

<First Embodiment of Retry Communication Control Method and System>

Figure 2:
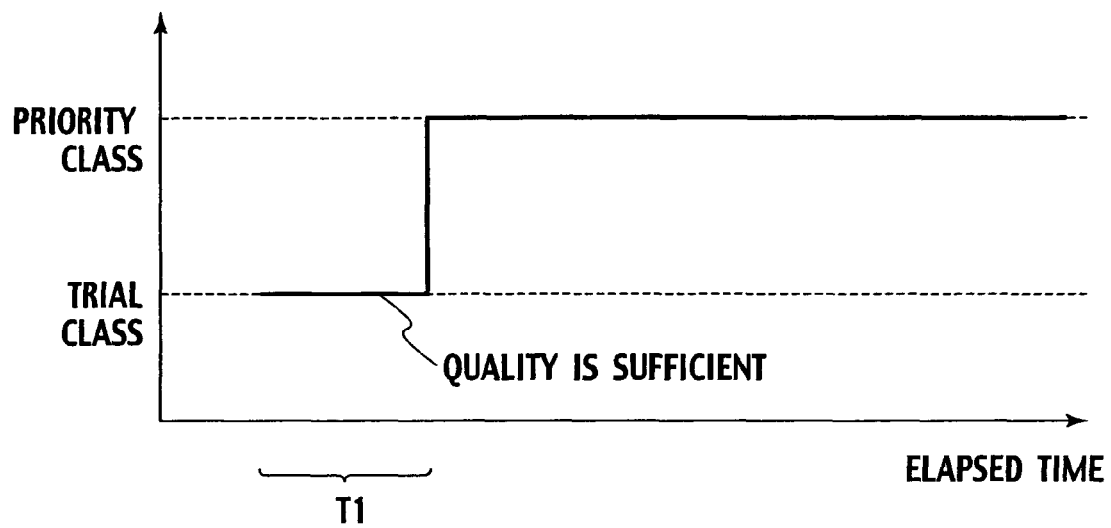
FIG. 2 is a view explaining a transition of priorities set for packets according to a first embodiment of a retry communication control method of the present invention.
Figure 3:
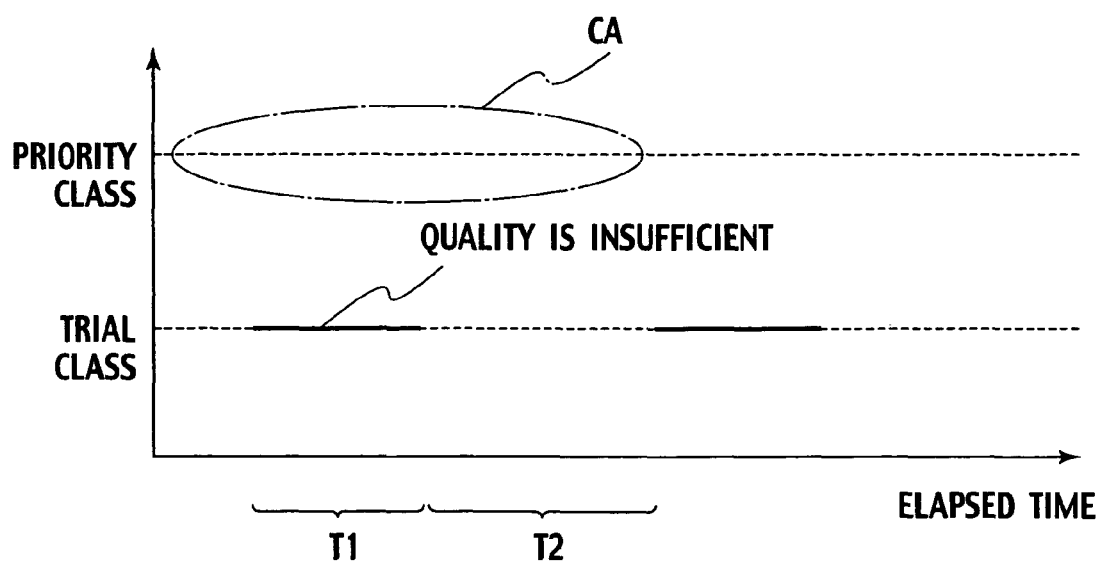
FIG. 3 is a view explaining a transition of priorities set for packets according to the first embodiment of the retry communication control method of the present invention.

A first embodiment of a retry communication control method and system according to the present invention will be explained. FIGS. 2 and 3 are views explaining transitions of priorities set for packets according to the first embodiment of the retry communication control method.

In the following explanation, two priority levels, i.e., the priority class and trial class are used. The present invention is also effective for a system employing three or more priority levels including, for example, a low class, a trial class, a priority class, and a highest priority class.

The terminal apparatus 40a, for example, sends packets of the trial class for a predetermined period T1, and if the communication quality thereof is sufficient, transfers packets of the priority class by setting, for example, a ToS (type of service) value to the priority class. Then, the IP network 1000 sends the packets as priority-class packets to a destination. If the communication quality of the trial-class packets is insufficient, the terminal apparatus 40a stops transferring the same, and after a predetermined period T2, again sends packets of the trial class. To determine whether or not packets of the trial class must be sent, the terminal apparatus 40a relies on traffic data of packets of the priority class that is measured by a different functional body such as a terminal apparatus and is obtained through the IP network.

In FIG. 2, the terminal apparatus 40a transmits packets, and the packet transfer apparatus 10a transfers the packets as packets of the trial class for the predetermined period T1, and because the communication quality of the packets is sufficient, thereafter transfers packets priority-class packets by changing the priority thereof to the priority class.

In FIG. 3, the terminal apparatus 40*a* transmits packets, and the packet transfer apparatus 10*a* transfers the packets as packets of the trial class for the predetermined period T1. Since the traffic of the packets is insufficient, the terminal apparatus 40*a* stops sending packets. After the predetermined period T2, the terminal apparatus 40*a* obtains a priority-class traffic rate CA from, for example, the IP network 1000. If it is determined that the priority-class traffic rate CA has a margin, the terminal apparatus 40*a* again sends packets of the trial class.

A packet from the terminal apparatus 40*a* is transferred in the priority class or in the trial class by setting a ToS value of the packet to priority or trial.

Figure 4:
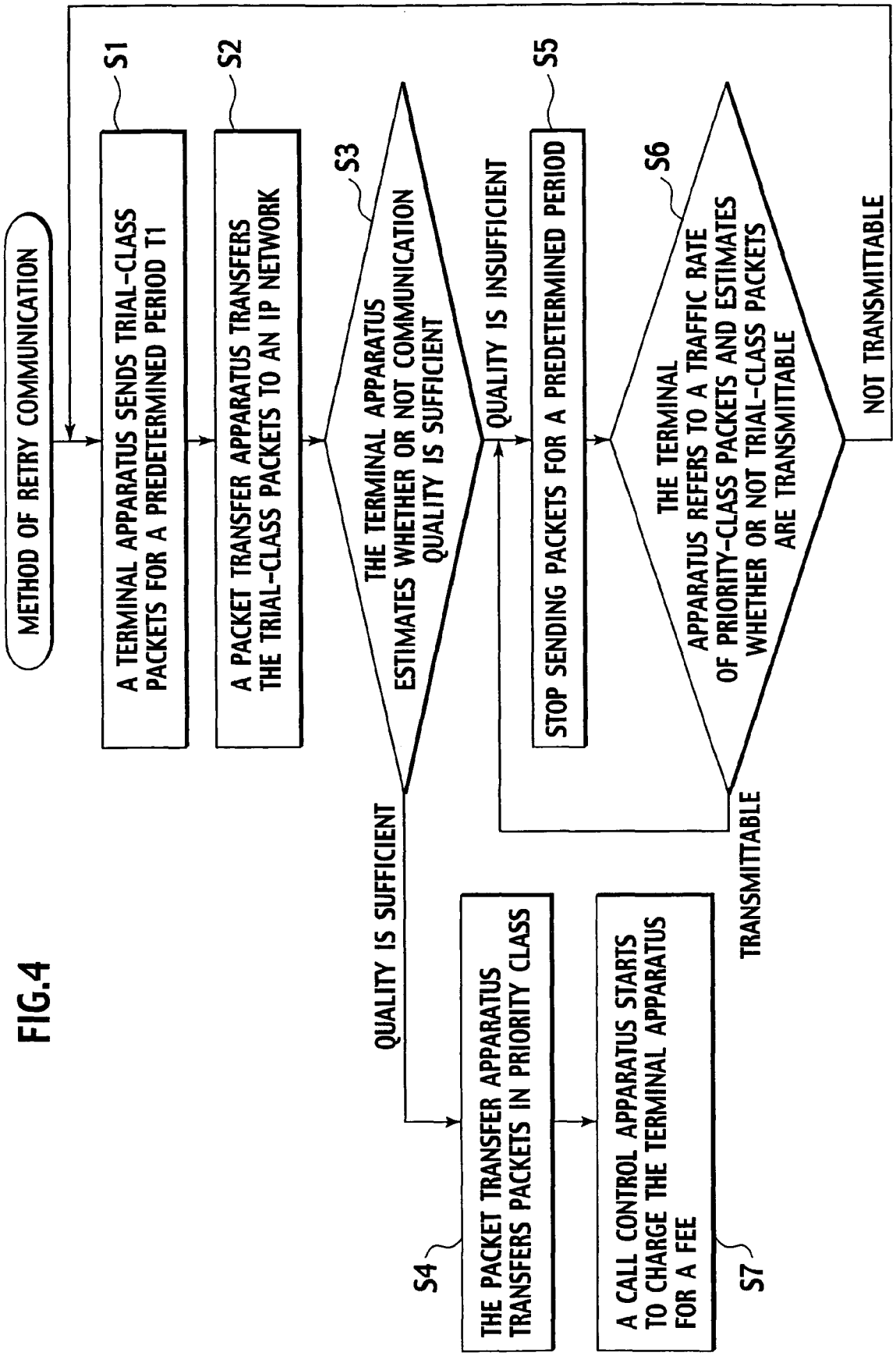
FIG. 4 is a flowchart showing a procedure according to the first embodiment of the retry communication control method of the present invention.

FIG. 4 is a flowchart showing a procedure according to the first embodiment of the retry communication control method of the present invention. With reference to FIG. 4, the procedure of the first embodiment of the retry communication control method according to the present invention will be explained.

The terminal apparatus 40*a* sends packets of the trial class for the predetermined period T1 (step S1). The packet transfer apparatus 10*a* transfers the packets from the terminal apparatus 40*a* as of the trial class to the IP network 1000 (step S2). The terminal apparatus 40*a* estimates whether or not the communication quality of the packets transferred by the packet transfer apparatus 10*a* in step S2 is sufficient (step S3). If it is sufficient in step S3, the procedure advances to step S4, and if it is insufficient, to step S5.

In step S4, the terminal apparatus 40*a* sends packets of the priority class, and the packet transfer apparatus 10*a* transfers the packets of the priority class as they are.

On the other hand, in step S5, the terminal apparatus 40*a* partly or entirely stops sending packets for a predetermined period of, for example, T2. After the predetermined period T2, the terminal apparatus 40*a* estimates, according to a monitored priority-class-packet traffic rate CA, whether or not it is possible to send packets of the trial class (step S6).

If it is possible in step S6, the procedure returns to step S1 in which the terminal apparatus 40*a* again sends packets of the trial class for the predetermined period T1, and the packet transfer apparatus 10*a* transfers the same.

If it is impossible, the procedure returns to step S5 to stop sending packets for the predetermined period T2. Thereafter, the monitoring step S6 is repeated.

When it is started to transfer packets of the priority class in step S4, a call control apparatus (not shown) starts to charge the terminal apparatus 40*a* for a fee (step S7).

The method mentioned above can prevent the total throughput of the IP network 1000 from dropping due to the transmission of packets of the trial class.

The functions of steps S1, S3, S5, and S6 carried out by the terminal apparatus 40*a* may alternatively be conducted by the packet transfer apparatus 10*a*.

<Second Embodiment of Retry Communication Control Method and System>

Figure 5:
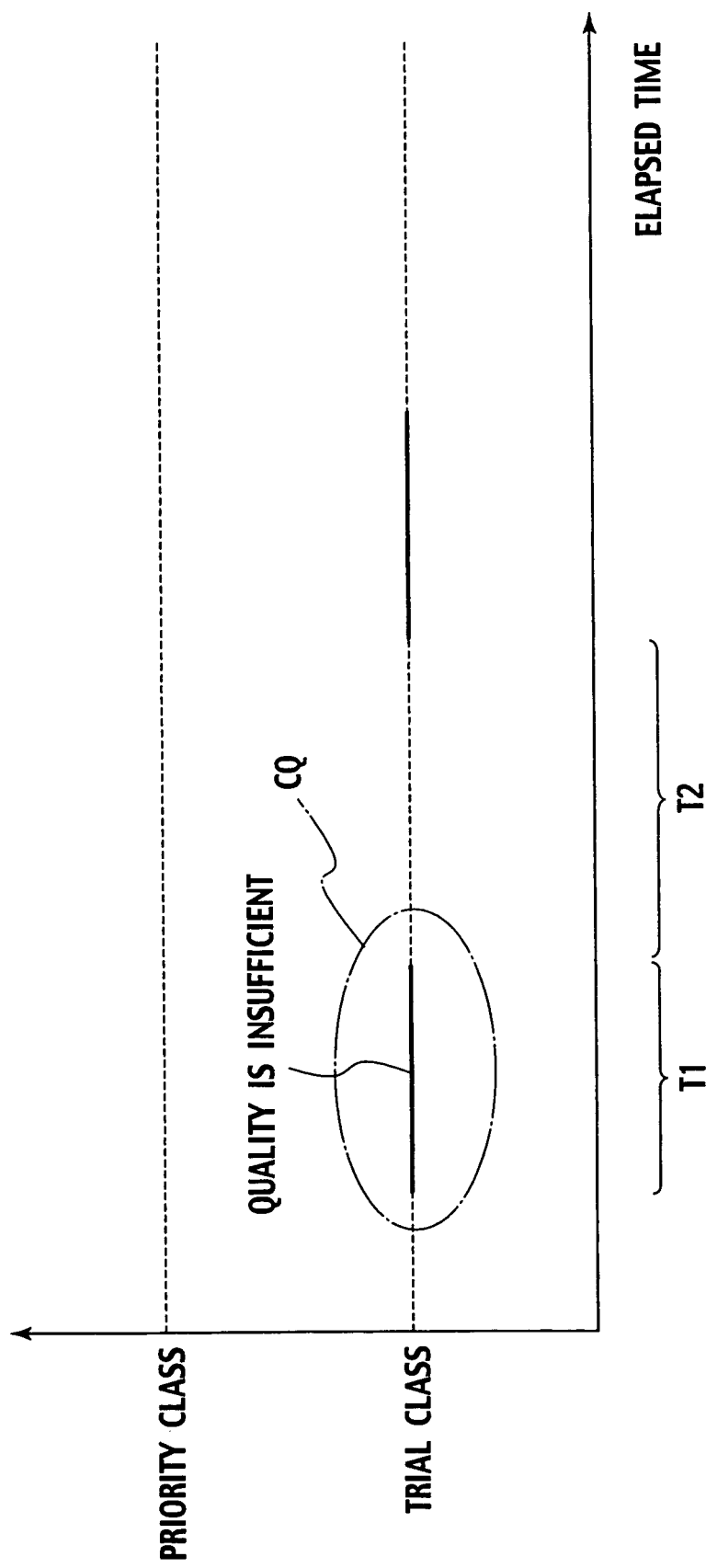
FIG. 5 is a view explaining a transition of priorities set for packets according to a second embodiment of the retry communication control method of the present invention.

A second embodiment of the retry communication control method and system according to the present invention will be explained. FIG. 5 is a view explaining a transition of priorities set for packets according to the second embodiment of the retry communication control method.

This embodiment sends a packet of the trial class to check a communication quality for a predetermined period T1. If the communication quality is insufficient, the embodiment waits for a predetermined period T2 and again sends packets of the trial class. The embodiment refers to a preceding trial-class-packet communication quality CQ when determining whether or not succeeding packets of the trial class must be sent. The evaluation of the preceding trial-class-packet communication quality CQ is carried out by the terminal apparatus 40*a*. Instead, it may be carried out by the packet transfer apparatus 10*a*.

Figure 6:
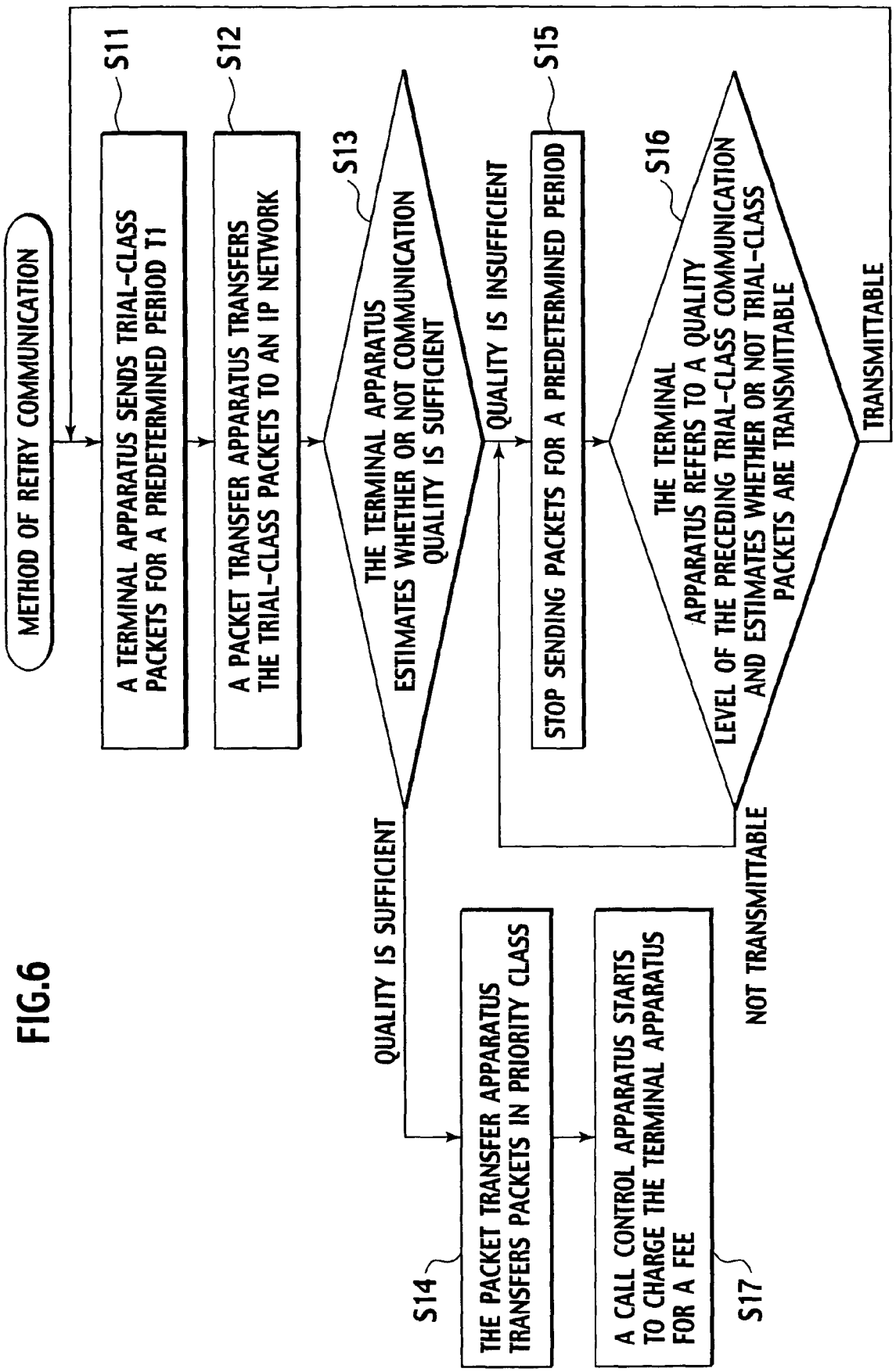
FIG. 6 is a flowchart showing a procedure according to the second embodiment of the retry communication control method of the present invention.

FIG. 6 is a flowchart showing a procedure according to the second embodiment of the retry communication control method of the present invention. With reference to FIG. 6, the procedure of the second embodiment of the retry communication control method according to the present invention will be explained.

The terminal apparatus 40*a* sends packets of the trial class for a predetermined period T1 (step S11). The packet transfer apparatus 10*a* transfers the packets from the terminal apparatus 40*a* as of the trial class to the IP network 1000 (step S12). The terminal apparatus 40*a* estimates whether or not the communication quality of the packets transferred by the packet transfer apparatus 10*a* in step S12 is sufficient (step S13). If it is sufficient in step S13, the procedure advances to step S14, and if it is insufficient, to step S15.

In step S14, the terminal apparatus 40*a* sends packets of the priority class, and the packet transfer apparatus 10*a* transfers the packets of the priority class as they are.

On the other hand, in step S15, the terminal apparatus 40*a* stops sending packets for a predetermined period of, for example, T2. After the predetermined period T2, the terminal apparatus 40*a* estimates, according to a preceding trial-class-packet communication quality CQ, whether or not it is possible to send packets of the trial class (step S16).

If it is possible in step S16, the procedure returns to step S11 in which the terminal apparatus 40*a* again sends packets of the trial class for the predetermined period T1, and the packet transfer apparatus 10*a* transfers the same.

If it is impossible, the procedure returns to step S15 to partly or entirely stop sending packets for the predetermined period T2. Thereafter, the monitoring step S16 is repeated.

When it is started to transfer packets of the priority class in step S14, a call control apparatus (not shown) starts to charge the terminal apparatus 40*a* for a fee (step S17).

The functions of steps S11, S13, S15, and S16 carried out by the terminal apparatus 40*a* may alternatively be conducted by the packet transfer apparatus 10*a*.

<Third Embodiment of Retry Communication Control Method and System>

Figure 7:
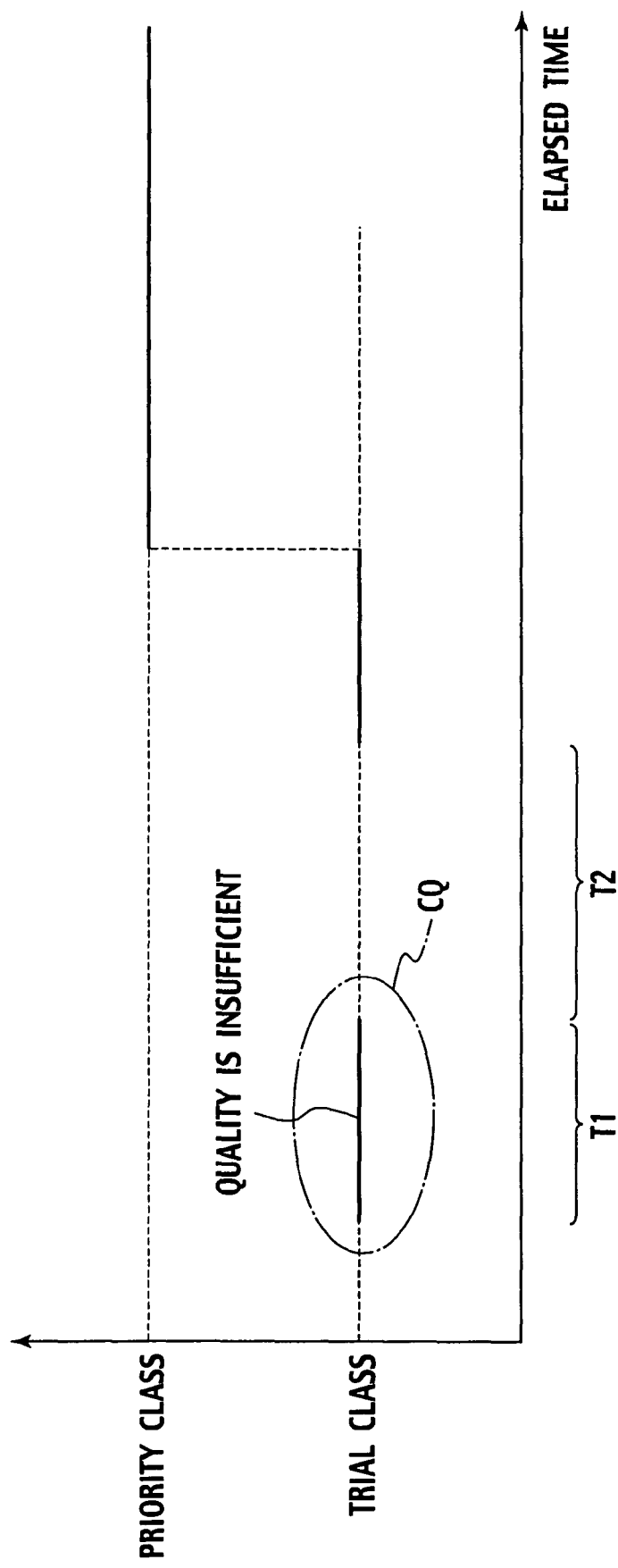
FIG. 7 is a view explaining a transition of priorities set for packets according to a third embodiment of the retry communication control method of the present invention.

A third embodiment of the retry communication control method and system according to the present invention will be explained. FIG. 7 is a view explaining a transition of priorities set for packets according to the third embodiment of the retry communication control method.

This embodiment sends packets of the trial class to check a communication quality for a predetermined period T1. If the communication quality is insufficient, the embodiment waits for a predetermined period T2. Then, the embodiment estimates an execution probability of sending succeeding packets of the trial class according to a preceding trial-class-packet communication quality CQ, and according to the probability, determines whether or not packets can be sent. Then, packets of the trial class are again sent for the predetermined period T1. In this case, a possibility of the trial-class packets of having a sufficient communication quality is high. Thereafter, the terminal apparatus 40*a* transmits packets of the priority class, and the packet transfer apparatus 10*a* transfers the same.

Figure 8:
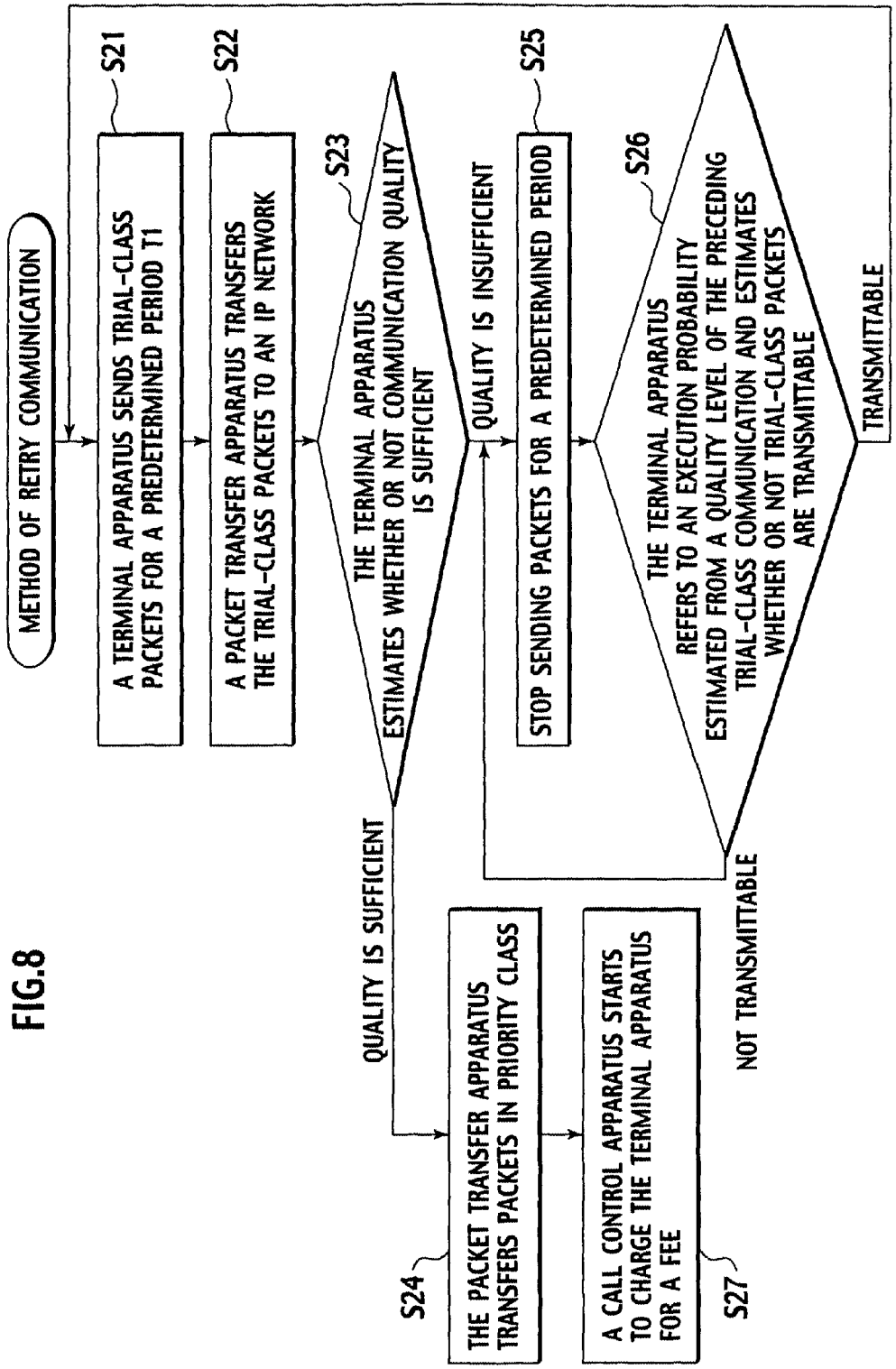
FIG. 8 is a flowchart showing a procedure according to the third embodiment of the retry communication control method of the present invention.

FIG. 8 is a flowchart showing a procedure according to the third embodiment of the retry communication control method of the present invention. With reference to FIG. 8, the procedure of the third embodiment of the retry communication control method according to the present invention will be explained.

The terminal apparatus 40a sends packets of the trial class for a predetermined period T1 (step S21). The packet transfer apparatus 10a transfers the packets from the terminal apparatus 40a as of the trial class to the IP network 1000 (step S22). The terminal apparatus 40a estimates whether or not the communication quality of the packets transferred by the packet transfer apparatus 10a in step S22 is sufficient (step S23). If it is sufficient in step S23, the procedure advances to step S24, and if it is insufficient, to step S25.

In step S24, the terminal apparatus 40a sends packets of the priority class, and the packet transfer apparatus 10a transfers the packets of the priority class as they are.

On the other hand, in step S25, the terminal apparatus 40a stops sending packets for a predetermined period of, for example, T2. After the predetermined period T2, the terminal apparatus 40a estimates an execution probability according to a preceding trial-class-packet communication quality CQ, and according to the probability, determines whether or not it is possible to send packets of the trial class (step S26).

If it is possible in step S26, the procedure returns to step S21 in which the terminal apparatus 40a again sends packets of the trial class for the predetermined period T1, and the packet transfer apparatus 10a transfers the same.

If it is impossible, the procedure returns to step S25 to stop sending packets for the predetermined period T2. Thereafter, the monitoring step S26 is repeated.

When it is started to transfer packets of the priority class in step S24, a call control apparatus (not shown) starts to charge the terminal apparatus 40a for a fee (step S27).

The functions of steps S21, S23, S25, and S26 carried out by the terminal apparatus 40a may alternatively be conducted by the packet transfer apparatus 10a.

The above-mentioned "execution probability" will clearly be explained.

An assumption is made that there are five terminal apparatuses (the terminal apparatuses 40a to 40e) each may transmit packets of the trial class within a certain unit time. If all of the five terminal apparatuses transmit packets in the same time unit, the IP network will overflow. A probability condition is set that three terminal apparatuses are allowed to transmit packets of the trial class within the same time unit without deteriorating a communication quality. Under this probability condition, the terminal apparatuses 40a, 40b, and 40d are randomly selected to transmit packets of the trial class, and the terminal apparatuses 40c and 40e are suspended from transmitting packets of the trial class. With such a probability, the terminal apparatus 40a, for example, can confirm a communication quality to send packets of the trial class, and thereafter, packets of the priority class. To find a probability of sending packets of the trial class, a preceding trial-class-packet loss rate R may be used, and "P=1−R" is calculated as a retry reference. Then, a random value between 0 and 1 is obtained, and if the random value is greater than the reference P, a retry is carried out. If the packet loss rate is 0.4, i.e., 40%, then P=0.6. In this case, a retry is achievable if a random value greater than 0.6 is obtained.

<Fourth Embodiment of Retry Communication Control Method and System>

Figure 9:
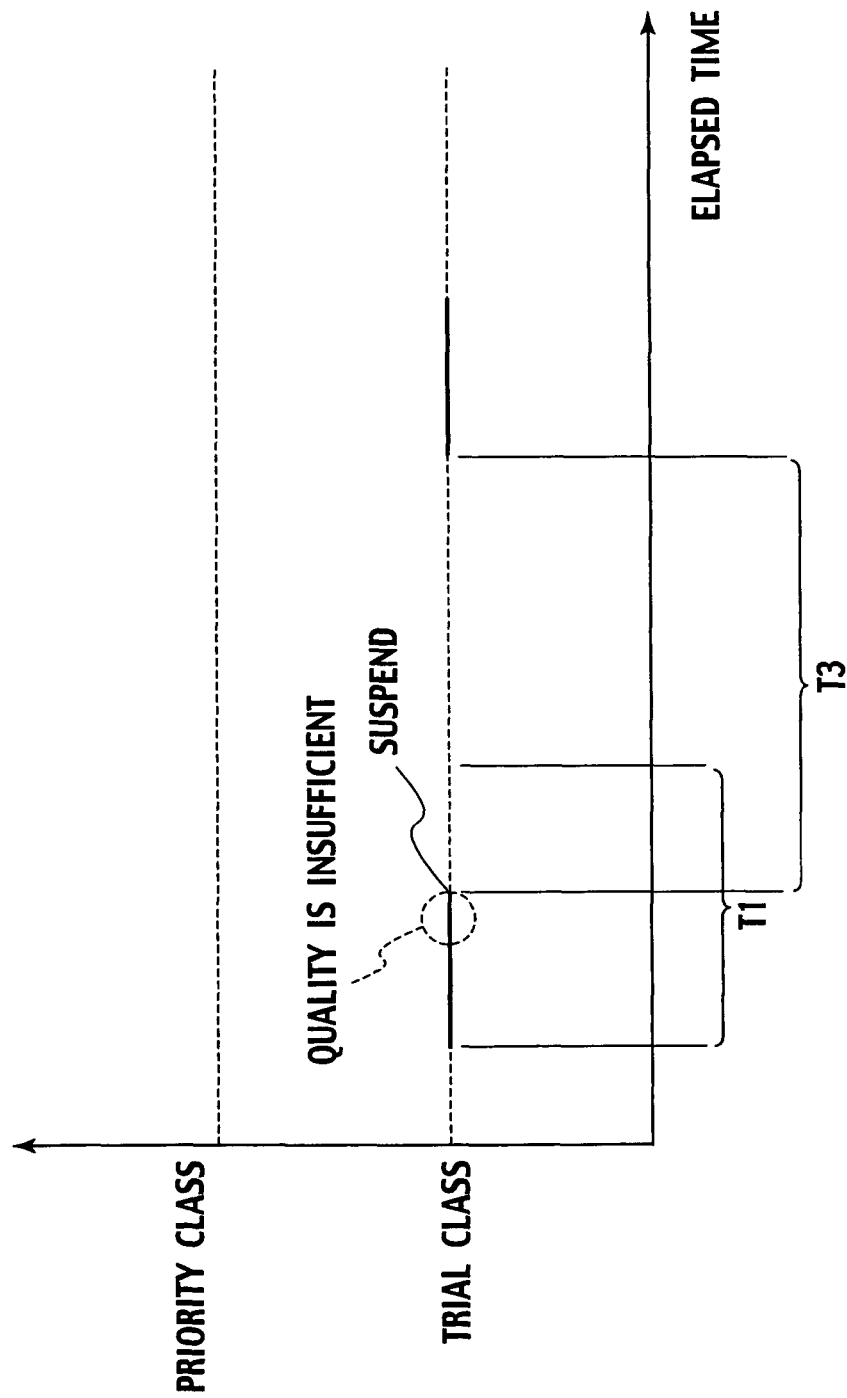
FIG. 9 is a view explaining a transition of priorities set for packets according to a fourth embodiment of the retry communication control method of the present invention.

A fourth embodiment of the retry communication control method and system according to the present invention will be explained. FIG. 9 is a view explaining a transition of priorities set for packets according to the fourth embodiment of the retry communication control method.

According to this embodiment, the terminal apparatus 40a determines a communication quality within a predetermined period T1. If it is determined that the communication quality of sent trial-class packets is insufficient, the terminal apparatus 40a immediately stops sending packets of the trial class. After a predetermined period T3, the terminal apparatus 40a determines whether or not it is possible to send packets of the trial class, and if possible, again sends packets of the trial class.

Figure 10:
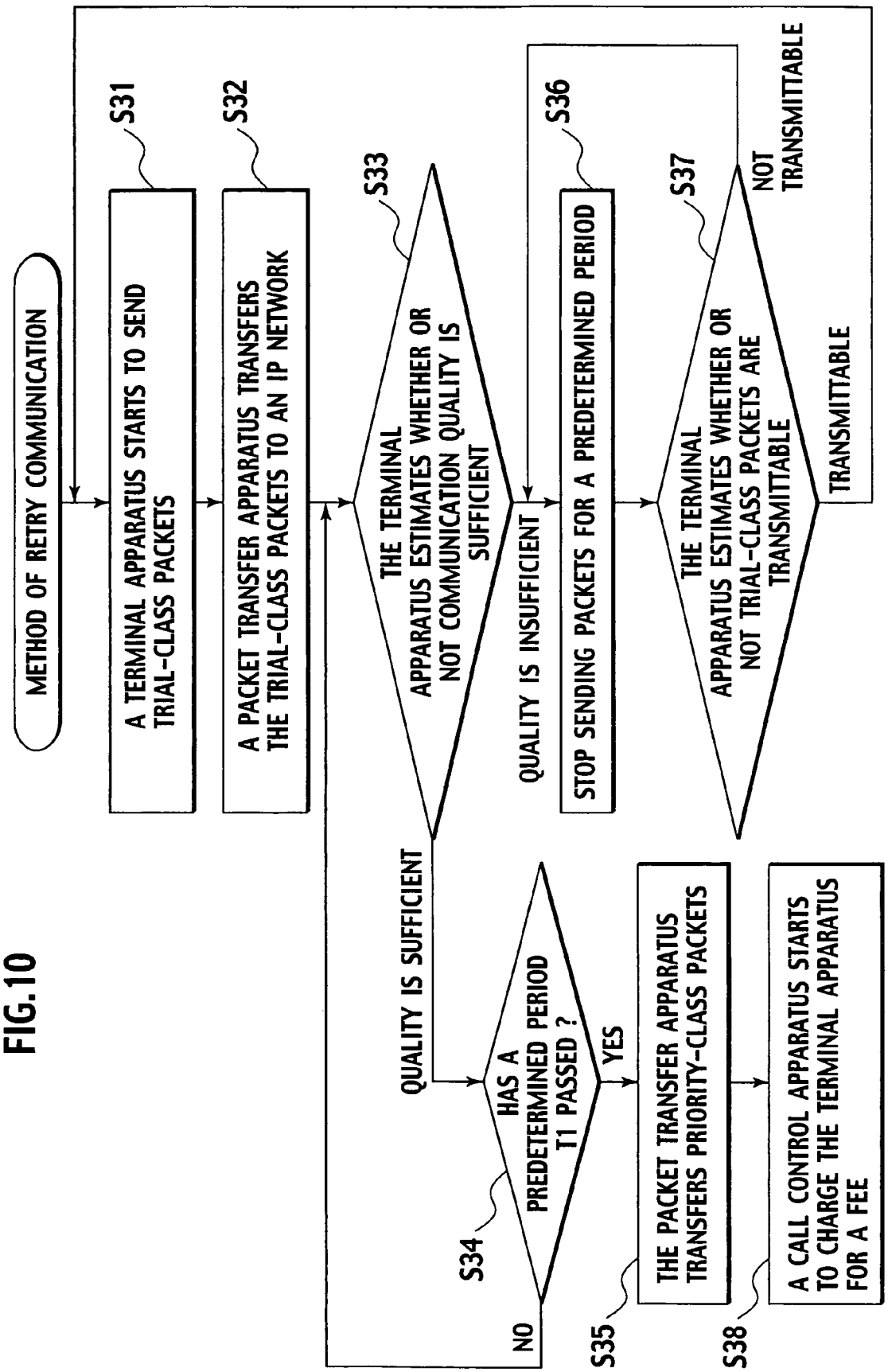
FIG. 10 is a flowchart showing a procedure according to the fourth embodiment of the retry communication control method of the present invention.

FIG. 10 is a flowchart showing a procedure according to the fourth embodiment of the retry communication control method of the present invention. With reference to FIG. 10, the procedure of the fourth embodiment of the retry communication control method according to the present invention will be explained.

The terminal apparatus 40a starts sending packets of the trial class (step S31). The packet transfer apparatus 10a transfers the packets from the terminal apparatus 40a as of the trial class to the IP network 1000 (step S32). While sending the trial-class packets, the terminal apparatus 40a estimates, from time to time, whether or not the communication quality of the packets transferred by the packet transfer apparatus 10a in step S32 is sufficient (step S33). If it is sufficient in step S33, the procedure advances to step S34, and if it is insufficient, to step S36.

In step S34, it is determined whether or not a predetermined period T1 has elapsed. If the predetermined period T1 has not passed yet, the procedure returns to step S33. If the predetermined period T1 has passed, the procedure advances to step S35. In step S35, the terminal apparatus 40a sends packets of the priority class, and the packet transfer apparatus 10a transfers the packets of the priority class as they are.

In step S36, the terminal apparatus 40a stops sending packets for a predetermined period of, for example, T3. After the predetermined period T3, the terminal apparatus 40a determines whether or not it is possible to transmit packets of the trial class (step S37). The fourth embodiment does not specify a reference for estimating or determining whether or not it is possible to transmit packets of the trial class. Any one of the first to third embodiments is employable. Like the first embodiment, it may be estimated according to traffic of priority-class packets. Like the second embodiment, it may be estimated according to the communication quality of preceding trial-class packets. Like the third embodiment, it may be estimated according to an execution probability estimated from the communication quality of preceding trial-class packets.

If step S37 determines that it is possible, the procedure returns to step S31 in which the terminal apparatus 40a again starts to send packets of the trial class and the packet transfer apparatus 10a transfers the same.

If it is determined that it is impossible, the procedure returns to step S36 to stop sending packets for the predetermined period T3, and the monitoring step S37 is repeated.

When it is started to transfer packets of the priority class in step S35, a call control apparatus (not shown) starts to charge the terminal apparatus 40a for a fee (step S38).

The functions of steps S31, S33, S34, S36, and S37 carried out by the terminal apparatus 40a may alternatively be conducted by the packet transfer apparatus 10a.

The terminal apparatuses 40a to 40e of FIG. 1 are typically personal computers or computer terminals such as PDAs (personal digital assistants). They may be home gateways or broadband routers. These apparatuses conduct IP (Internet protocol) packet communication with opposite parties through the IP network 1000. The terminal apparatuses 40a to 40e are capable of setting priorities when conducting packet communication and estimating a communication quality of packets exchanged through the IP network 1000.

The packet transfer apparatuses 10a, 10b, and 10c of FIG. 1 are typically edge routers to receive packets transmitted from the terminal apparatuses 40a to 40e and transfer them according to their priorities such as the priority class and trial class.

The processes achieved in steps S1, S3, S5, and S6 of FIG. 4, in steps S11, S13, S15, and S16 of FIG. 6, in steps S21, S23, S25, and S26 of FIG. 8, and in steps S31, S33, S34, S36, and S37 are typically programs executable by the terminal apparatus 40a. The processes achieved in steps S2 and S4 of FIG. 4, in steps S12 and S14 of FIG. 6, in steps S22 and S24 of FIG. 8, and in steps S32 and S35 of FIG. 10 are typically programs executable by the packet transfer apparatus 10a. As explained above, the processes carried out by the terminal apparatus 40a can alternatively be carried out by the packet transfer apparatus 10a.

The above-mentioned embodiments stop sending packets of the trial class for the predetermined period T2 or T3 if the communication quality of the trial-class packets is insufficient. These embodiments are applicable to find an available communication band according to the communication quality of the trial-class packets, send packets of the priority class in the available communication band that is smaller than an originally requested communication band, and after the predetermined period T2 or T3, send packets of the trial class in order to guarantee the originally requested communication band.

Embodiments of a packet transfer possibility determination method, packet transfer apparatus, and program according to the present invention will be explained.

Figure 11:
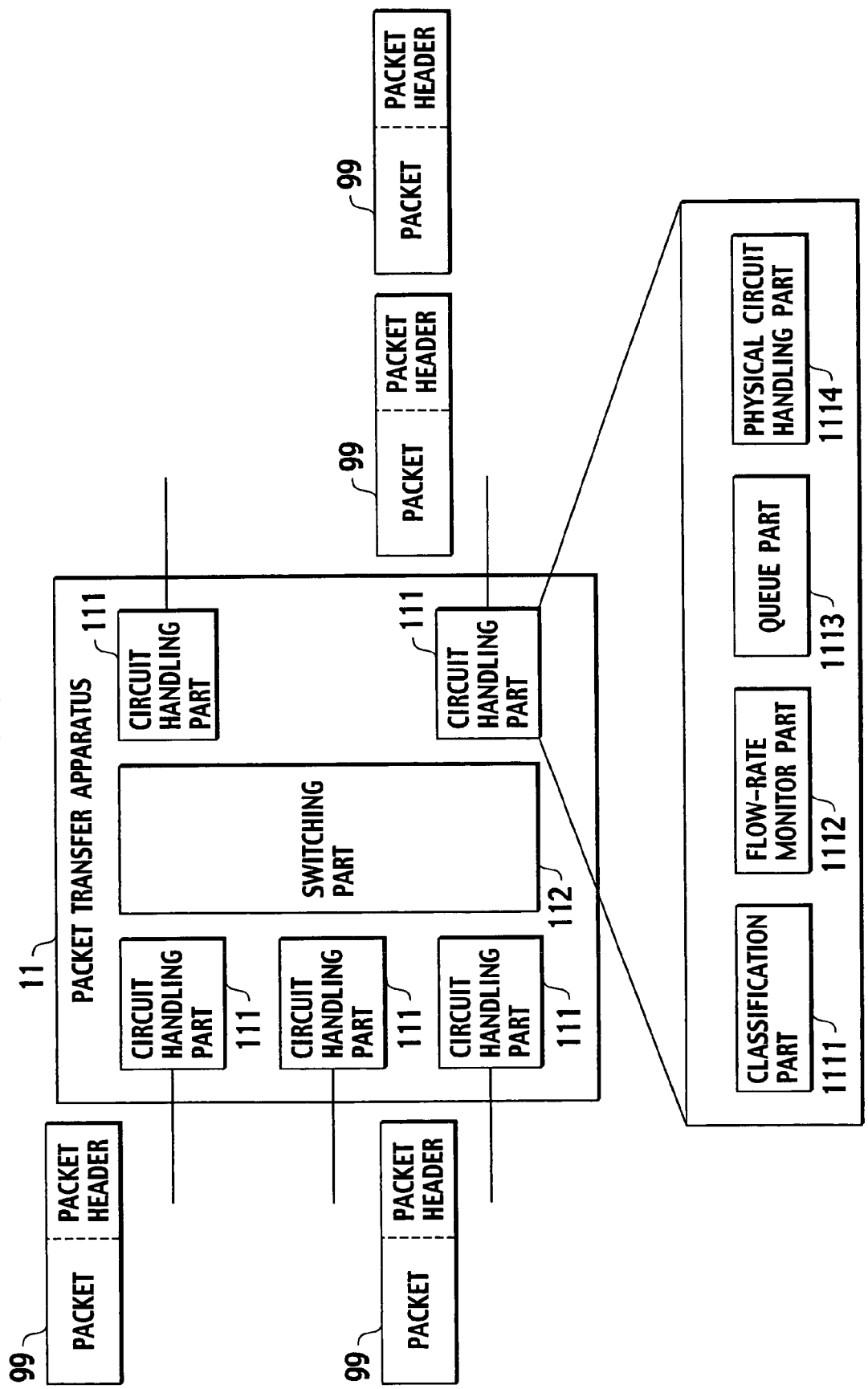
FIG. 11 is a view showing a configuration of an embodiment of a packet transfer apparatus according to the present invention.

FIG. 11 is a view showing a configuration of an embodiment of the packet transfer apparatus according to the present invention.

In FIG. 11, the packet transfer apparatus 11 includes circuit handling parts 111 to achieve connection to external physical circuits and a switching part 112 to internally transfer packets. The circuit handling part 111 transfers a packet 99 having a packet header. The circuit handling part 111 includes a classification part 1111 to select a packet processing method according to packet header information, a flow-rate monitor part 1112 to monitor a flow rate of each class, a queue part 1113 to conduct read control on a packet 2 for a physical circuit, and a physical circuit handling part 1114 to achieve connection to an external physical circuit. Flow-rate control of the present invention is achieved by the flow-rate monitor part 1112. The flow-rate monitor part 1112 has a storage part that stores a threshold capacity BWh not to discard priority-class (H-class) packets and a threshold capacity BWmh not to discard trial-class (M-class) packets. The details of them will be explained later.

Figure 12:
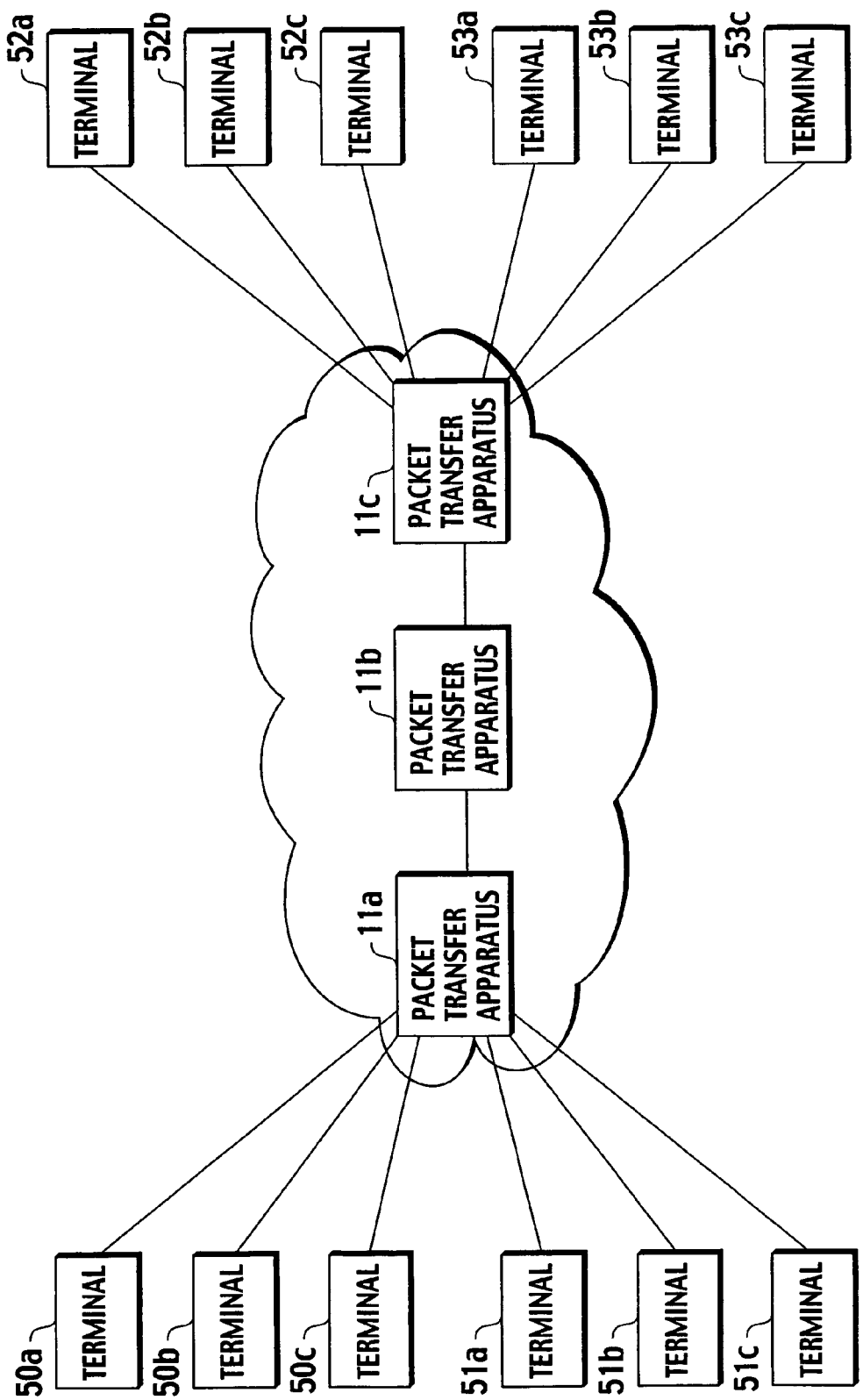
FIG. 12 is a view showing a configuration of an embodiment of a packet transfer system according to the present invention.

FIG. 12 is a view showing a configuration of an embodiment of the packet transfer system according to the present invention.

According to the packet transfer system shown in FIG. 12, terminal apparatuses 50a to 50c and 51a to 51c are connected to terminal apparatuses 52a to 52c and 53a to 53c through a packet communication network. The terminal apparatuses 50a to 50c and 51a to 51c are connected to a packet transfer apparatus 11a. The terminal apparatuses 52a to 52c and 53a to 53c are connected to a packet transfer apparatus 11c. The packet transfer apparatuses 11a and 11c are connected to each other through a packet transfer apparatus 11b.

When the terminal apparatuses 50a and 50b transmit packets to the terminal apparatuses 52a and 52b, the terminal apparatuses 50a and 50b serving as packet transmission terminals set ToS values of the packets to the trial class (M-class) and transfer them to the terminal apparatuses 52a and 52b serving as destination terminals. When the terminal apparatuses 51a and 51b transmit packets to the terminal apparatuses 53a and 53b, the terminal apparatuses 51a and 51b set ToS values of the packets to the priority class (H-class) and transfer them to the terminal apparatuses 53a and 53b serving as destination terminals.

The packet transfer apparatus 11a classifies the packet flows from the terminal apparatuses 50a and 50b into the M-class and those from the terminal apparatuses 51a and 51b into the H-class, and according to the priorities, transfer the packet flows to the packet transfer apparatus 11b. The packet transfer apparatus 11b transfers the packet flows from the packet transfer apparatus 11a to the packet transfer apparatus 11c. The packet transfer apparatus 11c transfers the packet flows from the packet transfer apparatus 11b to the terminal apparatuses 52a and 52b and the terminal apparatuses 53a and 53b according to destination information contained in packet headers. The priority of a packet may be determined depending on the terminal apparatus that sends the packet or may be changed during the same communication flow of the same terminal apparatus.

Figure 13:
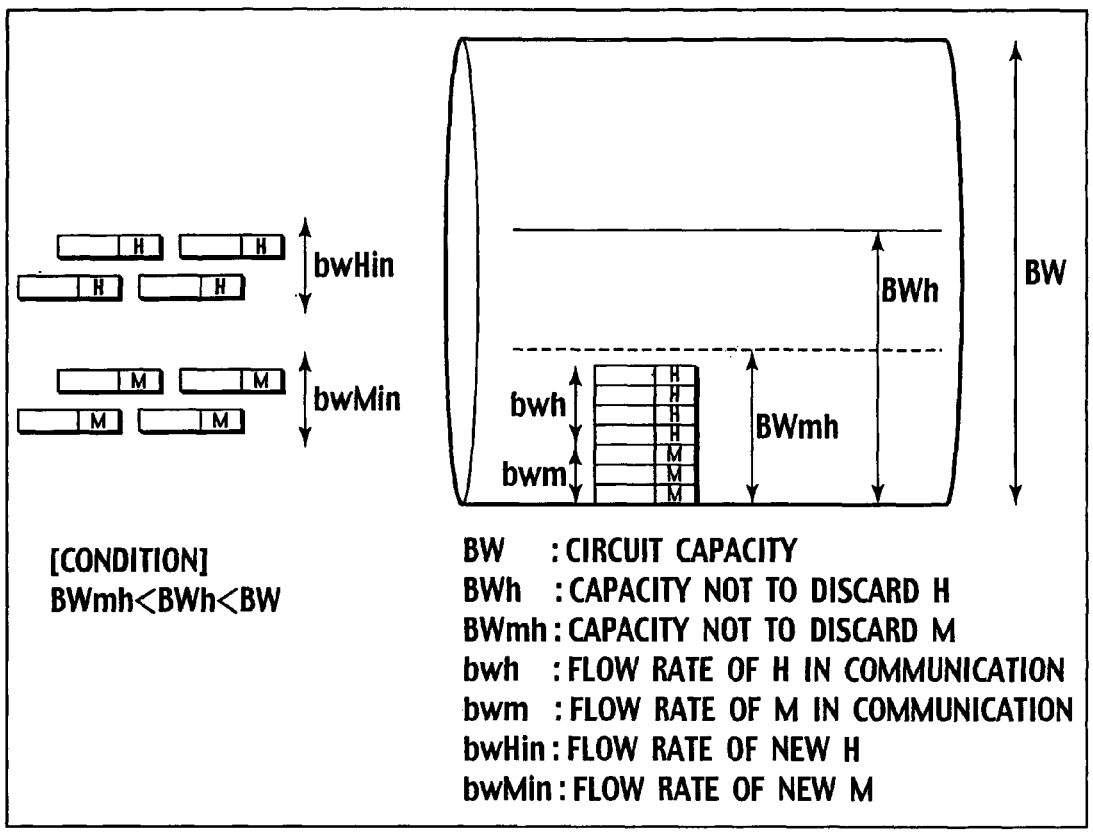
FIG. 13 is a view roughly explaining processes in the packet transfer apparatus.
Figure 14A:
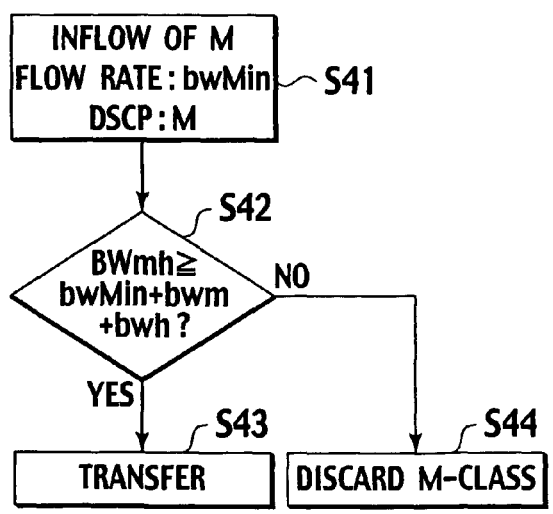
FIGS. 14A and 14B are flowcharts roughly showing procedures in the packet transfer apparatus.
Figure 14B:
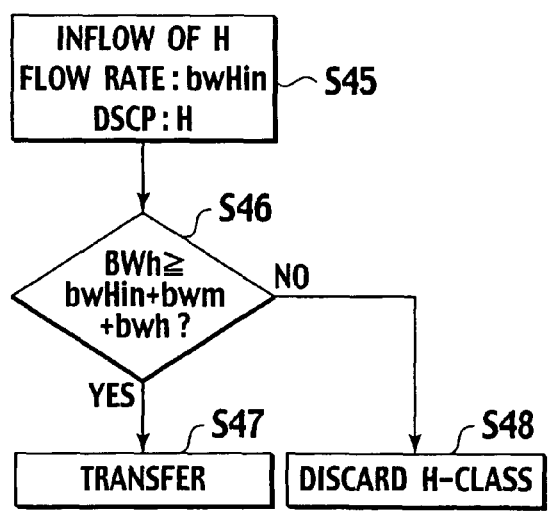

FIG. 13 is a view roughly explaining processes carried out in the packet transfer apparatus 11. FIGS. 14A and 14B are flowcharts roughly showing procedures carried out in the packet transfer apparatus 11.

The present invention is characterized by setting two threshold values for a circuit capacity BW as shown in FIG. 13. The threshold values are the capacity BWmh not to discard packets of the M-class and the capacity BWh not to discard packets of the H-class.

For example, a sender terminal apparatus 50c sets the ToS value of a transmission packet flow to the M-class and starts transferring packets to a receiver terminal apparatus 52c. The packet transfer apparatus 11a receives the packet flow (step S41), reads the ToS of the packet flow, and classifies the packet flow into the M-class.

The packet transfer apparatus 11a measures (step S42) the total (bwh+bwm+bwMin) of an M-class-packet flow rate (bwm), a flow rate (bwMin) of the packets from the terminal apparatus 50c, and an H-class-packet flow rate (bwh). If the total flow rate is below the threshold value BWmh, transfer is continued (step S43) without discarding packets. If the total flow rate exceeds the threshold value BWmh, the packet transfer apparatus 11a discards newly coming packets of the M-class (step S44).

The sender terminal apparatus 50c may set the ToS value of a transmitting packet flow to the H-class and start transferring packets to the receiver terminal apparatus 52c. The packet transfer apparatus 11a receives the packet flow (step S45), reads the ToS of the packet flow, and classifies the packet flow into the H-class.

The packet transfer apparatus 11a measures (step S46) the total (bwh+bwm+bwHin) of an H-class-packet flow rate (bwh), a flow rate (bwhin) of the packets from the terminal apparatus 50c, and an M-class-packet flow rate (bwm). If the total flow rate is below the threshold value BWh, transfer is continued (step S47) without discarding packets. If the total flow rate exceeds the threshold value BWh, the packet transfer apparatus 11a discards newly coming packets of the H-class (step S48).

The situation shown in FIG. 13 will be explained. Packets of the M-class and H-class are communicated at flow rates bwm and bwh, respectively. New packets of the M-class are going to be added thereto at a flow rate bwMin. Then, the total flow rate will exceed the threshold BWmh. Accordingly, the new packets of the M-class are discarded. If new packets of the H-class are going to be added thereto at a flow rate bwHin, the total flow rate will not exceed the threshold BWh, and therefore, the new packets of the H-class are admitted and transferred.

Figure 15:
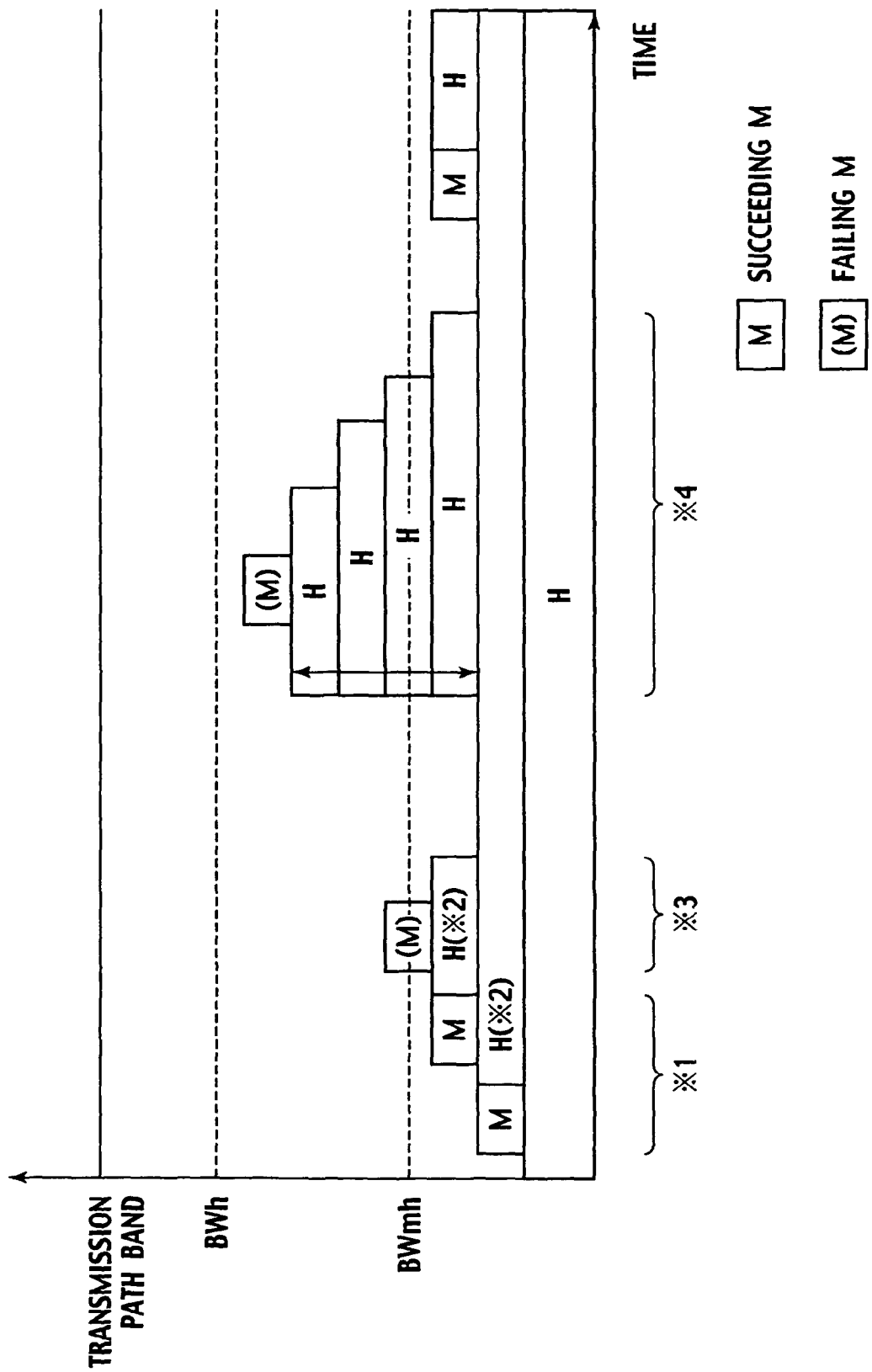
FIG. 15 is a view with time axis and band usage axis, showing an example of a process carried out in the packet transfer apparatus, i.e., a communication quality controlling process to control the priority of a transfer process employing ToS.

FIG. 15 is a view with a time axis and a band usage axis, showing an example of a process carried out in the packet transfer apparatus 11, i.e., a communication quality controlling process to control the priority of packet transfer with ToS. FIG. 15 resembles FIG. 13 and involves the two threshold values BWmh and BWh.

As explained above, a terminal apparatus in the packet transfer system of the present invention transfers packets of the trial class (M-class) for a predetermined period, and if confirms that the packets of the M-class have not been discarded and have reached a destination terminal (without regard to the retry communication control methods mentioned above, in this case), starts to transfer packets of the H-class (for example, packets with a mark of *2 in FIG. 15) instead of the packets of the M-class.

At this time, if the packets of the M-class flow at a flow rate of bwMin as indicated with *1 in FIG. 15, a condition of "bwh+bwMin<BWmh" is satisfied, and therefore, the packets are changed to packets of the H-class, which are continuously transferred. If the packets of the M-class flow at a flow rate of bwMin as indicated with *3, a condition of "bwh+bwMin>BWmh" is satisfied, and therefore, the new packets are discarded.

On the other hand, packets *4 that are of the H-class from the beginning are admitted and transferred even if they exceed the capacity BWmh. The packets that are of the H-class from the beginning occur when two equivalent circuits are prepared for circuit failures and when a flow in a failed circuit is switched to the other circuit, or occur when a handover is carried out. If the packets that are of the H-class from the beginning exceed the capacity BWh, they are discarded, or if there are packets of the M-class, the M-class packets are discarded instead of the H-class packets.

A method of measuring a quantity in a token bucket, estimating a remaining band capacity, and determining whether or not new packets are transferable will be explained.

Figure 16:
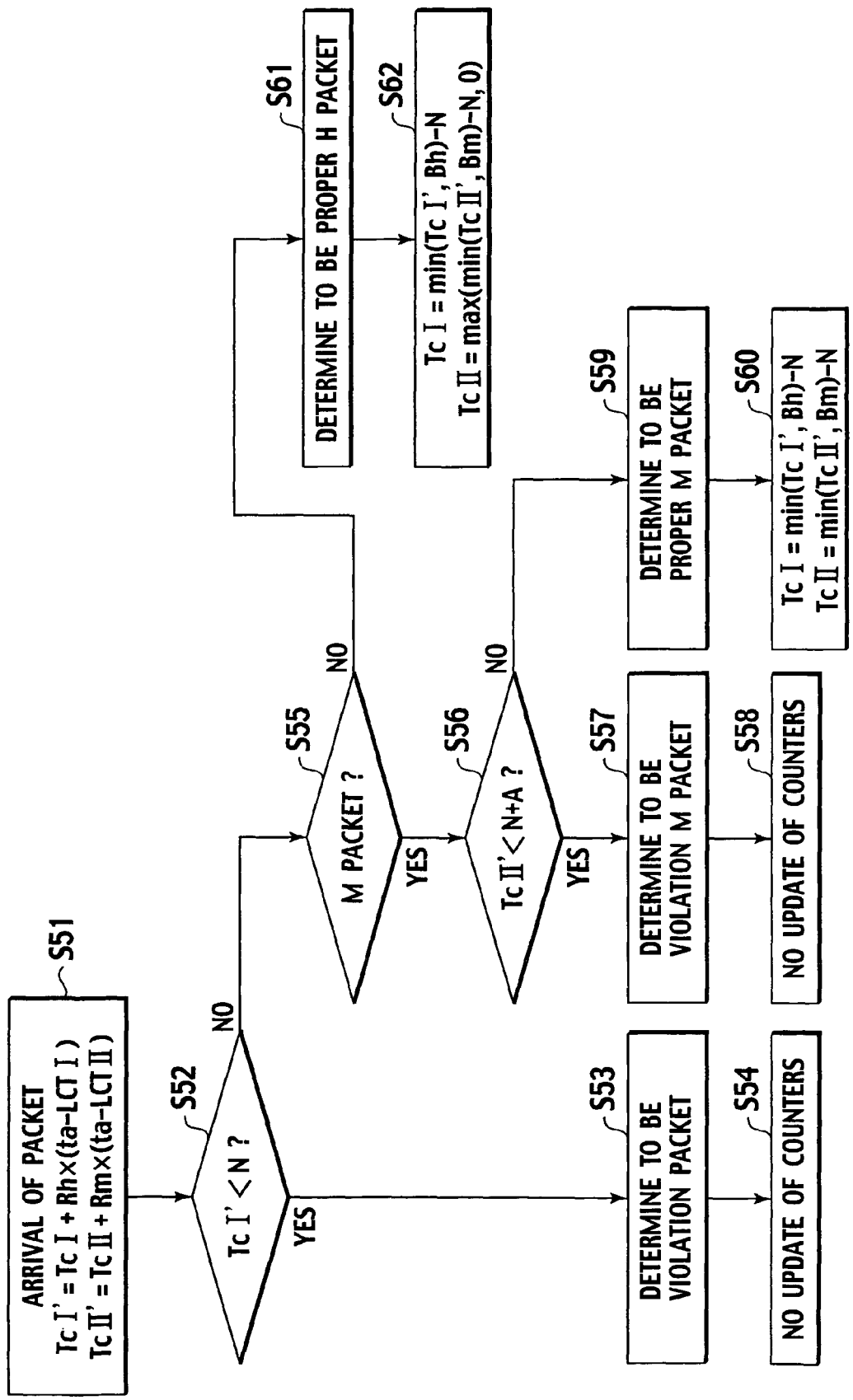
FIG. 16 is a flowchart showing a procedure to determine whether or not a packet must be transferred according to a quantity in a token bucket.

FIG. 16 is a flowchart showing a procedure to determine whether or not packets must be transferred according to a quantity in a token bucket.

In this example, there are prepared two token buckets I and II having the sizes of Bh and Bm (bytes), respectively. The token buckets I and II have token bucket rates of Rh and Rm (bytes per second), respectively. Here, the token bucket rate Rh>the token bucket rate Rm. The token buckets I and II have token counter variables TcI and TcII (bytes), respectively. Arrival time values of preceding normal packets at the token buckets I and II are LCTI and LCTII (seconds), respectively. The token buckets I and II have calculation variables TcI' and TcII', respectively. Arrival time of an incoming packet is ta (seconds) and the packet length thereof is N (bytes). Initial values of the token counter TcI and TcII are equal to the sizes Bh and Bm of the token buckets I and II, respectively. An offset value A (bytes) is used to check the token bucket II not to erroneously pass M-class packets and is characteristic to the present invention.

The token buckets I and II correspond to the capacity BWh not to discard H-class packets and the capacity BWmh not to discard M-class packets shown in FIG. 13, respectively.

In FIG. 16, the arrival of a new packet triggers calculation of expressions (1) and (2) (step S51).

$$TcI' = TcI + Rh \times (ta - LCTI) \quad (1)$$

$$TcII' = TcII + Rh \times (ta - LCTII) \quad (2)$$

where TcI' and TcII' are the token counter values of the token buckets I and II at the arrival time ta of the new packet and are incremented by bucket rates according to an elapsed time from the arrival of a preceding normal packet. If these values are greater than the size of the new packet, the packet is accepted. Processes that follow will be explained.

It is determined whether or not TcI' is smaller than a packet length N (step S52). If TcI' is smaller than the packet length N, the packet is unacceptable without regard to the priority (M or H) thereof, and the new packet is determined to be a violation packet (step S53). In this case, the packet is discarded, and therefore, the token counter values are not updated (step S54).

If TcI' is equal to or greater than the packet length N in step S52, it is determined whether or not the new packet is of the M-class (step S55). If the new packet is of the M-class, it is determined whether or not TcII' is smaller than the sum (N+A) of the packet length and offset value (step S56).

If TcII' is smaller than the sum (N+A) of the packet length and offset value, the packet of the M-class is unacceptable, and therefore, the new packet is determined to be a violation packet (step S57). In this case, the packet is discarded and the token counter values are not updated (step S58).

If TcII' is equal to or greater than the sum (N+A) of the packet length and offset value in step S56, the packet of the M-class is admitted, and therefore, is determined to be a normal packet of the M-class (step S59). In this case, the token counters are updated according to the following expressions (3) and (4) (step S60).

$$TcI = \min(TcI', Bh) - N \quad (3)$$

$$TcII = \min(TcII', Bm) - N \quad (4)$$

On the other hand, if the new packet is not of the M-class in step S55, the new packet must be of the H-class, and therefore, is determined to be a normal packet of the H-class (step S61). In this case, the token counters are updated according to the following expressions (5) and (6) (step S62).

$$TcI = \min(TcI', Bh) - N \quad (5)$$

$$TcII = \max(\min(TcII', Bm) - N, 0) \quad (6)$$

The expression (6) selects a larger one of "min(TcII', Bm)−N" and "0." The reason of this will be explained. A packet of the H-class is not violative of the token bucket I, and therefore, is passed therethrough. Such a packet may be violative of the token bucket II. In this case, it is possible that the token counter of the token bucket II becomes lower than zero. If this happens, the token counter of the token bucket II is zeroed and incremented therefrom.

Figure 17A:
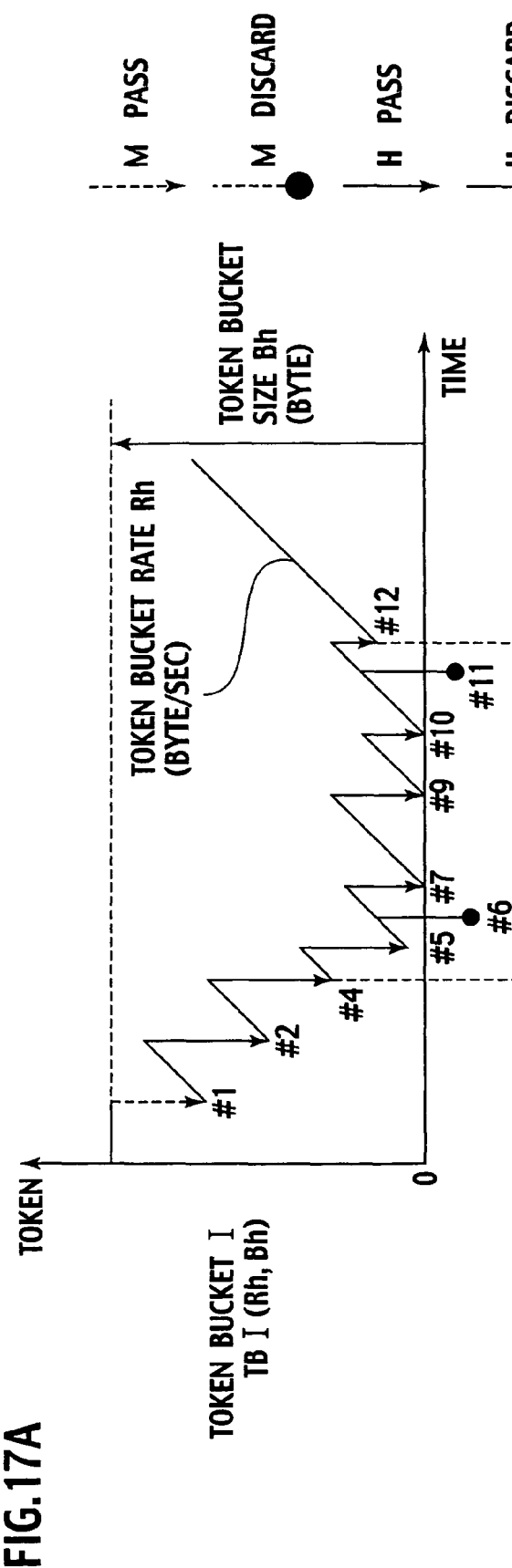
FIGS. 17A and 17B are views showing examples of changes in token counter values of token buckets.
Figure 17B:
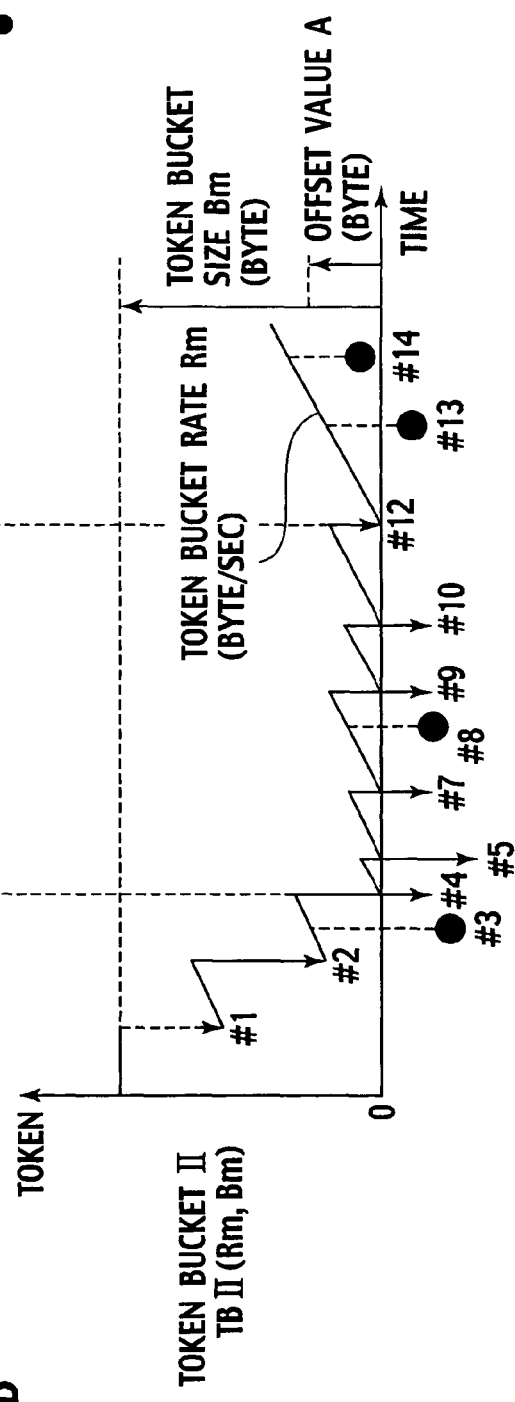

FIGS. 17A and 17B are views showing examples of changes in the token counter values of the token buckets I and II.

In FIGS. 17A and 17B, an ordinate represents token counter values and an abscissa represents elapsed time. Packets #1 and #2 are determined to be normal packets and are passed because the token counter values at the arrival of the packets are each greater than a packet length. A packet #3 is of the M-class and the token counter value of the token bucket II is smaller than the sum of the packet length and offset value. Accordingly, the packet #3 is discarded as a violation packet. Packets #4 and #5 are violation packets for the token bucket II but they are passed because they are of the H-class. In connection with a packet #6, the token counter value of the token bucket I is smaller than the packet length, and therefore, the packet #6 is discarded as a violation packet in step S52 of FIG. 16 without regard to the priority thereof. A packet #7 is passed like the packets #4 and #5. A packet #8 is discarded like the packet #3. Packets #9 and #10 are passed like the packets #4, #5, and #7. A packet #11 is discarded like the packet #6. A packet #12 is passed like the packet #2. A packet #13 is discarded like the packets #3 and #8. A packet #14 is discarded as a violation packet like the packet #3 because the token counter value of the token bucket II is smaller than the sum of the packet length and offset value.

Figure 18:
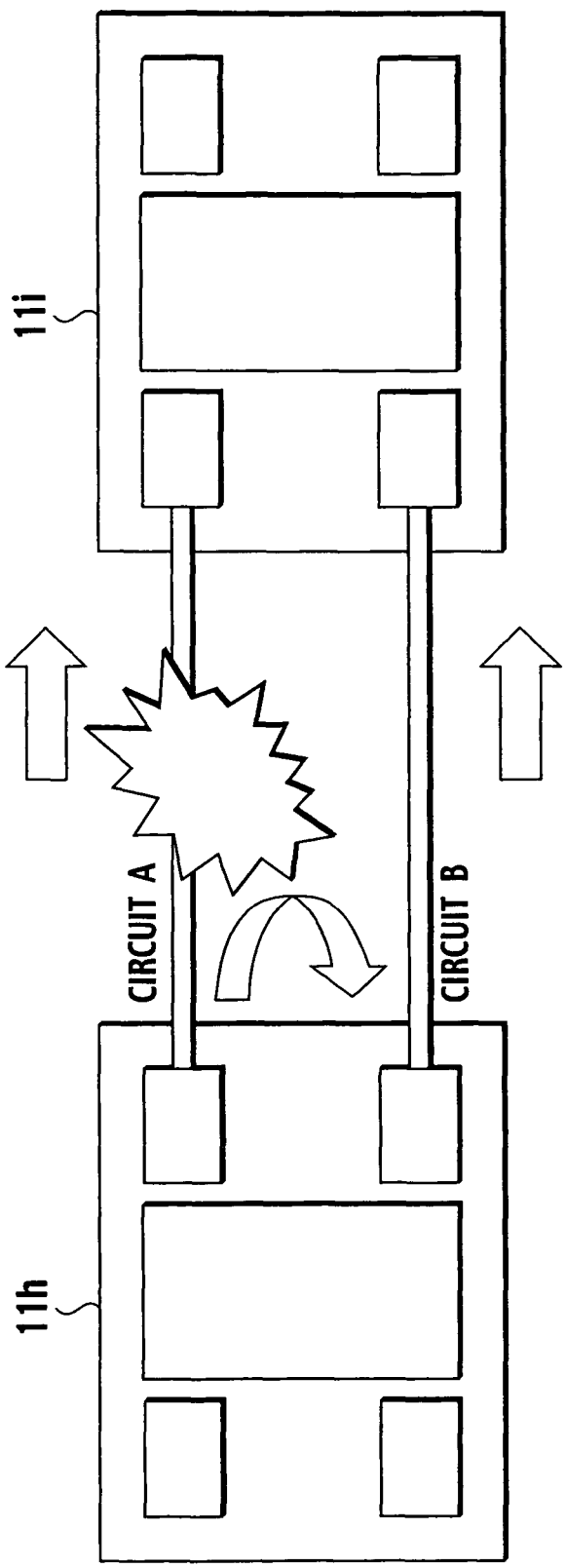
FIG. 18 is a view showing a first typical example to which a packet transfer possibility determination method according to the present invention is applied.

FIG. 18 is a view showing a first typical example to which the packet transfer possibility determination method according to the present invention is applied.

Between two packet transfer apparatuses 11h and 11i, two circuits A and B are laid to cope with a circuit failure. Load is distributed flow by flow to the circuits according to a certain method. In this example, the circuit A is passing packets of the H-class at a flow rate of bwhA and the circuit B is passing packets of the H-class at a flow rate of bwhB and packets of the M-class at a flow rate of bwmB.

If the circuit A fails, and the H-class packets at the flow rate bwhA are switched to the circuit B serving as an auxiliary circuit. If BWmh≥bwhA+bwhB+bwmB, no packets will be discarded. If BWmh<bwhA+bwhB+bwmB, the M-class packets will be discarded and no H-class packets will be discarded.

Figure 19:
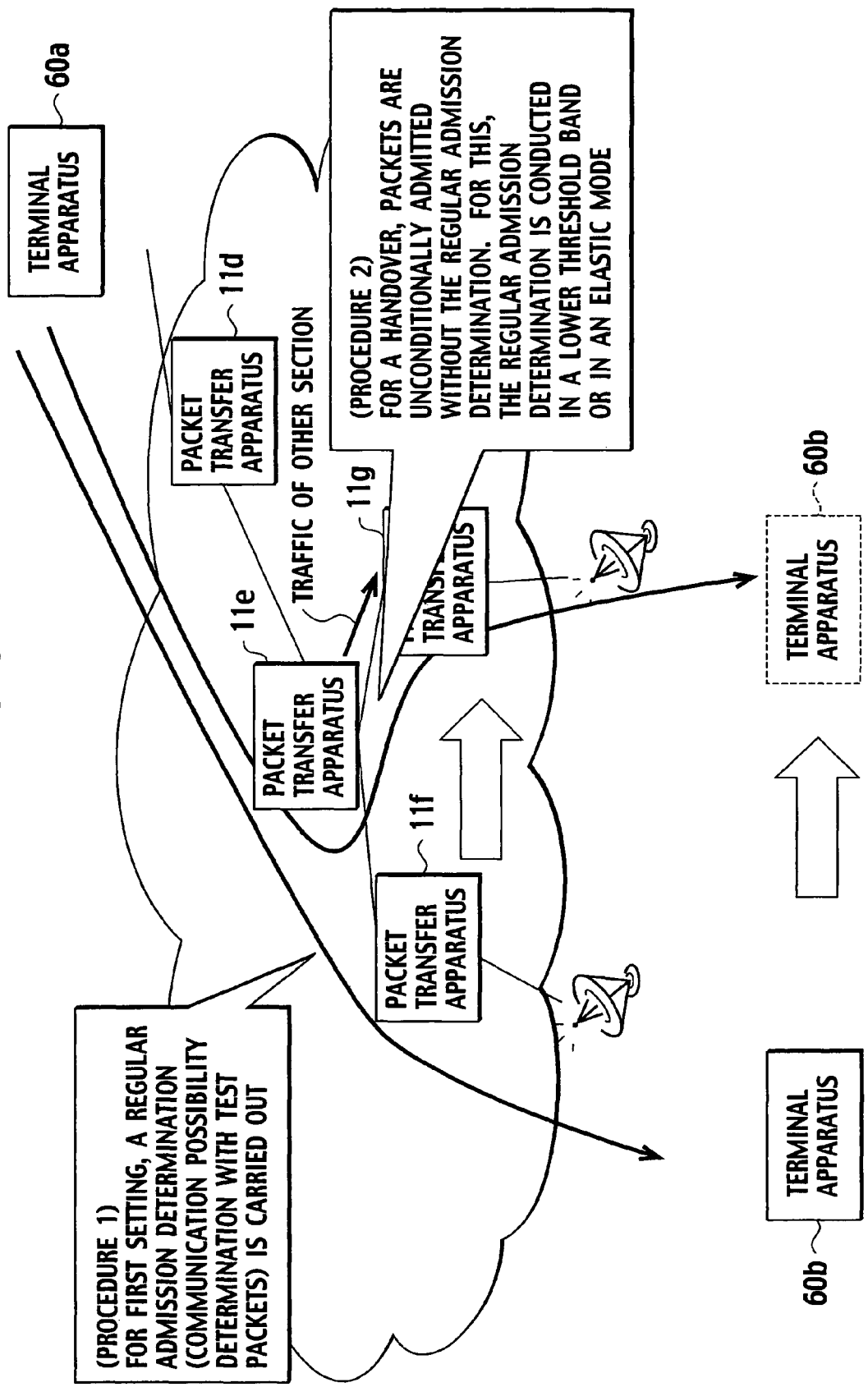
FIG. 19 is a view showing a second typical example to which the packet transfer possibility determination method according to the present invention is applied.

FIG. 19 is a view showing a second typical example to which the packet transfer possibility determination method according to the present invention is applied.

In FIG. 19, a mobile terminal apparatus 60b is going to communicate with a terminal apparatus 60a. At a first location, the mobile terminal apparatus 60b determines whether or not the communication is possible by sending packets of the trial class (M-class) to a path passing through packet transfer apparatuses 11d, 11e, and 11f. If they are admitted, the terminal apparatus 60b conducts communication with the terminal apparatus 60a by sending packets (having the size of bwh1f) of the priority class (H-class). Thereafter, the terminal apparatus 60b, while communicating with the terminal apparatus 60a, moves to a location that conducts communication through a path passing through the packet transfer apparatuses 11d, 11e, and 11g. Namely, a handover is carried out. At the handover, the communication must be continued. Accordingly, the packet transfer apparatus 11e conducts no communication possibility determination with the use of packets of the M-class at the time of the handover. Instead, the packet transfer apparatus 11e transfers packets of the H-class to the packet transfer apparatus 11g from the beginning. According to the above-mentioned processing method of the present invention, the packet transfer apparatus 11f that has received packets from the packet transfer apparatus 11e will have a free band. On the other hand, the packet transfer apparatus 11g that is going to receive new packets from the packet transfer apparatus 11e accepts the H-class packets if BWmh≥bwh1f+bwh1g+bwm1g (where the sum "bwh1g+bwm1g" is the size of packets originally transferred by the packet transfer apparatus 11g). However, if BWmh<bwh1f+bwh1g+bwm1g, M-class packets will be discarded although no H-class packets will be discarded.

In case of the variable band flow explained in the BACKGROUND ART, the present invention discards M-class packets when a total flow rate exceeds the capacity BWmh due to band expansion. If there are no M-class packets, a band variation up to the capacity BWh is allowed.

A method employing a single band threshold value is sometimes called a static mode, and a method employing two band threshold values is sometimes called an elastic mode.

According to the above-mentioned embodiments, a terminal apparatus transfers a packet whose priority is indicated with a ToS value, and a packet transfer apparatus assigns a class corresponding to the priority to the packet and transfers the packet. This does not limit the present invention. Instead of the terminal apparatus, the packet transfer apparatus (such as an edge router and a home gateway) may carry out the function of the terminal apparatus. The present invention is applicable to communication that classifies packets according to importance instead of priority.

Embodiments of a packet transfer system, packet monitor method, call control apparatus, and packet transfer apparatus, to monitor ToS transition and packet flow rates according to the present invention will be explained.

Figure 20:
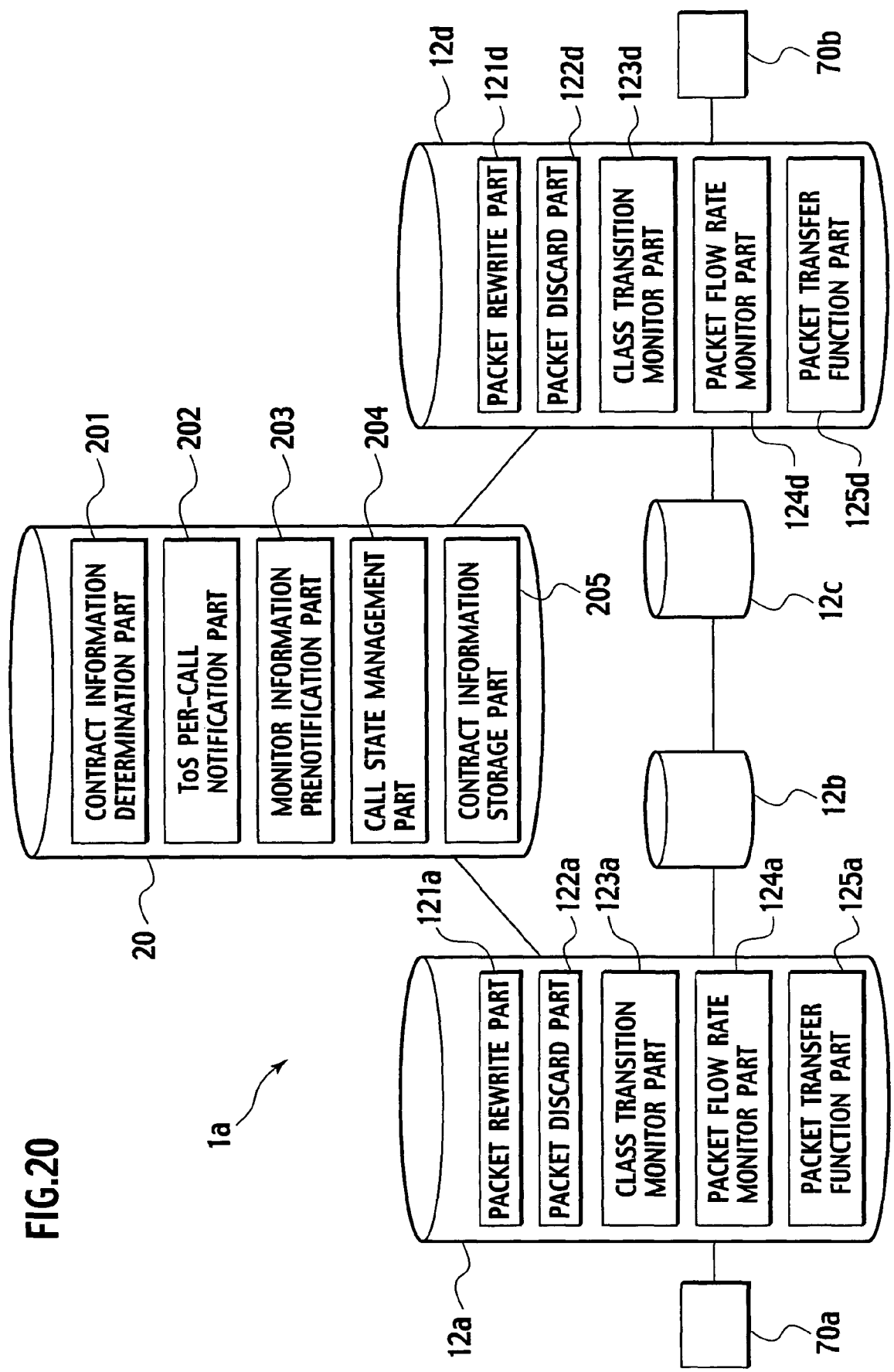
FIG. 20 is a view showing a configuration of a packet transfer system according to an embodiment of the present invention.

FIG. 20 is a view showing a configuration of an embodiment of the packet transfer system according to the present invention. FIG. 21 is a view showing priority levels of packets in the packet transfer system.

The packet transfer system 1a of this embodiment transfers IP (Internet protocol) packets to carry out real-time communication such as voice communication. The packet transfer system establishes, in response to a request from a terminal apparatus, a call for real-time communication with another terminal apparatus and controls packet transfer between the terminal apparatuses.

According to service information in the header of an IP packet, the packet transfer system controls a quality of service (QoS). Each terminal apparatus determines the quality of service of IP packets to transmit according to a contract.

In FIG. 20, the packet transfer system 1a of this embodiment includes a plurality of packet transfer apparatuses 12a to 12d to transfer packets and a call control apparatus 20 that communicates with the packet transfer apparatuses 12a to 12d to control a call for voice communication and the like between terminal apparatuses 70a and 70b connected to the packet transfer apparatuses 12a and 12d, respectively. The call control apparatus 20 stores contract information about the quality of service of each terminal apparatus.

The call control apparatus 20 includes a contract information determination part 201 to determine whether or not types of service actually requested by the terminal apparatuses 70a and 70b are included in types of service contained in the contract information, a ToS per-call notification part 202 to notify the packet transfer apparatuses 12a and 12d of ToS information when issuing a packet monitor instruction per call, a monitor information prenotification part 203 to notify the packet transfer apparatuses 12a and 12d of monitor information when issuing a packet monitor instruction per call, a call control function part 204 to control a call between terminal apparatuses, and a contract information storage part 205 to prestore contract information that includes at least a priority-level-transition pattern usable by terminal apparatuses accommodated.

The packet transfer apparatus 12a (12d) includes a packet rewrite part 121a (121d) to rewrite the type of service of a received packet into a type of service of communication set in the monitor information if the type of service in the packet header of the received IP packet from the terminal apparatus 70a (70b) disagrees with the type of service of communication set in the monitor information, a packet discard part 122a (122d) to discard a received packet if a type of service in the packet header of the received IP packet from the terminal apparatus 70a (70b) disagrees with a type of service of communication set in the monitor information, a class transition monitor part 123*a* (123*d*) to monitor a packet sent from the terminal apparatus 70*a* (70*b*), determine whether or not a type of service in the IP packet header of the packet agrees with a type of service of communication set in the monitor information, and monitor packets according to a transition of the priority levels of the packets, a packet flow rate monitor part 124*a* (124*d*) to monitor a flow rate of packets communicated and determine whether or not the flow rate is within a range between a reference maximum value and a reference minimum value, and a packet transfer function part 125*a* (125*d*) to transfer packets in order of priorities between the terminal apparatuses.

The packet transfer apparatuses 12*a* to 12*d* receive each packet, assign a priority level such as Diffserv (differentiated service) to the packet according to a type of service (ToS) set in the header of the packet, and transfer the packet. For example, in FIG. 21, priority levels are classified into a priority class (H-class) and a trial class (M-class). A received packet is labeled with one of the classes according to a type of service of the packet. Packets are transferred in order of the labeled classes.

The contract information stored in the call control apparatus 20 includes types of service indicating, for example, data communication without band guarantee and real-time communication with band guarantee as well as guarantee for a transfer delay time, delay fluctuation, and a packet loss rate. If a type of service requested by a terminal agrees with a contracted type of service, the requested communication is allowed, and if not, is rejected.

The type of service of a packet is related to the priority level of the packet and a priority level transition pattern. The monitor information in the call control apparatus 20 is notified by the monitor information prenotification part 203 of the call control apparatus 20 to the packet transfer apparatuses.

Figure 22:
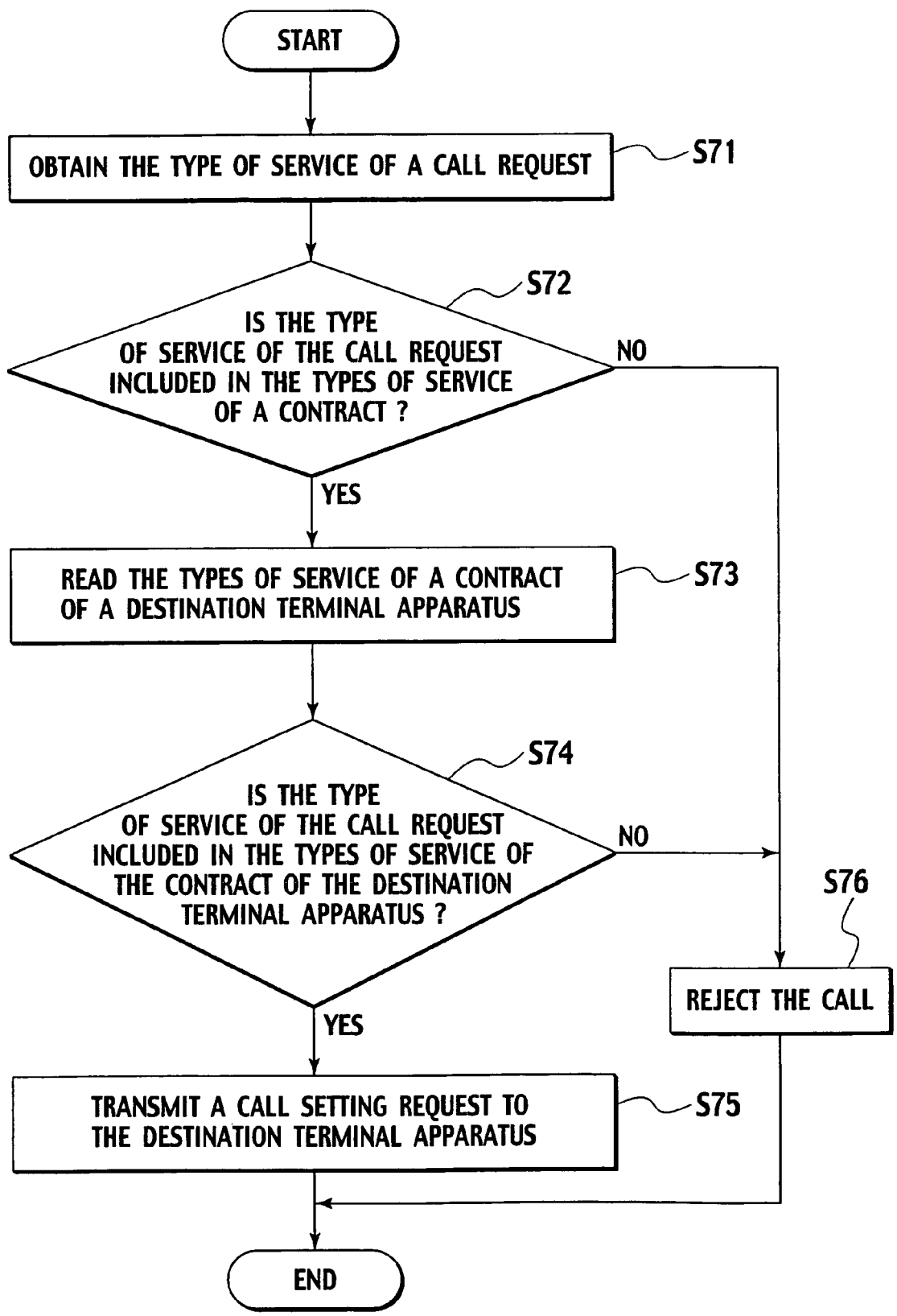
FIG. 22 is a flowchart showing a procedure carried out in a call control apparatus when a call setting request is received.

FIG. 22 is a flowchart showing a procedure carried out in the call control apparatus when a call setting request is received.

In the packet transfer system 1*a*, the terminal apparatus 70*a* tries to set a call for real-time communication. First, the terminal apparatus 70*a* transmits, to the call control apparatus 20, a call setting request including information about an opposite party to communicate with and information about a type of service indicating real-time communication.

The call control apparatus 20 receives the call setting request from the terminal apparatus 70*a*, obtains the type of service of the requested communication from information contained in the call setting request (step S71), compares the obtained type of service with a type of service written in contract information related to the caller terminal apparatus 70*a* stored in the contract information storage part 205 (step S72), and if the type of service in the call setting request disagrees with the type of service in the contract information (negative determination in step S72) rejects the call (step S76).

If the type of service in the call setting request agrees with the type of service in the contract information (affirmative determination in step S72), a type of service is read from contract information related to the destination terminal apparatus 70*b* according to the destination information (step S73), the type of service in the call setting request is compared with the type of service written in the contract information of the destination terminal apparatus 70*b* (step S74), and if the type of service in the call setting request disagrees with the type of service in the contract information of the destination terminal apparatus 70*b* (negative determination in step S74), the call is rejected (step S76).

If the type of service in the call setting request agrees with the type of service in the contract information (affirmative determination in step S74), the destination terminal apparatus 70*b* is asked if it is ready for communication by transmitting a call setting request containing information about the caller terminal apparatus 70*a* and information about the type of service of communication to the destination terminal apparatus 70*b* (step S75).

The destination terminal apparatus 70*b* receives the call setting request from the call control apparatus 20, checks the information about the caller terminal apparatus 70*a* and the information about the type of service of communication, and if determines that communication is possible, replies the call control apparatus 20 that it is ready for communication.

Figure 23:
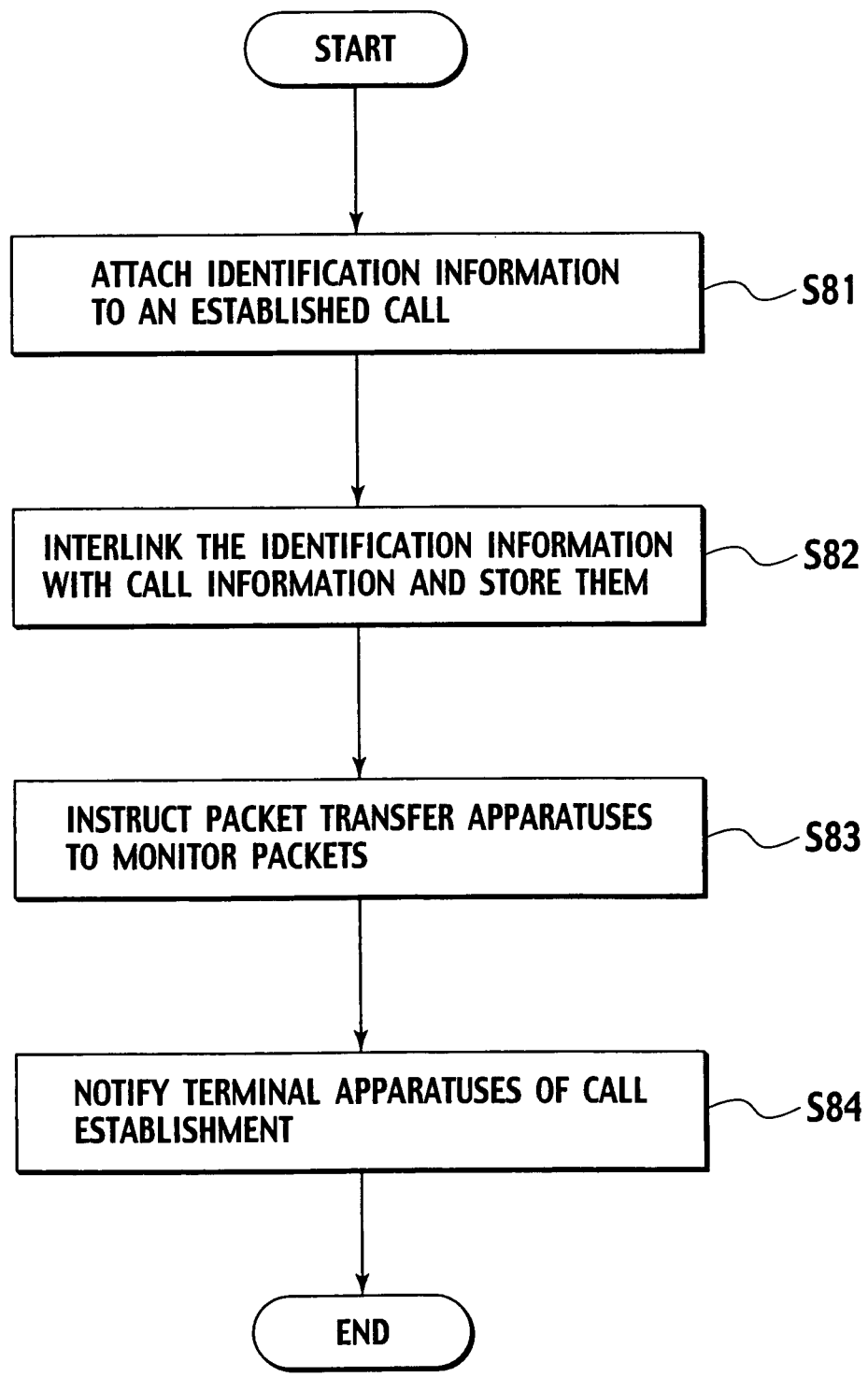
FIG. 23 is a flowchart showing a procedure carried out in the call control apparatus when a call is established.

FIG. 23 is a flowchart showing a procedure carried out in the call control apparatus when a call is established.

The call control apparatus 20 receives a notification from the destination terminal apparatus 70*b* that it is ready for communication, admits that a call has been set, assigns identification information such as an identification number to the call (step S81), and stores information about the caller terminal apparatus 70*a*, destination terminal apparatus 70*b*, type of service of communication, and the like in connection with the identification information (step S82).

To the packet transfer apparatus 12*a* accommodating the caller terminal apparatus 70*a* and the packet transfer apparatus 12*d* accommodating the destination terminal apparatus 70*b*, the call control apparatus 20 sends monitor information including data to identify packets exchanged between the terminal apparatuses 70*a* and 70*b* (for example, the IP addresses and port numbers of the terminal apparatuses), the type of service of communication, and call identification information and instructs the packet transfer apparatuses 12*a* and 12*d* to monitor packets (step S83).

The call control apparatus 20 notifies the caller terminal apparatus 70*a* and destination terminal apparatus 70*b* that the call has been established (step S84).

Upon receiving the notification that the call has been established, the terminal apparatuses 70*a* and 70*b* start real-time communication with each other according to real-time communication protocols such as RTP (real-time transport protocol).

Upon receiving the type of service, the packet transfer apparatuses 12*a* and 12*d* retrieve monitor information based on service information, from the information received beforehand from the monitor information prenotification part 203 of the call control apparatus 20. The class transition monitor parts 123*a* and 123*d* of the packet transfer apparatuses 12*a* and 12*d* monitor packets sent from the terminal apparatuses 70*a* and 70*b*, respectively, and determine whether or not a type of service in the header of each IP packet agrees with the type of service of communication set in the monitor information. The flow-rate monitor parts 124*a* and 124*d* of the packet transfer apparatuses 12*a* and 12*d* monitor a flow rate of packets of the communication and determine whether or not the flow rate is within a range between a reference maximum value and a reference minimum value. The monitoring of a flow rate according to the reference maximum and minimum values is achievable by a single unit such as the packet-flow-rate monitor part 124*a* (124*d*), to reduce a facility cost.

If the priority level of the header of an IP packet agrees with a priority level corresponding to the type of service of communication and if the flow rate is within the range between the reference maximum value and the reference minimum value, the packet is determined to be proper and is transferred as it is at the priority level thereof.

If the terminal-initiative, measurement-based admission control method is employed, priority levels will be changed during communication. Accordingly, the present invention uses common transition patterns of packet levels for the call control apparatus 20 and packet transfer apparatuses 12a and 12d and provides the common transition patterns with identifiers. When issuing a packet monitor instruction for a given call, the call control apparatus 20 notifies the packet transfer apparatuses 12a and 12d of a transition pattern identifier. If a packet is determined to be proper, the class transition monitor parts 123a and 123d of the packet transfer apparatuses 12a and 12d refer to a transition pattern corresponding to the notified identifier, find an appropriate priority level and a flow rate for a next coming packet without sequentially receiving individual instructions from the call control apparatus 20, and prepare for monitoring the next packet. An example of a proper pattern (transition pattern) of priority levels is the pattern explained in connection with the above-mentioned retry communication control method. Namely, the pattern includes sending test packets of the trial class (M-level) for a period of five seconds or over at the start of communication, to determine whether or not communication is possible, setting a predetermined standby period if it is determined that communication is impossible according to a communication condition of the test packets, and sending priority packets of the priority class (H-class) if it is determined that communication is possible.

If a priority level in the header of an IP packet disagrees with a priority level corresponding to a type of service of communication, or if a flow rate exceeds the reference maximum value, or if the flow rate drops below the reference minimum value, the packet transfer apparatuses 12a and 12d transmit contract violation notification containing the call identification information and violation reason information to the call control apparatus 20.

The call control apparatus 20 receives the contract violation notification, reads information about a pair of the terminal apparatuses that are communicating with each other from the notified call identification information, and sends a request to cut and release the call to the terminal apparatuses.

This embodiment inspects the contract contents of a destination terminal apparatus and rejects to establish a call if a requested level is higher than a contract level. It is possible to establish a call according to the contract contents of a destination terminal apparatus. It is also possible to establish a call by adjusting the priority level of communication from a destination terminal apparatus to a caller terminal apparatus or from the caller terminal apparatus to the destination terminal apparatus to the contract contents of the destination terminal apparatus.

According to a modification of this embodiment, when the packet transfer apparatuses 12a and 12d find that a type of service in the packet header of each IP packet sent from the terminal apparatuses 70a and 70b disagrees with a type of service of communication set in monitor information, the received packets are discarded by the packet discard parts 122a and 122d. This configuration can block contract violation packets and carry out communication only with packets conforming to the contract.

According to another modification of this embodiment, when the packet transfer apparatuses 12a and 12d find that a type of service in the packet header of each IP packet sent from the terminal apparatuses 70a and 70b disagrees with a type of service of communication set in monitor information, the packet rewrite parts 121a and 121d rewrite the type of service of each received packet into the type of service of communication set in the monitor information. This configuration can transfer a contract violation packet as a packet conforming to contract information, to thereby conduct communication only with packets conforming to the contract.

Figure 24:
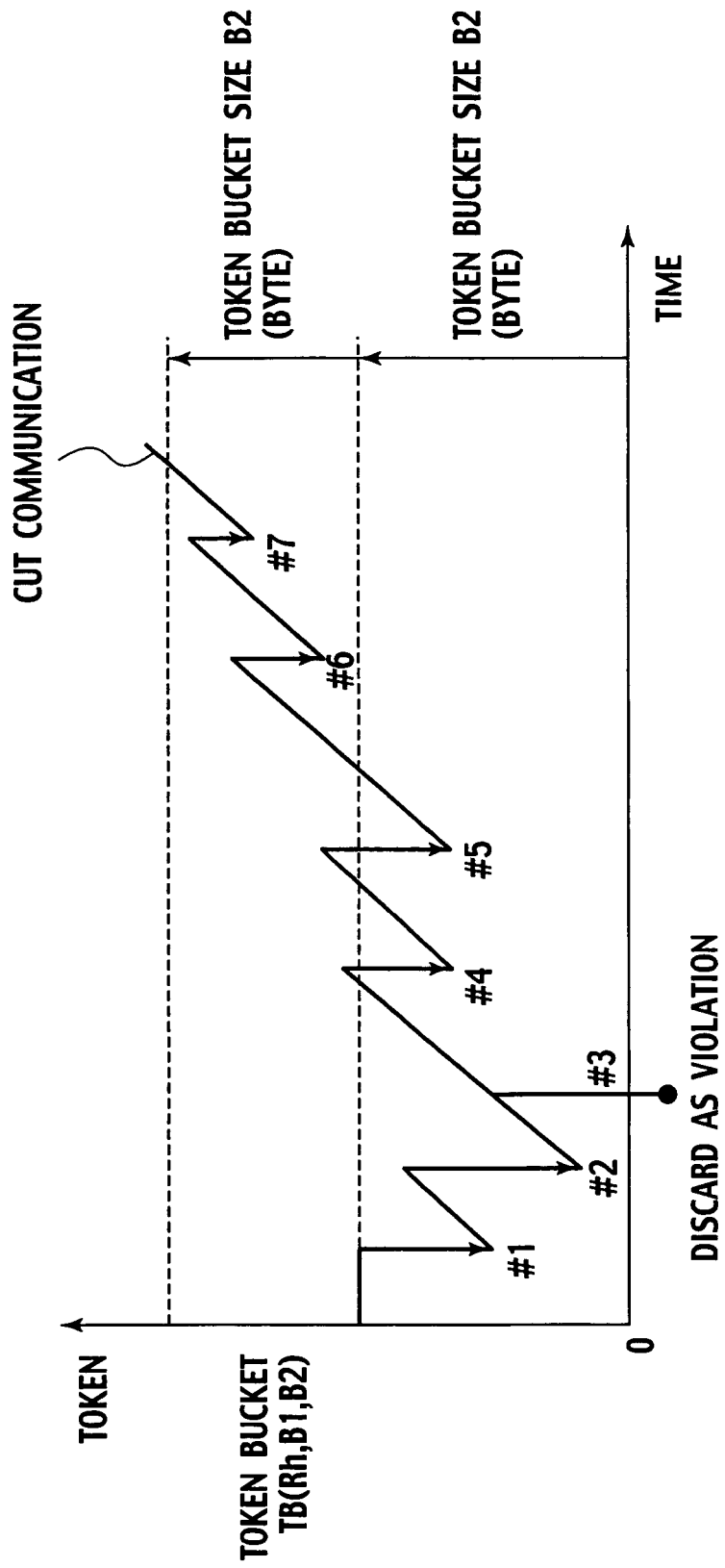
FIG. 24 is a view showing a change in a token counter in response to arrived packets according to an embodiment of the present invention.

A concrete example of monitoring upper and lower flow-rate limits with the above-mentioned packet-flow-rate monitor part 124a (124d) will be explained. FIG. 24 is a view showing changes in a token counter in response to arrived packets according to an embodiment of the present invention.

In FIG. 24, a burst size B1 is set as an initial value of the token counter. The token counter value is decremented by a packet length at the arrival of a packet, and thereafter, is incremented in response to a leak rate. This configuration is a conventional one. In the example of FIG. 24, the arrival of a packet #3 exceeds the burst size (lower limit value). Namely, a flow rate exceeds a reference maximum value, and therefore, the packet is discarded as a violation packet.

According to a characteristic of the present invention, an upper value of the token counter is set to be greater than the initial value, so that the token counter is allowed to be incremented to a certain extent above the initial value. In FIG. 24, the upper limit value (a reference minimum value for a flow rate) is set to be greater than the initial value by B2 bytes. This allows to monitor a situation in which a small amount of packets arrive (a flow rate is extremely small).

To detect the situation in which only a little amount of packets arrives, the value of the token counter must be checked at different timing from the arrival of each packet. For this, a time period in which the token counter will exceed the upper limit is calculated when a preceding packet is sent and the timing of monitoring is set, so that an event of the token counter is detected at the timing of monitoring without regard to the arrival of a packet. Alternatively, periodical monitoring timing is set so that an event of the token counter is periodically detected irrespective of the arrival of a packet. In the example of FIG. 24, the value of the token counter exceeds the upper limit (the flow rate drops below the reference minimum value) at the arrival of a packet #7. Then, it is determined that a packet traffic is insufficient, and corresponding communication is cut.

Embodiments of a packet transfer system, packet monitor method, call control apparatus, packet transfer apparatus, and monitor apparatus according to the present invention involving a discrete dedicated monitor apparatus for monitoring packets will be explained.

<First Embodiment of the Present Invention Employing Single Dedicated Monitor Apparatus>

FIG. 25 is a view showing a general configuration of a first embodiment of a packet transfer system according to the present invention.

The packet transfer system 1b of this embodiment transfers IP packets like the previously mentioned system, and in particular, conducts real-time communication such as voice communication with the use of the IP packets. The packet transfer system 1b establishes a call for real-time communication with a destination terminal according to a request from a terminal apparatus and controls packet transfer between the terminal apparatuses.

In FIG. 25, the packet transfer system according to this embodiment includes a plurality of packet transfer apparatuses 13a to 13d to transfer packets, a call control apparatus 21 to control a call for voice communication and the like between terminal apparatuses 80a and 80b connected to the packet transfer apparatuses 13a and 13d, respectively, and a monitor apparatus 30 to monitor received packets and transfer them to a specified destination.

This packet transfer system 1b uses the monitor apparatus 30 to monitor (inspect the contents of packets, change packets, discard packets, monitor transfer quality, check sending procedures, and the like) packets transmitted from the terminal apparatuses. The call control apparatus 20 sets the address of a terminal apparatus to be monitored.

The packet transfer apparatus 13a (13d) has a packet transfer part 131a (131d) to transfer packets at their respective priority levels between the terminal apparatuses.

The call control apparatus 21 includes a user management part 211 to manage user information of each terminal apparatus, a communication history management part 212 to manage the communication history of packets exchanged between the terminal apparatuses, a call state management part 213 to manage the state of a call between the terminal apparatuses, a monitor object determination part 214 to determine whether or not a call must be monitored when receiving a call setting request, an address notification part 215 to notify the terminals related to a call to be monitored of the address of the monitor apparatus 30 when receiving a call setting request, and a monitor communication part 216 to inform the monitor apparatus 30 of information about a monitor object and instruct to start monitoring.

The monitor apparatus 30 includes a packet monitor part 301 to relay packets exchanged between the terminal apparatuses and read the contents of the packets and a packet rewrite part 302 to rewrite the destinations, sources, and the like of the packets.

FIG. 26 is a flowchart showing a procedure carried out in the packet transfer system of the first embodiment when a call setting request is received.

In the packet transfer system 1b, the terminal apparatus 80a, for example, intends to set a call for real-time communication and transmits a call setting request including information about a destination to communicate with, information about a type of service of the communication, and the like to the call control apparatus 21.

The call control apparatus 21 receives the call setting request from the terminal apparatus 80a, and as shown in the flowchart of FIG. 26, determines whether or not any one of the terminal apparatus 80a and destination terminal apparatus 80b is a terminal apparatus to be monitored (step S91).

If none of the terminal apparatuses is a terminal apparatus to be monitored, the call control apparatus 21 asks the destination terminal apparatus 80b whether or not it is ready for communication by transmitting a call setting request including information about the caller terminal apparatus 80a, the information about the type of service of communication, and the like to the destination terminal apparatus 80b (step S93).

The destination terminal apparatus 80b receives the call setting request from the call control apparatus 21, checks the information about the caller terminal apparatus 80a, the information about the type of service of communication, and the like, and if communication is possible, returns a communication possible notification to the call control apparatus 21. Then, real-time communication from the terminal apparatus 80b to the terminal apparatus 80a is started according to a real-time communication protocol such as an RTP (real-time transport protocol).

The call control apparatus 21 receives the communication possible notification from the destination terminal apparatus 80b, determines that the call has been set, assigns identification information such as an identification number to the set call, stores the information about the caller terminal apparatus 80a and destination terminal apparatus 80b, the information about the type of service of communication, and the identification information related thereto, and transmits a communication possible notification including the address information of the destination terminal apparatus 80b to the caller terminal apparatus 80a.

The terminal apparatus 80a receives the communication possible notification and starts real-time communication from the terminal apparatus 80a to the terminal apparatus 80b according to the real-time communication protocol such as the RTP.

A concrete example of the call control procedure mentioned above is an SIP (session initiation protocol). Determining whether or not a terminal apparatus must be monitored may be made when a destination terminal apparatus responds and a communication mode is established.

Returning to the flowchart of FIG. 26, if any one of the caller and destination terminal apparatuses is a terminal apparatus to be monitored after receiving the call setting request, the call control apparatus 21 rewrites the address of the caller terminal apparatus 80a contained in the call setting request asking whether or not the destination terminal apparatus 80b is ready for communication into the address of the monitor apparatus 30 and sends it with the information about the type of service of communication to the destination terminal apparatus 80b (step S92).

The destination terminal apparatus 80b receives the call setting request from the call control apparatus 21, inspects the information about the caller terminal apparatus 80a, the information about the type of service of communication, and the like, and if determines that communication is possible, returns a communication possible notification to the call control apparatus 21. Then, the destination terminal apparatus 80b starts real-time communication with respect to the address information set in the caller address information (the address information of the monitor apparatus 30).

FIG. 27 is a flowchart showing a procedure carried out in the packet transfer system of the first embodiment when a call is established.

The call control apparatus 21 receives a communication possible notification from the destination terminal apparatus 80b, determines that a call has been set, and as shown in the flowchart of FIG. 27, transmits a monitor start instruction to the monitor apparatus 30 (step S101), the monitor start instruction including address information about the caller terminal apparatus 80a and destination terminal apparatus 80b, information about a type of monitoring, information about the type of service of communication, and the like.

The call control apparatus 21 assigns identification information such as an identification number to the set call (step S102), stores the information about the caller terminal apparatus 80a and destination terminal apparatus 80b, the information about the type of service of communication, and the identification information related thereto (step S103), and transmits a communication possible notification including the address information of the monitor apparatus 30 as destination address information to the caller terminal apparatus 80a (step S104).

The monitor apparatus 30 receives the monitor start instruction and stores the information set in the monitor start instruction so that the information is retrievable according to the address information of the terminal apparatuses 80a and 80b.

The terminal apparatus 80a receives the communication possible notification and starts real-time communication with respect to the address (the address of the monitor apparatus 30) set in the destination address information.

In such a monitored call, the terminal apparatus 80a transfers packets to the address (the address of the monitor apparatus 30) set in the destination address information contained in the communication possible notification. The packets are transferred through the packet transfer system to the monitor apparatus 30.

Figure 28:
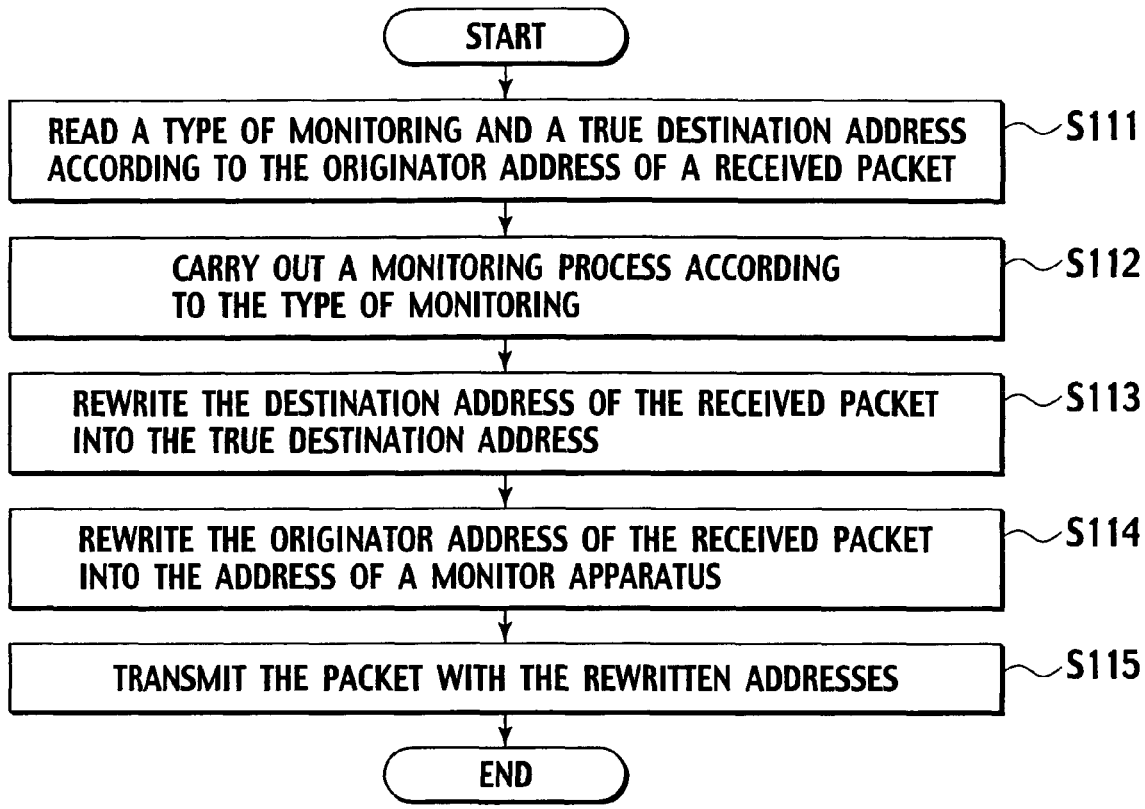
FIG. 28 is a flowchart showing a monitoring procedure carried out in the packet transfer system of the first embodiment.

FIG. 28 is a flowchart showing a monitoring procedure carried out in the packet transfer system of the first embodiment.

As shown in the flowchart of FIG. 28, the monitor apparatus 30 refers to an originator address in a received packet, reads address information (address information about the terminal apparatus 80b) of a true destination and a type of monitoring according to the originator address (step S111), carries out a monitoring process according to the type of monitoring (step S112), rewrites the destination address of the received packet into the address of the terminal apparatus 80b (step S113), rewrites the originator address of the received packet into the address of the monitor apparatus 30 (step S114), and transmits the packet with the rewritten addresses to the next packet transfer apparatus (step S115). The packet is transferred through the packet transfer apparatuses to the terminal apparatus 80b.

The terminal apparatus 80b transmits a packet whose destination address is the address (the address of the monitor apparatus 30) set in the address information of the caller terminal apparatus that made the call setting request. The packet is transferred through the packet transfer system to the monitor apparatus 30.

The monitor apparatus 30 refers to an originator address of the received packet, reads a type of monitoring and address information (address information about the terminal apparatus 80a) of a true destination, carries out a monitoring process according to the type of monitoring, rewrites the destination address into the address of the terminal apparatus 80a, rewrites the originator address into the address of the monitor apparatus, and transmits the packet to the next packet transfer apparatus. The packet is transferred through the packet transfer system to the terminal apparatus 80a.

In this way, communication between the terminal apparatuses 80a and 80b is carried out through the monitor apparatus 30 and is monitored without the users of the terminal apparatuses 80a and 80b knowing it.

When the communication ends, the terminal apparatuses 80a and 80b send a call disconnection request. The call control apparatus 21 transmits a monitor termination instruction including address information about the terminal apparatuses 80a and 80b to the monitor apparatus 30, to delete the stored call identification information, terminal apparatus information, communication service information, and the like.

The monitor apparatus 30 receives the monitor termination instruction and deletes the information about the terminal apparatuses 80a and 80b stored therein and set in the monitor start instruction.

According to this embodiment, the call control apparatus 21 notifies, when setting a call, the terminal apparatus related to the call to be monitored of the address information of the monitor apparatus 30 as the address information of a communication destination. Upon receiving a packet, the monitor apparatus 30 rewrites the originator address and destination address of the received packet. This embodiment can pass the communication of an optional call through the monitor apparatus 30, and therefore, eliminates the need of providing each edge packet transfer apparatus with a monitoring function, to thereby reduce a facility cost.

This embodiment monitors packets at the single monitor apparatus. Namely, there is no need of collecting monitored results from many packet transfer apparatuses, to thereby reduce a management cost.

In the above explanation, an object to be monitored is determined according to terminal information registered in advance. In connection with objects to be monitored and a selection logic of monitored objects, there will be modifications mentioned below.

An object to be monitored may be a terminal so that every call related to the terminal is monitored. An object to be monitored may be a specific call. Alternatively, an object to be monitored may be a user so that every call related to the user is monitored.

A selection logic is, for example, optional selection, selection based on a previous monitor result, selection based on a communication attribute contained in a call control signal, or selection based on the presence or absence of a routing apparatus that is set in a call setting signal.

An example of the selection based on a previous monitor result will be explained. First, optional selection is used to monitor communication. If a possibility of abnormal operation is detected in a result of the optional selection, the detection result is recorded in the communication history management part 212 of the call control apparatus 21. When a new signal is sent from the same terminal or the same user, the recorded communication history is referred to, and the one having a high possibility of abnormal operation is selected as an object to be monitored.

The selection based on a communication attribute will be explained. This considers the influence of a fraudulent terminal on a communication network and selects communication requesting a large communication band as an object to monitor. Communication requesting a small communication band is not selected as an object to monitor even if it is a fraudulent terminal because its influence on a network is small.

An example of the selection based on the presence or absence of a routing apparatus set in a call setting signal will be explained. Between a transmission terminal and the monitor apparatus, there will be a home gateway apparatus that is provided by a communication company, is reliable, and provides a terminal monitoring function. Alternatively, there will be terminal software that is provided by a communication company and is reliable. In this case, the reliability is written in a call setting signal, and therefore, the call control apparatus that receives the signal decreases the priority to monitor the call.

In this explanation, a monitored object is a terminal and whose communication is identified according to the address of the terminal. If a monitored object is a call, the call is identified according to the IP addresses of transmission and receiver terminals and a port number corresponding to the call. In this case, the call control apparatus must determine a monitored object, obtain a port from the monitor apparatus, and notify a caller terminal apparatus and a destination terminal apparatus of the port.

Figure 29:
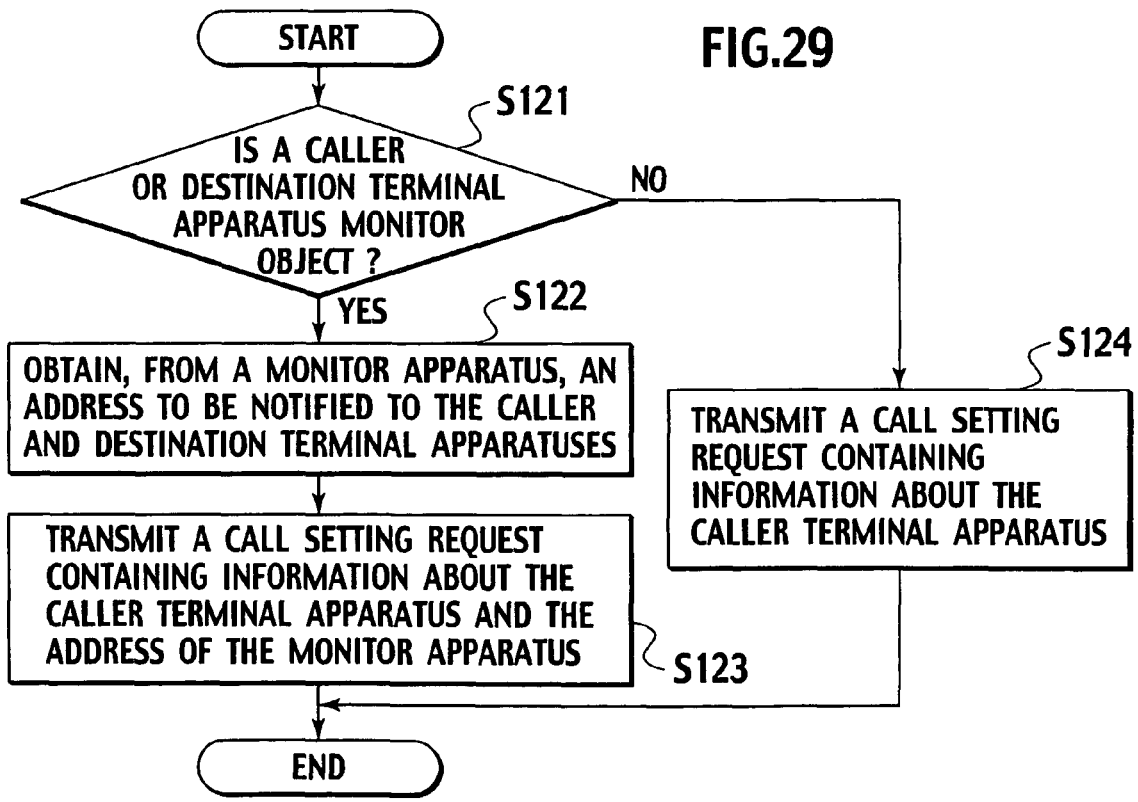
FIG. 29 is a flowchart showing a procedure carried out in the packet transfer system when a monitored object is a call and when a call setting request is received.

FIG. 29 is a flowchart showing a procedure carried out in the packet transfer system when a monitored object is a call and when a call setting request is received.

In step S122, the call control apparatus 21 obtains a port from the monitor apparatus so that a caller terminal apparatus and destination terminal apparatus are notified of the port. The other processes are the same as those of FIG. 26.

<Second Embodiment of the Present Invention Employing Single Dedicated Monitor Apparatus>

Figure 30:
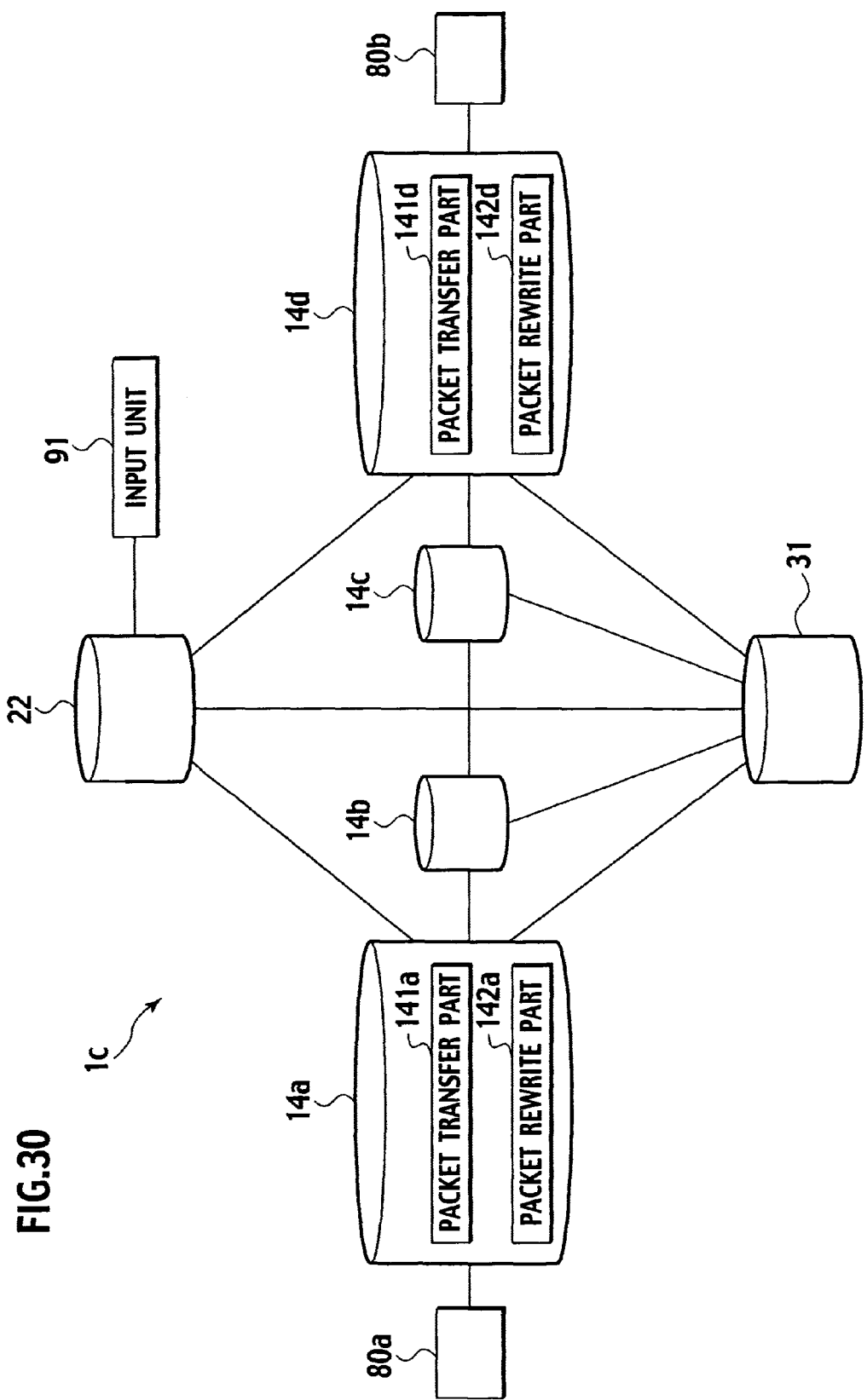
FIG. 30 is a view showing a general configuration of a second embodiment of the packet transfer system according to the present invention employing a single dedicated monitor apparatus.

FIG. 30 is a view showing a general configuration of a second embodiment of the packet transfer system according to the present invention.

The packet transfer system 1c of this embodiment is characterized in that the address of a packet exchanged in a call to be monitored is rewritten by a packet transfer apparatus accommodating a terminal apparatus that transmits the packet as well as by a monitor apparatus so that the packet is monitored without notifying the terminal apparatus of the address of the monitor apparatus.

In FIG. 30, the packet transfer system 1c of this embodiment includes a plurality of packet transfer apparatuses 14a to 14d to transfer packets, a call control apparatus 22 to control a call for voice communication and the like between terminal apparatuses 80a and 80b connected to the packet transfer apparatuses 14a and 14d, respectively, and a monitor apparatus 31 to monitor received packets and transfer the same to a specified destination.

The packet transfer apparatus 14a (14d) has a packet transfer part 141a (141d) to transfer packets at their respective priority levels between the terminal apparatuses and a packet rewrite part 142a (142d) to rewrite the destination and originator addresses of each packet to be transferred.

The packet transfer system 1c uses the monitor apparatus 31 to monitor packets transmitted from the terminal apparatuses.

In the packet transfer system 1c, the terminal apparatus 80a, for example, sets a call for real-time communication. For this, the terminal apparatus 80a transmits a call setting request including information about a destination to communicate with and information about a type of service of communication to the call control apparatus 22.

The call control apparatus 22 receives the call setting request from the terminal apparatus 80a and determines whether or not the destination terminal apparatus 80b is ready for communication by sending a call setting request including information about the caller terminal apparatus 80a, information about the type of service of communication, and the like to the destination terminal apparatus 80b.

The destination terminal apparatus 80b receives the call setting request from the call control apparatus 22, checks the information about the caller terminal apparatus 80a, the information about the type of service of communication, and the like, and if communication is possible, returns a communication possible notification to the call control apparatus 22. Then, real-time communication from the terminal apparatus 80b to the terminal apparatus 80a is started according to a real-time communication protocol such as an RTP (real-time transport protocol).

The call control apparatus 22 receives the communication possible notification from the destination terminal apparatus 80b, determines that the call has been set, assigns identification information such as an identification number to the set call, stores the information about the caller terminal apparatus 80a and destination terminal apparatus 80b, the information about the type of service of communication, and the identification information related thereto, and transmits a communication possible notification including the destination address information of the destination terminal apparatus 80b to the caller terminal apparatus 80a.

The terminal apparatus 80a receives the communication possible notification and starts real-time communication from the terminal apparatus 80a to the terminal apparatus 80b according to a real-time communication protocol such as the RTP.

The set call is managed by the call control apparatus 22. With an instruction entered in an input unit 91 connected to the call control apparatus 22, a list of calls and a call related to a desired terminal apparatus can be displayed on a display unit. The displayed calls can be monitored by entering an instruction.

When receiving an instruction to monitor a given call, the call control apparatus 22 transmits a monitored transfer start instruction including information about the addresses of the terminal apparatuses 80a and 80b that are communicating with each other on the call to the packet transfer apparatuses 14a and 14d accommodating the terminal apparatuses 80a and 80b, respectively. In addition, the call control apparatus 22 transmits a monitor start instruction containing information about the addresses of the terminal apparatuses 80a and 80b and information about a type of monitoring to the monitor apparatus 31.

The packet transfer apparatuses 14a and 14d receive the monitored transfer start instruction, find the addresses of the accommodating terminal apparatuses and destination terminal apparatuses from the address information of the terminal apparatuses contained in the monitored transfer start instruction, store the information set in the monitored transfer start instruction so that the information is retrievable according to the address information of the accommodating terminal apparatuses, receive packets from the accommodating terminal apparatuses for the destination terminal apparatuses, and rewrites the destination address of each packet into the address of the monitor apparatus 31.

The monitor apparatus 31 receives the monitor start instruction and stores the information set in the monitor start instruction so that the information is retrievable according to the address information of the terminal apparatuses 80a and 80b.

Figure 31:
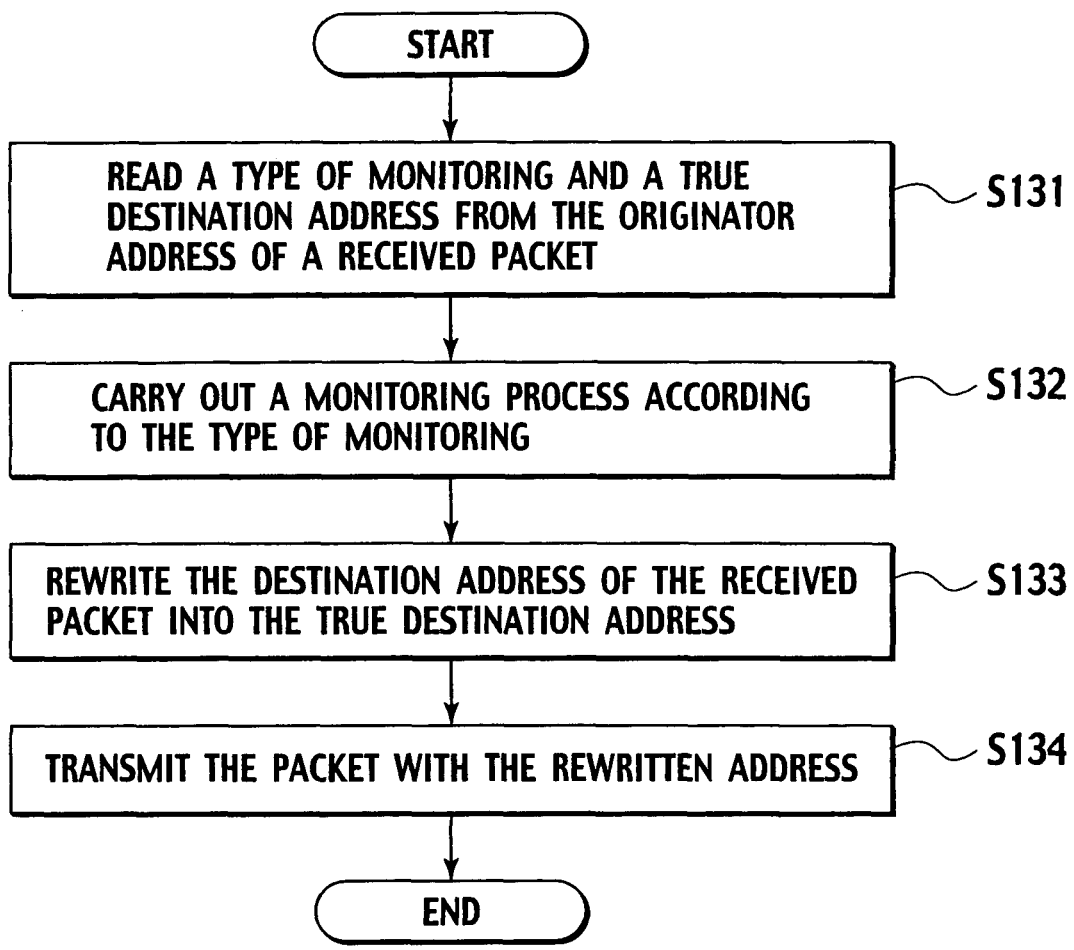
FIG. 31 is a flowchart showing a monitoring procedure carried out in the packet transfer system of the second embodiment.

FIG. 31 is a flowchart showing a monitoring procedure carried out in the packet transfer system of the second embodiment.

The monitor apparatus 31 receives a packet, refers to an originator address in the received packet as shown in the flowchart of FIG. 31, reads address information (address information about the terminal apparatus 80b) of a true destination and a type of monitoring from the originator address (step S131), carries out a monitoring process according to the type of monitoring (step S132), rewrites the destination address of the received packet into the address of the terminal apparatus 80b (step S133), and transmits the packet with the rewritten address to the next packet transfer apparatus (step S134). The packet is transferred through the packet transfer system to the terminal apparatus 80b.

Packet transfer from the terminal apparatus 80b to the terminal apparatus 80a is carried out similarly. Namely, the packet transfer apparatus 14d rewrites the destination address of a packet sent from the terminal apparatus 80b into the address of the monitor apparatus 31. The monitor apparatus 31 monitors the packet, rewrites the destination address of the packet into the address of a true destination, and transfers the packet through the packet transfer system to the terminal apparatus 80a.

In this way, communication between the terminal apparatuses 80a and 80b is passed through and monitored by the monitor apparatus 31 without the users of the terminal apparatuses 80a and 80b knowing it.

When a monitor end instruction is given to the call control apparatus 22 or when the communication ends and a call disconnection request is transmitted from the terminal apparatuses 80a and 80b, the call control apparatus 22 transmits a monitored transfer termination instruction containing the address information of the terminal apparatuses 80a and 80b to the packet transfer apparatuses 14a and 14d accommodating the terminal apparatuses 80a and 80b. Also, the call control apparatus 22 transmits a monitor termination instruction containing the address information of the terminal apparatuses 80a and 80b to the monitor apparatus 31, to delete the stored call identification information, terminal apparatus information, communication service information, and the like.

The packet transfer apparatuses 14a and 14d receive the monitored transfer termination instruction and delete the stored information of the terminal apparatuses 80a and 80b set in the monitored transfer start instruction.

The monitor apparatus 31 receives the monitor termination instruction and deletes the information of the terminal apparatuses 80a and 80b set in the monitor start instruction.

According to this embodiment, a packet transfer apparatus accommodating a terminal apparatus that conducts communication for a call to be monitored rewrites the destination address of each packet received from the accommodating terminal apparatus that conducts communication for the call to be monitored into the address of the monitor apparatus 31. Then, the monitor apparatus 31 rewrites the destination address of the received packet into a true destination address and transmits the packet. Accordingly, the embodiment can pass communication of an optional call through the monitor apparatus 31, thereby eliminating the need of providing each edge packet transfer apparatus with a monitoring function. This results in reducing a facility cost.

Monitoring is achieved at a single location, i.e., at the monitor apparatus. Namely, there is no need of collecting monitored results from many packet transfer apparatuses. This reduces a management cost.

Since the address rewriting operation is carried out by each packet transfer apparatus, monitoring may be started at optional timing during communication.

This embodiment specifies a call to be monitored among calls in communication. Instead, a terminal apparatus may be selected as a monitored object. When a terminal apparatus is specified as a monitored object while having no call in communication, the terminal apparatus can be monitored by transmitting a monitored transfer start instruction to a corresponding packet transfer apparatus when setting a call like the first embodiment.

<Modification of the Second Embodiment>

Figure 32:
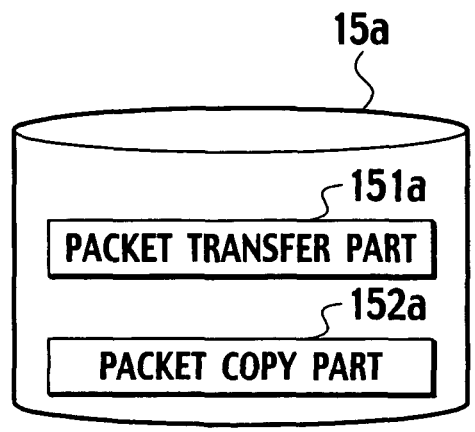
FIG. 32 is a view showing a configuration of a packet transfer apparatus according to a modification of the second embodiment.

FIG. 32 is a view showing a configuration of a packet transfer apparatus according to a modification of the second embodiment. In FIG. 32, the packet transfer apparatus 15a according to the modification has a packet transfer part 151a to transfer packets at their respective priority levels between terminal apparatuses and a packet copy part 152a to copy packets passing through a specific port to another port.

The packet transfer apparatus 15a copies packets passing through a specific port to a second port so that a monitor apparatus connected to the second port may selectively monitor packets.

<Third Embodiment Employing Single Dedicated Monitor Apparatus>

Figure 33:
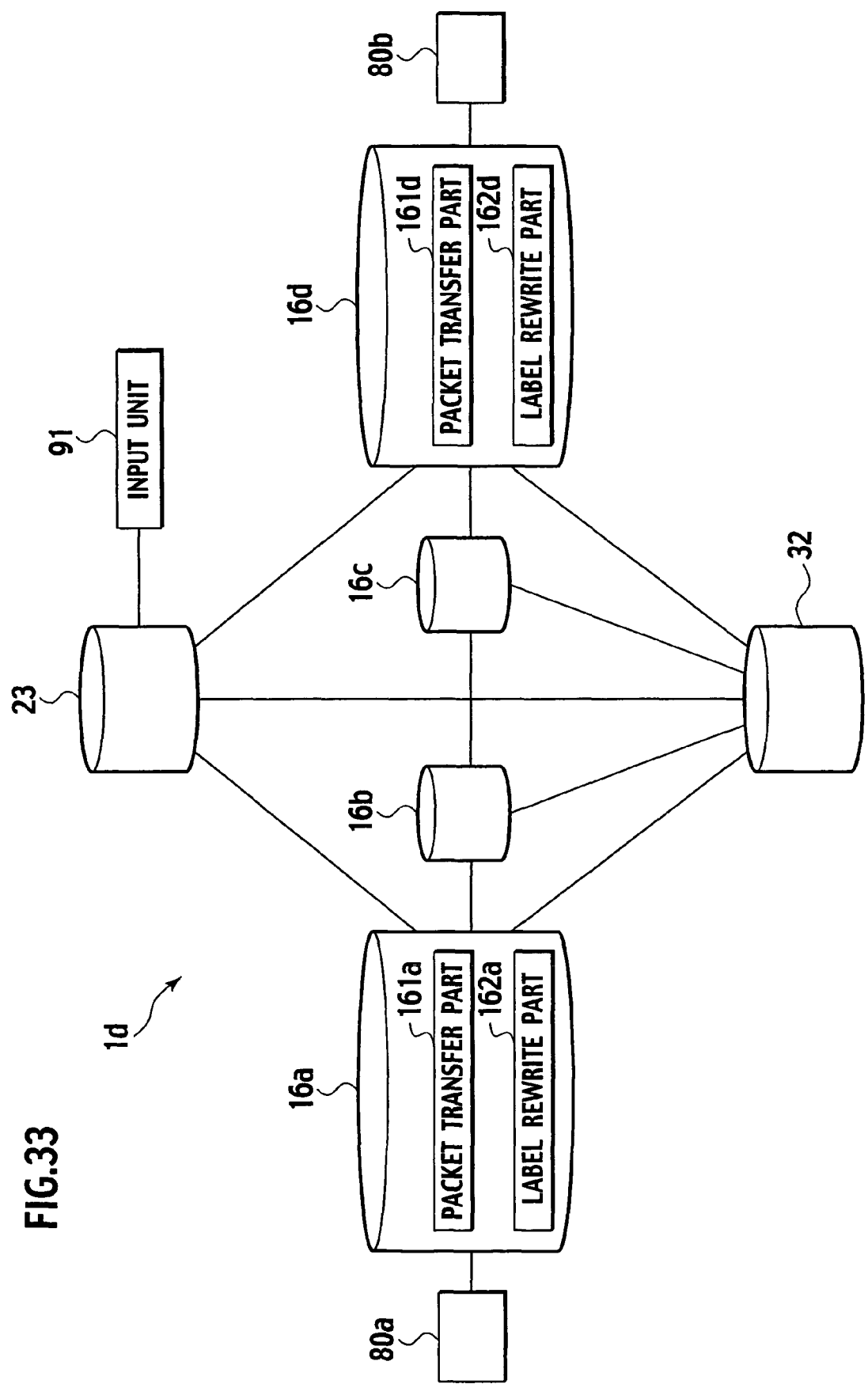
FIG. 33 is a view showing a general configuration of a third embodiment of the packet transfer system according to the present invention employing a single dedicated monitor apparatus.

FIG. 33 is a view showing a general configuration of a third embodiment of the packet transfer system according to the present invention.

The packet transfer system of this embodiment employs MPLS (multi-protocol label switching) to transfer packets. Between terminal apparatuses, an LSP (label switch path) passing through a monitor apparatus is preset, and if a monitor instruction is issued, the MPLS label of each packet to be monitored is provided with an LSP label to pass through the monitor apparatus, so that the packet may pass through the monitor apparatus.

In FIG. 33, the packet transfer system id according to the embodiment includes a plurality of packet transfer apparatuses 16a to 16d to transfer packets, a call control apparatus 23 to control a call for voice communication and the like between terminal apparatuses 80a and 80b connected to the packet transfer apparatuses 16a and 16d, respectively, and a monitor apparatus 32 to monitor received packets and transfer the same to a specified destination.

Among the packet transfer apparatuses 16a to 16d, the packet transfer apparatuses 16a and 16d to which the terminal apparatuses 80a and 80b are connected, respectively, are called edge packet transfer apparatuses.

The packet transfer apparatus 16a (16d) has a packet transfer part 161a (161d) to transfer packets at their respective priority levels between the terminal apparatuses and a label rewrite part 162a (162d) to rewrite the multi-protocol label switching (MPLS) label of each packet to be transferred.

In the packet transfer system 1d, the terminal apparatus 80a, for example, sets a call for real-time communication. For this, the terminal apparatus 80a transmits a call setting request including information about a destination to communicate with and information about a type of service of communication to the call control apparatus 23.

The call control apparatus 23 receives the call setting request from the terminal apparatus 80a and determines whether or not the destination terminal apparatus 80b is ready for communication by sending a call setting request including information about the caller terminal apparatus 80a, information about the type of service of communication, and the like to the destination terminal apparatus 80b.

The destination terminal apparatus 80b receives the call setting request from the call control apparatus 23, checks the information about the caller terminal apparatus 80a, the information about the type of service of communication, and the like, and if communication is possible, returns a communication possible notification to the call control apparatus 23, to start real-time communication with the terminal apparatus 80a.

The call control apparatus 23 receives the communication possible notification from the destination terminal apparatus 80b, determines that the call has been set, assigns identification information such as an identification number to the set call, stores the information about the caller terminal apparatus 80a and destination terminal apparatus 80b, the information about the type of service of communication, and the identification information related thereto, and transmits a communication possible notification to the caller terminal apparatus 80a.

The terminal apparatus 80a receives the communication possible notification and starts real-time communication with the terminal apparatus 80b.

The call set in such a way is managed by the call control apparatus 23. With an instruction entered in an input unit 91 connected to the call control apparatus 23, a list of calls and a call communicated with a desired terminal apparatus can be displayed on a display unit. The displayed calls can be monitored by entering an instruction.

A bidirectional packet transfer route (LSP) passing through the monitor apparatus 32 is set between the terminal apparatuses 80a and 80b. The packet transfer apparatuses 16a and 16d accommodating the terminal apparatuses 80a and 80b store an LSP label to pass through the monitor apparatus for each destination terminal apparatus.

When receiving an instruction to monitor a given call, the call control apparatus 23 transmits a monitored transfer start instruction including address information of the terminal apparatuses 80a and 80b that are communicating with each other on the call to the packet transfer apparatuses 16a and 16d accommodating the terminal apparatuses 80a and 80b, respectively.

Each of the packet transfer apparatuses 16a and 16d receives the monitored transfer start instruction, finds the addresses of the accommodating terminal apparatus and destination terminal apparatus from the address information of the terminal apparatuses contained in the monitored transfer start instruction, stores the information set in the monitored transfer start instruction so that the information is retrievable according to the address information of the accommodating terminal apparatus, receives each packet from the accommodating terminal apparatus for the destination terminal apparatus, sets an LSP label corresponding to the destination terminal apparatus and passing through the monitor apparatus as a shim-header label attached to the packet, and transfers the packet.

Figure 34:
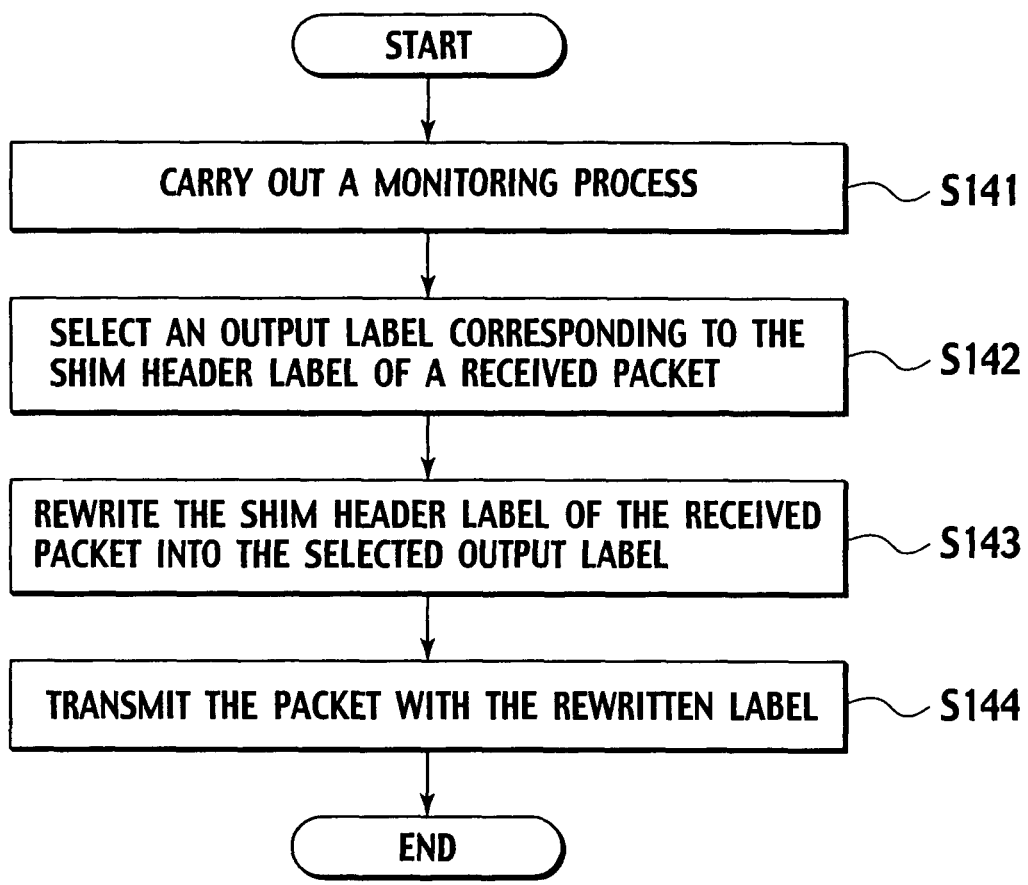
FIG. 34 is a flowchart showing a monitoring procedure carried out in the packet transfer system of the third embodiment.

FIG. 34 is a flowchart showing a monitoring procedure carried out in the packet transfer system of the third embodiment.

The monitor apparatus 32 receives a packet, carries out a monitoring process (step S141), refers to the shim header of the received packet, selects an output label corresponding to the shim header of the received packet (step S142), rewrites the shim header label of the received packet into the selected output label (step S143), and transmits the packet with the rewritten label to the next packet transfer apparatus (step S144). The packet is transferred along the predetermined LSP through the packet transfer system 1d to the terminal apparatus 80b according to the properly rewritten label of the packet.

In this way, communication between the terminal apparatuses 80a and 80b is passed through and monitored by the monitor apparatus 32 without the users of the terminal apparatuses 80a and 80b knowing it.

When a monitor end instruction is given to the call control apparatus 23 or when the communication ends and a call disconnection request is transmitted from the terminal apparatuses 80a and 80b, the call control apparatus 23 transmits a monitored transfer termination instruction containing the address information of the terminal apparatuses 80a and 80b to the packet transfer apparatuses 16a and 16d accommodating the terminal apparatuses 80a and 80b, to delete the stored call identification information, terminal apparatus information, communication service information, and the like.

The packet transfer apparatuses 16a and 16d receive the monitored transfer termination instruction and delete the stored information of the terminal apparatuses 80a and 80b set in the monitored transfer start instruction.

According to this embodiment, an LSP to transfer packets through the monitor apparatus 32 is preset between the terminal apparatuses. A packet transfer apparatus accommodating a terminal apparatus that conducts communication for a call to be monitored sets an LSP label so that each packet from the accommodating terminal apparatus for the call is transferred through the monitor apparatus 32. Then, the monitor apparatus 32 monitors received packets. Accordingly, the embodiment can pass communication of an optional call through the monitor apparatus 32, thereby eliminating the need of providing each edge packet transfer apparatus with a monitoring function. This results in reducing a facility cost.

Monitoring is achieved at a single location, i.e., at the monitor apparatus. Namely, there is no need of collecting monitored results from many packet transfer apparatuses. This reduces a management cost.

Since the label changing operation is carried out by the edge packet transfer apparatuses, monitoring can be started at optional timing during communication.

This embodiment specifies a call to be monitored among calls in communication. Instead, a terminal apparatus may be selected as a monitored object. When a terminal apparatus is specified as a monitored object while having no call in communication, the terminal apparatus can be monitored by transmitting a monitored transfer start instruction to a packet transfer apparatus accommodating the terminal apparatus when setting a call like the first embodiment.

According to this embodiment, the monitor apparatus 32 conducts the same monitoring operation on every received packet. Like the preceding embodiment, the call control apparatus 23 may issue a monitor start instruction to the monitor apparatus 32 at the start of monitoring, to notify the monitor apparatus 32 of the address of a terminal apparatus to be monitored, an LSP input label to be monitored, a type of monitoring, and the like, so that a type of monitoring may be changed call by call.

<Modification of Third Embodiment>

Figure 35:
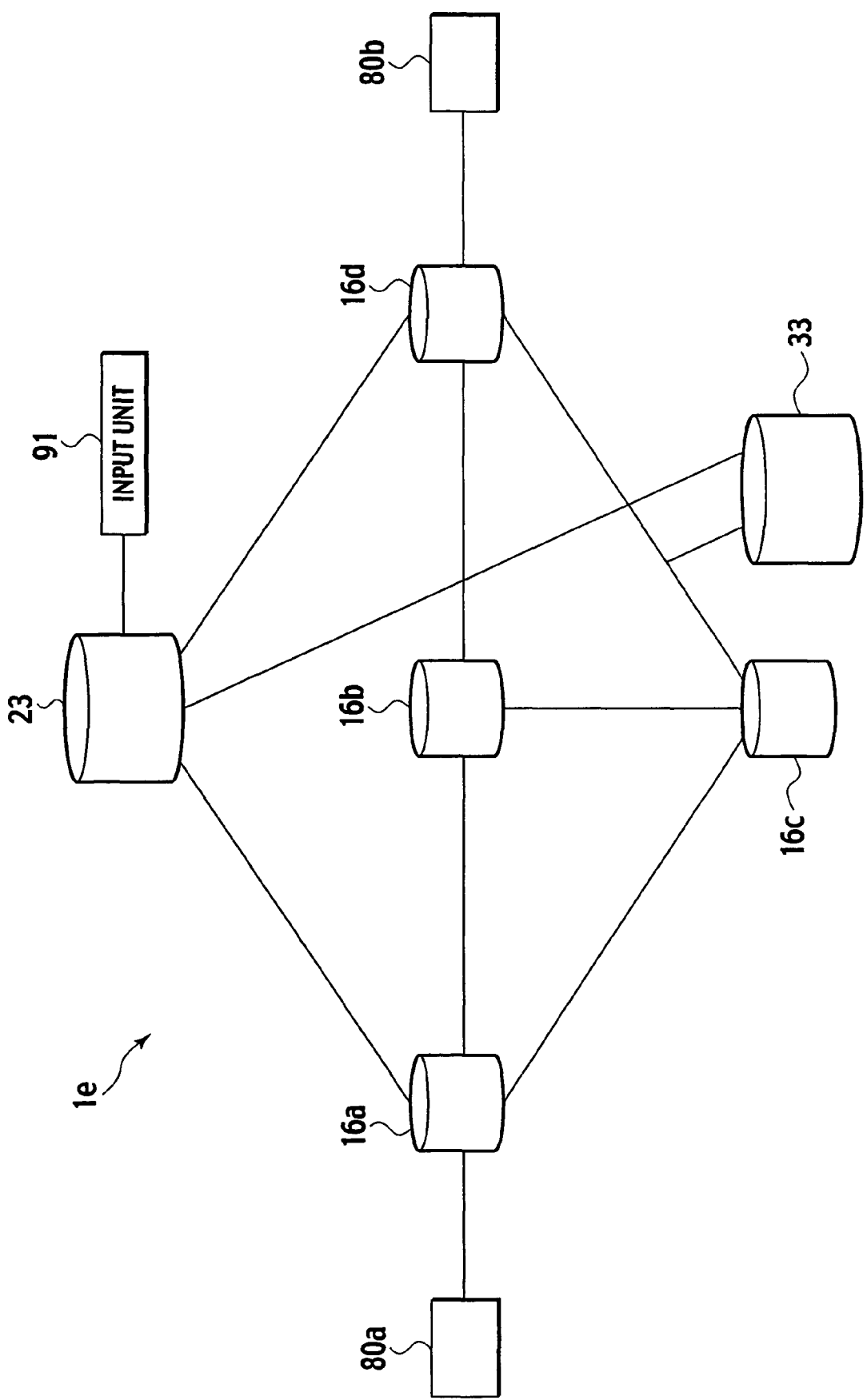
FIG. 35 is a view showing a general structure of a modification of the third embodiment of the packet transfer system according to the present invention.

FIG. 35 is a view showing a general structure of a modification of the third embodiment of the packet transfer system according to the present invention. This modification is configured like the third embodiment. Accordingly, like parts are represented with like reference marks, and only characteristic parts will be explained.

In FIG. 35, the packet transfer system 1e according to the modification includes a plurality of packet transfer apparatuses 16a to 16d to transfer packets, a call control apparatus 23 to control a call for voice communication and the like between terminal apparatuses 80a and 80b connected to the packet transfer apparatuses 16a and 16d, respectively, and a monitor apparatus 33 to monitor specified packets.

Unlike the configuration of FIG. 33, this configuration makes the monitor apparatus 33 not to relay communication. Instead, the monitor apparatus 33 directly obtains packets from a packet transfer route between the packet transfer apparatuses 16c and 16d and monitors the packets.

Among the packet transfer apparatuses 16a to 16d, the packet transfer apparatuses 16a and 16d to which the terminal apparatuses 80a and 80b are connected, respectively, are called edge packet transfer apparatuses.

In such a packet transfer system 1e, the terminal apparatus 80a, for example, sets a call for real-time communication. For this, the terminal apparatus 80a transmits a call setting request including information about a destination to communicate with and information about a type of service of communication to the call control apparatus 23.

The call control apparatus 23 receives the call setting request from the terminal apparatus 80a and determines whether or not the destination terminal apparatus 80b is ready for communication by sending a call setting request including information about the caller terminal apparatus 80a, information about the type of service of communication, and the like to the destination terminal apparatus 80b.

The destination terminal apparatus 80b receives the call setting request from the call control apparatus 23, checks the information about the caller terminal apparatus 80a, the information about the type of service of communication, and the like, and if communication is possible, returns a communication possible notification to the call control apparatus 23, to start real-time communication with the terminal apparatus 80a.

The call control apparatus 23 receives the communication possible notification from the destination terminal apparatus 80b, determines that the call has been set, assigns identification information such as an identification number to the set call, stores the information about the caller terminal apparatus 80a and destination terminal apparatus 80b, the information about the type of service of communication, and the identification information related thereto, and transmits a communication possible notification to the caller terminal apparatus 80a.

The terminal apparatus 80a receives the communication possible notification and starts real-time communication with the terminal apparatus 80b.

The call set in such a way is managed by the call control apparatus 23. With an instruction entered in an input unit 91 connected to the call control apparatus 23, a list of calls and a call communicated with a desired terminal apparatus can be displayed on a display unit. The displayed calls can be monitored by entering an instruction.

A bidirectional packet transfer route (LSP) for communication to be monitored is set through the packet transfer apparatus 16c between the terminal apparatuses 80a and 80b. The packet transfer apparatuses 16a and 16d accommodating the terminal apparatuses 80a and 80b store an LSP label passing through the packet transfer terminal 16c for each destination terminal apparatus.

When receiving an instruction to monitor a given call, the call control apparatus 23 transmits a monitored transfer start instruction including address information of the terminal apparatuses 80a and 80b that are communicating with each other on the call to the packet transfer apparatuses 16a and 16d accommodating the terminal apparatuses 80a and 80b, respectively.

Each of the packet transfer apparatuses 16a and 16d receives the monitored transfer start instruction, finds the addresses of the accommodating terminal apparatus and destination terminal apparatus from the address information of the terminal apparatuses contained in the monitored transfer start instruction, stores the information set in the monitored transfer start instruction so that the information is retrievable according to the address information of the accommodating terminal apparatus, receives each packet from the accommodating terminal apparatus for the destination terminal apparatus, sets an LSP label corresponding to the destination terminal apparatus and passing through the monitor apparatus as a shim-header label attached to the packet, and transfers the packet.

The packet transfer apparatus 16c operates like a standard packet transfer apparatus. Each packet from the terminal apparatus 80a is transferred along the preset LSP in the packet transfer system to the terminal apparatus 80b according to the label thereof that is rewritten properly.

Figure 36:
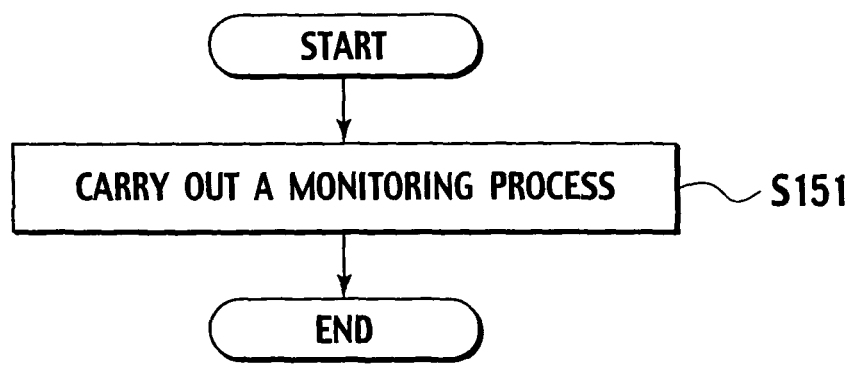
FIG. 36 is a flowchart showing a monitoring procedure carried out in the packet transfer system according to the modification of the third embodiment.

FIG. 36 is a flowchart showing a monitoring procedure carried out in the packet transfer system according to the modification of the third embodiment.

The monitor apparatus 33 directly receives packets from the packet transfer route between the packet transfer apparatuses 16c and 16d and carries out a monitoring process on the packets (step S151).

In this way, communication between the terminal apparatuses 80a and 80b is passed through the path between the packet transfer apparatuses 16c and 16d and is monitored by the monitor apparatus 33 without the users of the terminal apparatuses 80a and 80b knowing it.

When a monitor end instruction is given to the call control apparatus 23, or when the communication ends and a call disconnection request is transmitted from the terminal apparatuses 80a and 80b, the call control apparatus 23 transmits a monitored transfer termination instruction containing the address information of the terminal apparatuses 80a and 80b to the packet transfer apparatuses 16a and 16d accommodating the terminal apparatuses 80a and 80b, to delete the stored call identification information, terminal apparatus information, communication service information, and the like.

The packet transfer apparatuses 16a and 16d receive the monitored transfer termination instruction and delete the stored information of the terminal apparatuses 80a and 80b set in the monitored transfer start instruction.

In this way, this embodiment presets an LSP between terminal apparatuses, to transfer packets through the path between the packet transfer apparatuses 16c and 16d, so that the monitor apparatus 33 can monitor packets passing through the path between the packet transfer apparatuses 16c and 16d. A packet transfer apparatus accommodating a terminal apparatus that conducts communication for a call to be monitored attaches an LSP label, which transfers packets through the path between the packet transfer apparatuses 16c and 16d, to each packet received from the terminal apparatus that is accommodated in the packet transfer apparatus and conducts communication for the call to be monitored. Then, the monitor apparatus 33 monitors received packets. This embodiment can pass communication for an optional call through the path between the packet transfer apparatuses 16c and 16d, thereby eliminating the need of providing each edge packet transfer apparatus with a monitoring function. This results in reducing a facility cost.

Monitoring is achieved at a single location, i.e., at the monitor apparatus. Namely, there is no need of collecting monitored results from many packet transfer apparatuses. This reduces a management cost.

Since the label changing operation is carried out by the edge packet transfer apparatuses, monitoring can be started at optional timing during communication.

This embodiment specifies a call to be monitored among calls in communication. Instead, a terminal apparatus may be selected as a monitored object. When a terminal apparatus is specified as a monitored object while having no call in communication, the terminal apparatus can be monitored by transmitting a monitored transfer start instruction to a packet transfer apparatus accommodating the terminal apparatus when setting a call like the first embodiment.

According to this embodiment, the monitor apparatus 33 conducts the same monitoring operation on every received packet. Like the previous embodiment, the call control apparatus 23 may issue a monitor start instruction to the monitor apparatus 33 at the start of monitoring, to notify the monitor apparatus 33 of the address of a terminal apparatus to be monitored, an LSP input label to be monitored, a type of monitoring, and the like, so that a type of monitoring may be changed call by call.

<Modification of Monitor Apparatus>

Figure 37:
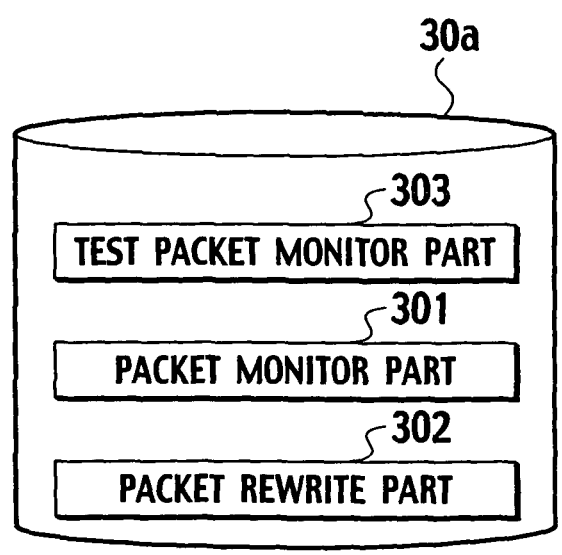
FIG. 37 is a view showing a configuration of a modification of the monitor apparatus.

FIG. 37 is a view showing a configuration of a modification of the monitor apparatus.

In FIG. 37, the monitor apparatus 30a according to the modification includes a test packet monitor part 303 to relay test packets exchanged between terminal apparatuses and read the contents thereof, a packet monitor part 301 to relay normal packets exchanged between terminal apparatuses and read the contents thereof, and a packet rewrite part 302 to rewrite the destinations and originators of these packets.

In FIG. 37, only trial-class test packets are handled by the dedicated functional block (the test packet monitor part 303). Priority-class packets once admitted are subjected to limited monitor items. This configuration reduces the number of packets to be processed by the test packet monitor part 303 and increases the number of calls handled by the monitor apparatus 30a.

If there is a terminal apparatus that abnormally operates from the beginning, the test packet monitor part 303 monitors each test packet from the terminal apparatus for every monitor item at the start of test packet transmission. Thereafter, any monitor item for which a test packet from the monitor apparatus shows a normal operation can be dropped from the monitor items. This configuration may reduce a monitoring time and monitor items, thereby further reducing the process load of the test packet monitor part 303 and increasing the number of calls handled by the monitor apparatus 30a.

<Example of Divided Configuration of Monitor Apparatus>

Figure 38:
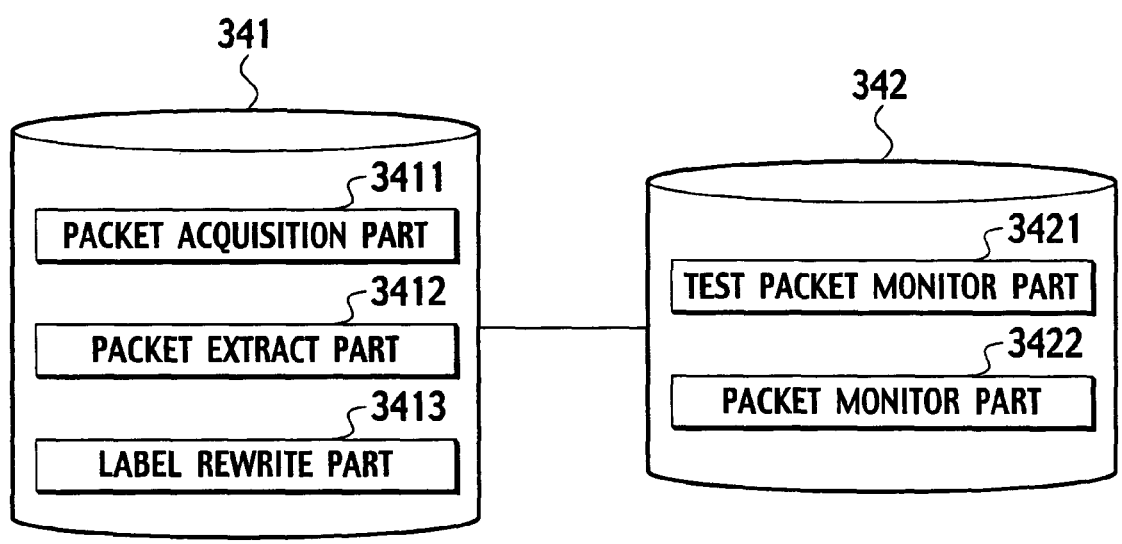
FIG. 38 is a view showing a monitor apparatus having a monitor packet rewrite unit and a packet monitor unit that are separated from each other.

Any monitor apparatus explained so far integrally includes, as shown in FIG. 25, a packet rewrite part to rewrite monitored packets and a packet monitor part to monitor packets. FIG. 38 shows a monitor apparatus including a monitor packet rewrite unit 341 and a packet monitor unit 342 that are physically separated from each other. The monitor packet rewrite unit 341 includes a packet acquisition part 3411, a packet extract part 3412, and a packet rewrite part 3413. The packet monitor unit 342 includes a test packet monitor part 3421 and a packet monitor part 3422. The packet monitor unit 342 receives a monitor object notification from a call control apparatus and issues an instruction to the monitor packet rewrite unit 341 to inform of a monitored packet and necessary information about the packet.

FIG. 39 is a flowchart showing a procedure carried out in the monitor packet rewrite unit.

As shown in the flowchart of FIG. 39, the monitor packet rewrite unit 341 refers to the originator address of a received packet, reads information necessary for monitoring and information about a true destination address from the originator address (step S161), extracts information necessary for monitoring from the received packet (step S162), notifies the packet monitor unit 342 of the extracted information (step S163), rewrites the destination address of the received packet into the address of a destination terminal apparatus (step S164), rewrites the originator address of the received packet into the address of the monitor unit (step S165), and transmits the packet with the rewritten addresses to the next packet transfer apparatus (step S166).

FIG. 40 is a flowchart showing a procedure carried out in the packet monitor unit.

As shown in the flowchart of FIG. 40, the packet monitor unit 342 reads a type of monitoring from the notified information concerning the packet to be monitored (step S171) and carries out a monitoring process according to the type of monitoring (step S172).

This configuration limits information to be sent from the monitor packet rewrite unit 341 to the packet monitor unit 342 to that necessary for carrying out a monitoring process, to thereby reduce an overhead due to communication between the units. The units may flexibly be combined according to their processing capacities, to realize the monitor apparatus at low cost.

<Monitoring Procedure of Monitor Apparatus>

FIGS. 41A and 41B are views explaining monitoring procedures carried out by a monitor apparatus.

The left side (FIG. 41A) shows passive monitoring that only monitors the contents of main information transmitted according to RTP. In addition to this, the monitor apparatus positively intervenes in RTP packets. For example, the monitor apparatus intentionally discards RTP packets and monitors if a receiver terminal reports a true quality corresponding to the discarding. This is to detect a vicious operation of the receiver terminal, such as falsely reporting high quality without regard to an actual quality of the received RTP packets. FIG. 41A shows three cases including a case in which there is no packet loss, a case in which a packet loss occurs between a transmitter terminal and the monitor apparatus, and a case in which a packet loss occurs between the monitor apparatus and a receiver terminal. In each case, the receiver terminal reports a normal reception result with an RTCP packet.

The receiver terminal receives packets M#1 to M#3 and reports with a packet RTCP#1 that the packets M#1 to M#3 have normally been received. As a result, the monitor apparatus confirms that the receiver terminal is normal.

The transmitter terminal transmits packets M#4 to M#6 among which the packet M#5 is lost before reaching the monitor apparatus. As a result, the monitor apparatus transmits only the packets M#4 and M#6 to the receiver terminal. The receiver terminal reports with a packet RTCP#2 that the packets M#4 and M#6 have normally been received. Then, the monitor apparatus confirms that the receiver terminal is normal. On the other hand, the receiver terminal may report with the packet RTCP#2 that the packets M#4 to M#6 have normally been received. Upon receiving such a report, the monitor apparatus immediately determines that the receiver terminal has made a false report because the monitor apparatus did not transmit the packet M#5.

The transmitter terminal as well as the monitor apparatus transmit packets M#7 to M#9 among which the packet M#8 is lost before reaching the receiver terminal. In this case, the receiver terminal reports with a packet RTCP#3 that the packets M#7 and M#9 have normally been received. Then, the monitor apparatus presumes that the packet M#8 has been lost before reaching the reception apparatus. If the receiver terminal reports with the packet RTCP#3 that the packets M#7 to M#9 have normally been received. Receiving such a report, the monitor apparatus is unable to detect the false report. Even if the receiver terminal falsely reports that it has received the packet M#8, the monitor apparatus is unable to detect this false report because the monitor apparatus is unable to detect the packet loss occurred between the monitor apparatus and the receiver terminal.

To enable the monitor apparatus to detect the false report of the third case, the monitor apparatus carries out the positive packet monitoring of FIG. 41B. Namely, the monitor apparatus intentionally discards an RTP packet received from the transmitter terminal and does not transmit the same to the receiver terminal. Then, the monitor apparatus can confirm whether or not the receiver terminal returns a false report. Namely, the monitor apparatus can detect the false report of the above-mentioned third case. In FIG. 41B, the monitor apparatus receives packets M#7 to M#9 from the transmitter terminal and intentionally discards the packet M#8 among the received packets. If the receiver terminal reports with a packet RTCP#3 that the packets M#7 and M#9 have normally been received, the monitor apparatus can confirm the correctness of the report from the receiver terminal. If the receiver terminal reports with the packet RTCP#3 that the packets M#7 to M#9 have correctly been received, the monitor apparatus can detect the falseness of the report from the receiver terminal.

Industrial Applicability

The retry communication control method, system, or program according to the present invention transmits trial-class packets in consideration of traffic of priority-class packets, or transmits trial-class packets by avoiding collisions between terminals with an asynchronous technique based on an execution probability, or immediately stops transmitting trial-class packets if the communication quality of trial-class packets is insufficient, to thereby improve a total throughput.

The packet transfer apparatus according to the present invention transfers packets from a first terminal apparatus to a second terminal apparatus according to their respective packet transfer priority levels, i.e., a trial class or a priority class specified by a transfer request from the first terminal apparatus. The present invention presets a trial-class band capacity not to discard packets of the trial class and a priority-class band capacity not to discard packets of the priority class. If a total flow rate exceeds the trial-class band capacity, packets of the trial class are discarded and packets of the priority class are admitted up to the priority-class band capacity. Accordingly, the packets of the priority class will not be discarded once they are admitted, and the quality thereof is guaranteed until the flow thereof completes.

The present invention is applicable to the terminal-initiative, measurement-based admission control in which a terminal apparatus makes a request for transmitting packets in the trial class, and according to a resultant transmission quality of the packets, makes a request for transmitting packets in the priority class or again in the trial class. If the request for transmitting packets in the trial class results in exceeding the trial-class band capacity, the trial-class packets are not admitted and are discarded to guarantee an existing flow of priority-class packets.

Even if a packet transmission request results in overflowing the trial-class band capacity, the request will be accepted if it is for priority-class packets. Such a request for priority-class packets is accepted when it occurs at circuit switching or handover. Accordingly, priority-class packets once accepted will not be discarded at the time of circuit switching or handover, and the quality thereof is guaranteed until the flow thereof terminates.

For example, there is an actual circuit band of 100 Mbps for which a trial-class band capacity of 40 Mbps is set. In a state exceeding 40 Mbps, no trial-class packets are transferred, and therefore, a flow of 40 Mbps or below is usually maintained. If circuit switching occurs, priority-class packets are not restricted by the 40-Mbps band limit and are continuously communicated at the priority quality. Until the total flow rate drops below 40 Mbps, no new flow is set for trial-class packets. Once the total flow rate drops below 40 Mbps, a new flow of trial-class packets is accepted and transferred. In this way, flows of packets are automatically stabilized.

When a handover occurs, priority-class packets are not discarded but they are continuously communicated without repeatedly securing a necessary band for the priority-class packets. Consequently, a handover between base stations is smoothly achieved.

In a variable band flow, a total flow rate may exceed the trial-class band capacity when a flow-rate variation occurs. Even in such a case, a flow of priority-class packets is not restricted by the trial-class band capacity, and therefore, the quality of a flow of priority-class packets is guaranteed once the flow is established. Due to this, a measurement time for priority-class packets may be shortened.

According to the present invention, a call control apparatus provides a packet transfer apparatus with a monitor instruction including an identifier indicating a priority-level-transition pattern. According to the identifier, the packet transfer apparatus predicts a priority-level transition of packets transmitted from a terminal apparatus for a given call, and according to the prediction, monitors packets. With this configuration, the priority levels of packets can be monitored without complicated operations even in the terminal-initiative, measurement-based admission control.

The present invention can discard packets violating a contract, to block contract violating packets and maintain a service quality conforming to the contract.

The type of service of a packet violating a contract may be rewritten into that conforming to the contract, to transfer the contract violating packet as a contract conforming packet. This results in maintaining a service quality conforming to the contract.

The present invention determines whether or not a type of service requested at the time of setting a call conforms to a contract, and if it violates the contract, rejects to establish the call. This configuration can reject a call before transferring packets, to maintain a service quality conforming to the contract.

According to the present invention, a single monitor part can centrally monitor packets not only for an upper flow-rate limit but also for a lower flow-rate limit, to reduce a monitoring cost.

According to the present invention, any packet for a call that has been determined as an object to be monitored at the time of call establishment is transferred via a monitor apparatus. Namely, the monitor apparatus can centrally monitor packets, and therefore, a packet transfer apparatus is not required to have a monitoring function. This results in reducing the cost of the packet transfer apparatus as well as the managing cost of a packet transfer system.

Guiding packets of a monitored call to the monitor apparatus is made by notifying a terminal apparatus involved in the call of the address of the monitor apparatus as the address of a destination terminal apparatus at the time of setting the call and by rewriting the destination and originator addresses of each packet at the monitor apparatus. This technique transfers all packets related to a monitored call to the monitor apparatus, and therefore, the monitor apparatus can centrally carry out a monitoring operation.

The present invention specifies a call, a terminal, or a user as an object to be monitored and transfers any packet related to the monitored call, terminal, or user through a monitor apparatus. Namely, the monitor apparatus centrally monitors packets to be monitored, and each packet transfer apparatus is not required to have a monitoring function. This results in reducing the cost of the packet transfer apparatus as well as the managing cost of a packet transfer system.

In this regard, a packet transfer apparatus accommodating a terminal apparatus that exchanges monitored packets rewrites the destination address of each monitored packet into the address of the monitor apparatus. Then, the monitor apparatus rewrites the destination address of the received packet into the address of a true destination. As a result, packets related to the monitored call, terminal, or user can be routed through the monitor apparatus, which can centrally monitor the packets.

The present invention can preset an LSP between terminal apparatuses, to transfer packets through a monitor apparatus. A packet transfer apparatus accommodating a terminal apparatus that exchanges monitored packets attaches an LSP label to each packet to be monitored so that the packet is routed through the monitor apparatus. This configuration can transfer packets related to a monitored call, terminal, or user through the monitor apparatus, which can centrally monitor the packets.

The call control apparatus of the present invention can select terminal-based monitoring that monitors every call related to a specified terminal, call-based monitoring that monitors a specified call, or user-based monitoring that monitors every call related to a specified user. This configuration can detect an abnormal operation caused by a specific terminal or a specific user.

The call control apparatus of the present invention can employ, as a selection logic, optional selection, selection based on a previous monitor result, selection based on a communication attribute contained in a call control signal, or selection based on information about a routing apparatus contained in a call setting signal. This enables, for example, detecting an abnormal operation based on frequencies, specifically monitoring large-band communication that greatly influences a communication network, and specifically monitoring unreliable communication excluding communication involving reliable terminals and reliable home gateways.

With this configuration, the present invention can detect a constant, not intermittent, abnormal operation, monitor packets while minimizing an influence on a communication network, and specifically monitor communication having a high probability of abnormal operation. This results in efficiently utilizing the monitor apparatus.

The invention claimed is:

1. A retry communication control method for a packet communication system that includes a plurality of packet transfer apparatuses each connected to a network and to at least one terminal apparatus and is capable of exchanging packets between the terminal apparatuses according to priority levels assigned to the packets, comprising:
   sending packets of a trial class for a predetermined period from a caller terminal apparatus;
   estimating whether or not a communication quality of the packets is sufficient;
   if it is sufficient, sending packets of a priority class thereafter;
   if it is insufficient, stopping to send packets of the trial class for a second predetermined period;
   after the second predetermined period, selecting one or more terminal apparatuses eligible to send packets of the trial class according to an execution probability, wherein the execution probability is equal to max/total, wherein "total" represents the number of terminal apparatuses trying to send packets of the trial class within a certain time unit, and "max" represents the maximum number of terminal apparatuses trying to send packets of the trial class within the certain time unit and allowed to successfully transfer the packets of the trial class without deteriorating communication quality, estimated from the communication quality of the preceding trial-class packets; and if the caller terminal apparatus is a terminal apparatus eligible to send packets of the trial class, again sending packets of the trial class for the predetermined period from the caller terminal apparatus.

2. A retry communication control method for a packet communication system that includes a plurality of packet transfer apparatuses each connected to a network and to at least one terminal apparatus and is capable of exchanging packets between the terminal apparatuses according to priority levels assigned to the packets, comprising:
   sending packets of a trial class from a caller terminal apparatus within a predetermined period;
   estimating from time to time whether or not a communication quality of the packets is sufficient;
   if it is sufficient and if the sufficient state continues for the predetermined period, sending packets of a priority class;
   if it becomes insufficient, immediately stopping to send packets of the trial class within the predetermined period and continuously stopping to send packets of the trial class for a second predetermined period;
   after the second predetermined period, estimating whether or not it is possible to send packets of the trial class according to an execution probability, wherein the execution probability is equal to max/total, wherein "total" represents the number of terminal apparatuses trying to send packets of the trial class within a certain time unit, and "max" represents the maximum number of terminal apparatuses trying to send packets of the trial class within the certain time unit and allowed to successfully transfer the packets of the trial class without deteriorating communication quality, estimated from the communication quality of the preceding trial-class packets; and
   if it is possible, again sending packets of the trial class from the caller terminal apparatus.

3. A retry communication control system including a plurality of packet transfer apparatuses each connected to a network and to at least one terminal apparatus, packets of a trial class being sent from one terminal apparatus to another to determine, according to the communication quality of the sent packets, whether or not it is possible to send packets of a priority class, comprising:
   a unit that sends packets of the trial class for a predetermined period;
   a unit that estimates whether or not a communication quality of the packets is sufficient;
   a unit that sends, if it is sufficient, packets of the priority class thereafter;
   a unit that stops, if it is insufficient, to send packets of the trial class for a second predetermined period;
   a unit that selects, after the second predetermined period, one or more terminal apparatuses eligible to send packets of the trial class according to an execution probability, wherein the execution probability is equal to max/total, wherein "total" represents the number of terminal apparatuses trying to send packets of the trial class within a certain time unit, and "max" represents the maximum number of terminal apparatuses trying to send packets of the trial class within the certain time unit and allowed to successfully transfer the packets of the trial class without deteriorating communication quality, estimated from the communication quality of the preceding trial-class packets; and
   a unit that again sends, if a caller terminal apparatus is a terminal apparatus eligible to send packets of the trial class, packets of the trial class for the predetermined period from the caller terminal apparatus.

4. The retry communication control system of claim 3, wherein each of the terminal apparatuses has each of the units.

5. The retry communication control system of claim 3, wherein each of the packet transfer apparatuses has each of the units.

6. The retry communication control system of claim 3, further comprising:
   a call control apparatus to start charging a caller terminal apparatus for a fee when the transfer of packets of the priority class is started.

7. A retry communication control system including a plurality of packet transfer apparatuses each connected to a network and to at least one terminal apparatus, packets of a trial class being sent from one terminal apparatus to another to determine, according to the communication quality of the sent packets, whether or not it is possible to send packets of a priority class, comprising:
   a unit that sends packets of the trial class within a predetermined period;
   a unit that estimates from time to time whether or not a communication quality of the packets is sufficient;
   a unit that sends, if the communication quality is sufficient and if the sufficient state continues for the predetermined period, packets of the priority class;
   a unit that immediately stops, if the communication quality becomes insufficient, to send packets of the trial class within the predetermined period and continuously stopping to send packets of the trial class for a second predetermined period;

a unit that estimates, after the second predetermined period, whether or not it is possible to send packets of the trial class according to an execution probability, wherein the execution probability is equal to max/total, wherein "total" represents the number of terminal apparatuses trying to send packets of the trial class within a certain time unit, and "max" represents the maximum number of terminal apparatuses trying to send packets of the trial class within the certain time unit and allowed to successfully transfer the packets of the trial class without deteriorating communication quality, estimated from the communication quality of the preceding trial-class packets; and a unit that again sends, if it is possible, packets of the trial class from a caller terminal apparatus.

8. The retry communication control system of claim 7, wherein each of the terminal apparatuses has each of the units.

9. The retry communication control system of claim 7, wherein each of the packet transfer apparatuses has each of the units.

10. The retry communication control system of claim 7, further comprising:

a call control apparatus to start charging a caller terminal apparatus for a fee when the transfer of packets of the priority class is started.

11. The retry communication control method of claim 1, wherein the caller terminal apparatus is charged for a fee from the time when starting to transfer packets of the priority class.

12. The retry communication control method of claim 2, wherein the caller terminal apparatus is charged for a fee from the time when starting to transfer packets of the priority class.

* * * * *